US005379420A

United States Patent [19]
Ullner

[11] Patent Number: 5,379,420
[45] Date of Patent: Jan. 3, 1995

[54] HIGH-SPEED DATA SEARCHING APPARATUS AND METHOD CAPABLE OF OPERATION IN RETROSPECTIVE AND DISSEMINATION MODES

[75] Inventor: Michael K. Ullner, Pasadena, Calif.

[73] Assignee: TRW Inc., Redondo Beach, Calif.

[21] Appl. No.: 813,636

[22] Filed: Dec. 26, 1991

[51] Int. Cl.6 ............................................. G06F 15/40
[52] U.S. Cl. .................................... 395/600; 395/800; 340/146.2; 364/DIG. 2; 364/259; 364/259.2; 364/259.4; 364/282.1; 364/231.8
[58] Field of Search ............... 340/146.2; 395/600, 395/425, 800; 365/49

[56] References Cited

U.S. PATENT DOCUMENTS

| | | | |
|---|---|---|---|
| 3,831,152 | 8/1974 | Perneski et al. | 364/200 X |
| 4,236,227 | 11/1980 | Bull et al. | 365/49 |
| 4,450,520 | 5/1984 | Hollaar et al. | 364/200 X |
| 4,489,435 | 12/1984 | Moshier | 381/43 |
| 4,636,974 | 1/1987 | Griffin | 364/900 X |
| 4,760,523 | 7/1988 | Yu et al. | 364/200 X |
| 4,897,814 | 1/1990 | Clark | 365/49 |
| 5,051,886 | 9/1991 | Kawaguchi et al. | 395/600 |
| 5,051,947 | 9/1991 | Messenger | 395/800 |
| 5,060,143 | 10/1991 | Lee | 395/600 |
| 5,175,860 | 12/1992 | Yamada | 395/800 |

Primary Examiner—Paul V. Kulik
Attorney, Agent, or Firm—Noel F. Heal; Robert W. Keller; Sol L. Goldstein

[57] ABSTRACT

A highly versatile data search engine in which multiple search cells are connected together in a pipeline through which data can be streamed. Each cell has multiple registers, and corresponding registers in each cell are connected together to form the pipeline. Characters in two data streams are compared in the pipeline, a first data stream that includes a sequence of database characters and parallel sequences of associated data, and a second data stream that includes a sequence of pattern characters and parallel sequences of associated data. The parallel data sequences associated with the pattern data include coded signals that control cell operation. One of the parallel data sequences associated with the database is a sequence of character marks, which are used to indicate search starting points in the database character sequence, and which are propagated along the database character sequence as a result of successive character matches between the pattern and database characters. Use of the character marks facilitates searches in both forward and reverse directions, and permits selected database characters to be ignored. The search engine can be operated in either a retrospective mode, in which the database is streamed through cells containing a stationary pattern, or in dissemination mode, in which patterns are streamed through cells containing a stationary database.

48 Claims, 27 Drawing Sheets

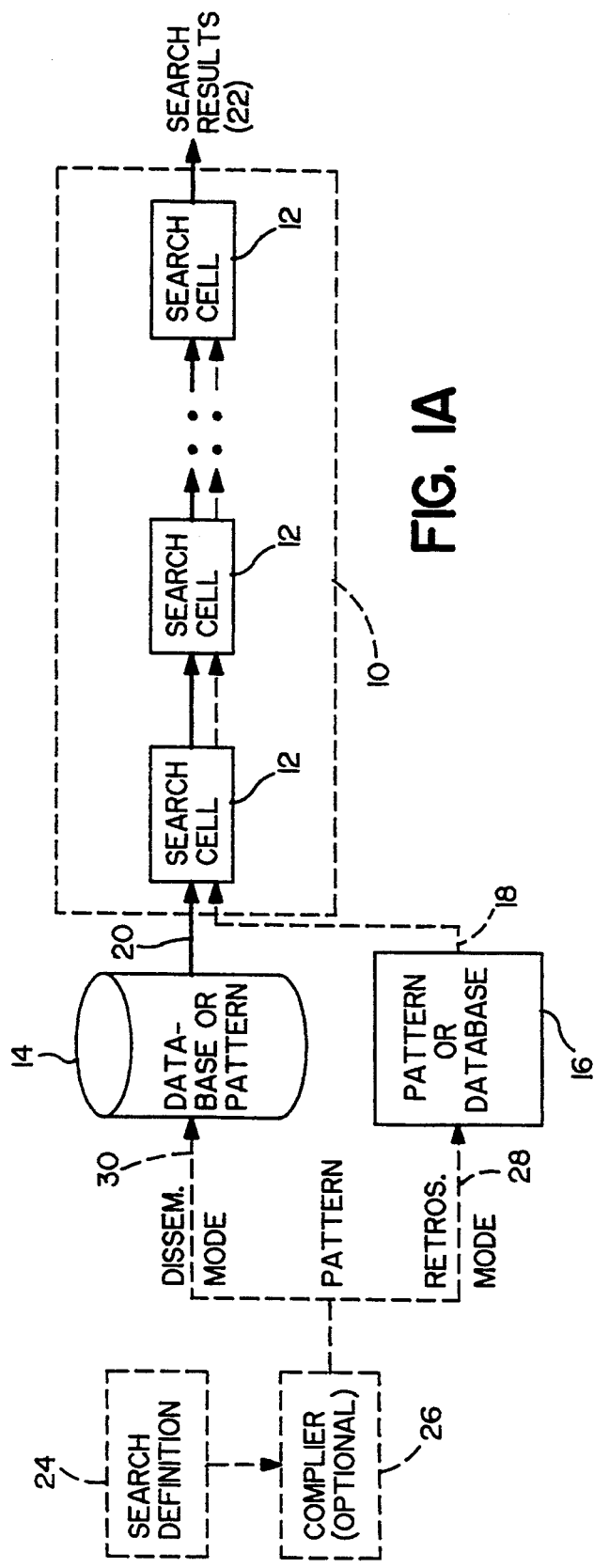
FIG. IA
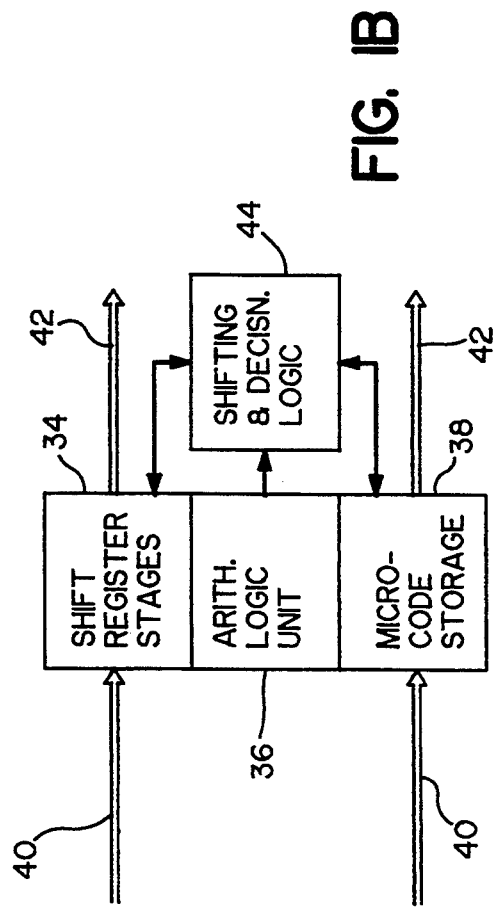
FIG. IB

HIGH-SPEED DATA SEARCHING APPARATUS AND METHOD CAPABLE OF OPERATION IN RETROSPECTIVE AND DISSEMINATION MODES

BACKGROUND OF THE INVENTION

This invention relates generally to data searching techniques and, more particularly, to improvements in the construction and functionality of data searching machines capable of handling large amounts of data. The state of the art of data searching techniques is probably typified by the disclosure of U.S. Pat. No. 4,760,523 to Yu et al., which is assigned to the same assignee as the present application. The Yu et al. patent discloses and claims a text searching technique in which a large database is streamed through a serially connected string of cells containing a pattern to be searched for in the database. Techniques are disclosed for detecting exact matches and, to some degree, inexact matches between the search pattern and corresponding strings of characters in the database.

Although the Yu et al. approach is completely satisfactory for many data searching applications, there are some search functions that the Yu et al. apparatus cannot perform. For example, some searching applications cannot conveniently perform any search other than in a "retrospective" mode of operation, wherein the search pattern is stored in a pipeline of device cells and the database to be searched is streamed through to detect matches in the database. But some searching applications may require that a relatively small database be searched for the occurrence of any of a large number of requested search patterns, the results of the searches then being disseminated to the appropriate parties. The small database may be, for example, the most recent issue of a publication for which there are a large number of search requests. In this "dissemination" mode of data searching, the search patterns may together constitute a very large composite pattern; so large, in fact, that it may be impractical to fit it into the pipeline of search cells. One solution to this difficulty is to make multiple passes in the retrospective mode of operation, but this increases the cost and inconvenience of the search. Another approach is to place the database in the pipeline of cells, and to stream the composite search pattern through the cells. While this latter approach would seem to be the preferred way to handle the dissemination mode of operation, it is incompatible with searching devices of the retrospective type, such as the Yu et al. device. Ideally, it would be desirable for a data searching device to handle efficiently both the retrospective and dissemination searching modes.

Another difficulty in data searching is that a search technique is sometimes required to recognize data appearing in different forms. For example, textual data may include words that are either in hyphenated or non-hyphenated form. The word "airport" in a search pattern may not match with the hyphenated form "airport" bridging two lines of text. Ignoring hyphens entirely is not a good solution, because in some cases the hyphen may be a legitimate component of the search pattern. This seemingly simple problem, and others of a similar nature, have plagued designers of textual data searching devices for some time.

Another limitation of textual database searching devices of the prior art is that the manner in which inexact matches are detected typically permits only a limited number of errors before a mismatch will be declared, and assigns the same weight to each type of error. In some applications, such as searching DNA and protein sequences, it is desirable to tolerate a relatively large number of errors without declaring a mismatch, and it is also desirable to be able to assign different costs to different types of errors.

Yet another inherent limitation of prior art systems is their inability to handle multiple-precision quantities. This ability has application in both numerical and textual searching. In textual searching the ability to handle multiple-precision characters is useful in searching some foreign-language textual material.

The present invention is directed to solutions to these problems, and also provides additional search capabilities not previously available in data searching systems of the prior art.

SUMMARY OF THE INVENTION

The present invention resides in an improved data searching apparatus and method, having capabilities well beyond those of searching techniques of the prior art. Briefly, and in general terms, the apparatus of the invention comprises a plurality of functionally identical search cells, each search cell including a plurality of registers, and means for connecting corresponding registers in each cell together to form a number of serially connected pipelines of registers through which data can be passed. The apparatus also includes means for inputting a first data stream from a database to be searched, and means for inputting a second data stream defining a pattern to be searched for in the database. Each search cell includes means for comparing a database character with a pattern character and means for controlling further operation of the cell in response to the result of each such comparison. Some of the registers in each cell are designated to hold a database character and associated data, and others of the registers are designated to hold a pattern character and associated data. Either one of the data streams is first stored in the designated registers of the search cells, and then the other of the data streams is streamed through the search cells to perform the search, which may be performed in either a retrospective mode or a dissemination mode.

More specifically, the first data stream includes a sequence of database characters and parallel sequences of associated data, one of the parallel sequences being a sequence of character marks; and the second data stream includes a sequence of pattern characters and parallel sequences of coded data that determine the manner in which comparisons and other functions are performed in each element of the pattern. A character mark of a particular state indicates that the corresponding database character is to be compared with a pattern character in any cell in which both characters are present. The apparatus also includes, in each cell, means for shifting any of the parallel sequences of data associated with the database characters in either direction with respect to the sequence of database characters. In this way a mark associated with a particular database character may be shifted to and associated with a neighboring database character. This shifting of marks is used in every basic comparison operation, and the mark carries with it a record of a character match. As successive characters are matched, the mark is propagated along the database sequence, and forms the search results.

The apparatus further includes, in each cell, means for modifying data in any of the parallel sequences associated with the database characters, as determined by code contained within the parallel sequences of coded data associated with the pattern characters, and conditioned as desired on the results of any comparison operation performed in the cell. This is the mechanism by which a cell marks or unmarks a database character currently present in the cell.

In a normal search, the parallel sequences of data in the second data stream are conditioned to have the collective effect of initially marking all of the database characters, extinguishing the marks that do not match a first encountered pattern character, and shifting any remaining marks by one position toward the end of the sequence of database characters. A second pattern character can next be compared with each database character that is still marked, and a character mark is propagated toward the end of the sequence of database characters if a matching comparison is made at each successive database character position. A match of all of the pattern characters with a corresponding string of database characters results in a mark being left in a database position immediately following the last character in the matching string.

In accordance with an important aspect of the invention, at least some of the pattern characters in the second data stream may be stored in reverse order, to effect a search of the database in reverse. For reverse searching, the parallel sequences of data in the second data stream are conditioned to have the collective effect of initially marking all of the database characters, shifting the marks by one position toward the beginning of the sequence of database characters, and then extinguishing the marks that do not match a first encountered pattern character. A second pattern character in the reverse sequence of pattern characters can be next compared with each database character that is still marked. A character mark is propagated toward the beginning of the sequence of database characters if a matching comparison is made at successive database character positions. Moreover, a match of all of the pattern characters with a corresponding string of database characters results in a mark being left in a database position corresponding to the first character in the matching string.

In accordance with another aspect of the invention, one of the parallel sequences of data associated with the sequence of database characters contains an "ignore" flag, and each cell includes means for ignoring any character in the sequence of database characters when the "ignore" flag accompanies the character, whereby searches can be performed in such a manner that selected characters in the database can be ignored. Another aspect of the invention involves "kill" boundaries defined as erected in the database character sequence. One of the parallel sequences of data associated with the sequence of database characters contains a "kill" flag, indicative of a "kill" boundary between a cell containing the flag and a neighboring cell, and each cell includes means responsive to detection of the "kill" flag, for extinguishing any character mark that would otherwise be propagated across the "kill" boundary in either direction.

Although the character marks have been discussed as binary flags, they preferably take the form of numeric values. Each cell includes means, responsive to the coded data in the parallel sequences associated with the sequence of pattern data, for initially setting the numeric marks to a value indicative of a degree to which errors will tolerated in a search, and each cell further includes means for reducing the numeric value of a mark in the event that no match is found in the cell. Nonzero marks still remaining after the search represent pattern matches to within the desired degree of tolerance.

Another useful feature of the invention is that each cell further includes means for assigning different costs to different types of matching errors and to different errors of the same type. The types of errors that may be detected include misspellings, missing characters and extra characters.

Although the apparatus will typically be used to compare characters as simply equal or not equal, the means for comparing characters in each cell has more generality than this. It can also produce a match signal on the detection of a selected inequality, such as equal-to-or-greater-than, based on the binary-coded decimal equivalent of each character. This type of comparison is useful in some types of searches. For example, it permits the location of a numerical range of data in the database.

It will be understood that any of the claimed features will operate equally well in either retrospective or dissemination mode. The only difference between the modes in the apparatus of the invention is the identity of the data stream that is moved through the search cells. For retrospective mode it is the database sequence, while for dissemination mode it is the pattern sequence.

In terms of a novel method, the invention comprises the steps of inputting a first data stream into a pipeline of search cells, each having a plurality of registers, with corresponding registers of each cell being serially connected to form the pipeline, wherein the first data stream contains a sequence of database characters and parallel sequences of other data associated with the database, one of the parallel sequences being a sequence of character marks; and inputting a second data stream into the pipeline of search cells, although not necessarily after input of the first data stream. The second data stream contains a sequence of pattern characters and parallel sequences of other data, including coded data to control operation of the cells, and one of the first and second data streams is shifted into the pipeline prior to a search and the other of the data streams is streamed through the pipeline in performance of the search. The method further comprises the steps of setting all of the character marks to a nonzero value, to mark all of the characters in the database character sequence and to indicate initially that every character is a candidate for the beginning of a search; comparing each marked database character with a first pattern character; unmarking all characters that do not match the first pattern character; shifting any remaining marks toward the end of the sequence of database characters; comparing each marked database characters with subsequent pattern characters in turn; and, after each comparison, unmarking any nonmatching database characters and shifting any remaining marks toward the end of the sequence of database characters. Any string of characters in the database that matches the pattern will be marked at the character position next following the last character in the matching string.

Another important aspect of the invention is that all or part of a search may be performed in a reverse sequence, beginning with a search for the last character in a part of the pattern, and ending with the first character. The steps involved in this type of search are, first, shifting any character marks toward the beginning of the sequence of database characters, then comparing each marked database character with a first of the pattern characters stored in reverse order, then unmarking all characters that do not match the first reverse-order pattern character. These steps are repeated, comparing each marked database character with subsequent reverse-order pattern characters in turn and, before each comparing step, shifting any remaining marks toward the beginning of the sequence of database characters, and, after each comparison, unmarking any nonmatching database characters. Any string of characters in the database that matches the reverse-order pattern will be marked at the character position corresponding to the first character in the matching string, which is the last to be compared in the reverse-order pattern. The reverse searching feature permits implementation of a "lookahead" search, used, for example to locate all occurrences of a specified word, except when followed by another specified word.

The character comparisons performed in each cell may be made on the basis of equality, or various inequality functions may be invoked, to produce a match signal if, for example, the binary-coded valued of one character is greater than or less than that of the other. This permits searches for numerical data falling within a specified range of values.

Another feature of the invention is its ability to ignore specified characters in the database sequence. For this purpose the method further comprises the steps of searching the sequence of database characters for occurrences of at least one selected character that is to be ignored in a search, tagging each occurrence of the selected character by setting the value of a corresponding item in one of the parallel data sequences associated with the database, and ignoring the tagged characters in the search for database characters that match the pattern characters.

Yet another feature of the invention involves its ability to selectively extinguish, or "kill," character marks during an operation that would shift marks from one database character position to another. This is useful when a search is to be confined to a particular document, page, paragraph, sentence or word; or for searching selected fields within a fixed-format database. The steps required to implement the feature are searching the sequence of database characters for occurrences of at least a selected character that is to be the site of a "kill" boundary, tagging each occurrence of the selected character by setting the value of a corresponding item in one of the parallel data sequences associated with the database, and, during performance of a search, extinguishing a mark when the steps of the search call for shifting the mark across a "kill" boundary.

In accordance with another important aspect of the invention, each character mark has a positive numerical value and the step of extinguishing a mark is effected by reducing the value of the numerical mark. The method further comprises the steps of setting the marks to a selected initial value indicative of a desired degree of error tolerance for the search, and reducing the numerical value of a mark when a nonmatching condition is detected. The numerical values of any marks remaining at the end of the search are indicative of the degree of match for each string of characters located in the sequence of database characters.

In accordance with another feature of the invention the method includes selecting a cost for each type of error, wherein different costs may be selected for different types of errors, or even for different specific errors of the same type.

It will be appreciated from the foregoing that the present invention represents a significant advance in the field of automated data searching. In particular, some of the invention's novel features are its ability to perform searches in retrospective and dissemination modes in the same apparatus, its use of character marks to control searching and shifting functions, and its ability to perform such novel search operations as reverse searching, lookahead searching, ignoring selected characters, and killing propagation of character marks. Other aspects and advantages of the invention will become apparent from the following more detailed description, taken in conjunction with the accompanying drawings.

BRIEF DESCRIPTION OF THE DRAWINGS

FIG. 1A is a simplified block diagram showing the manner or use of a search engine in accordance with the present invention;

FIG. 1B is a simplified block diagram showing the basic components of a single search cell used in the apparatus of the present invention;

DESCRIPTION OF THE PREFERRED EMBODIMENT

Figure 1:
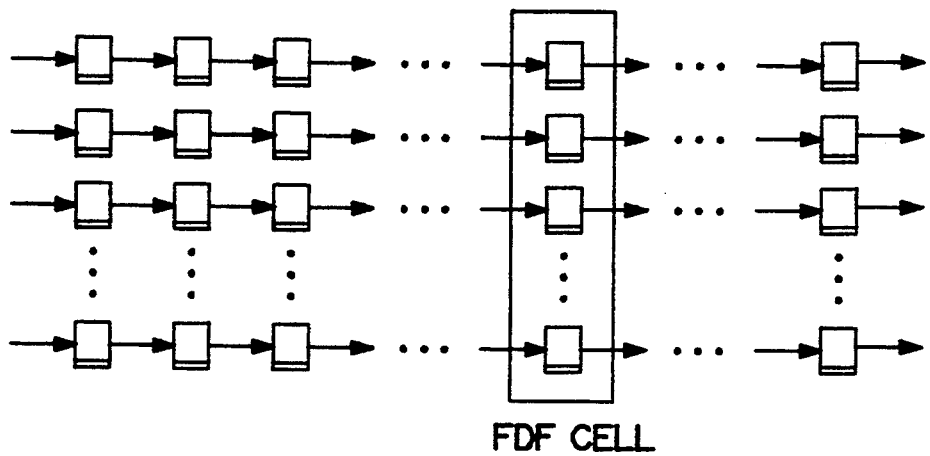
FIG. 1 is diagram illustrating the basic pipeline organization of a search engine in accordance with the present invention.

As shown in the drawings for purposes of illustration, the present invention is concerned with improvements in the field of data searching devices and methods. Prior approaches to data searching provided useful solutions to a number of problems relating to textual data searching, but still left much room for improvement. In accordance with the present invention, a generalized data searching engine provides a wide variety of search functions, many of which were not obtainable in data searching techniques available prior to the invention.

Overview:

As in other data searching approaches, the broadly defined function of the device of the present invention is to compare a user-defined data "pattern" with a "database" and to identify exact and inexact matches between the pattern and data sequences within the database. An important property of the invention is that it can conveniently handle two distinctly different modes of searching: the "retrospective" and the "dissemination" modes. In the retrospective mode, a large data base is streamed through a pipeline of search cells that have been configured to define the search pattern. Examples of retrospective searching include scanning libraries of medical journals to find information relating to the diagnosis and treatment of diseases, scanning court opinions to locate precedents in legal research, or scanning gene sequence data to locate interesting genetic features. In each application of this type, the search pattern, even from multiple users, is likely to be relatively small and can usually be accommodated in a string of search cells, such that only one pass of a large data base is needed.

In the dissemination mode of operation, multiple users each provide one or more interest profiles, each of which forms the basis for a search pattern. The profiles are then compared against each new publication that is received, and copies of the publication are disseminated to users for whom there is a match between the profile and the new publication. Instead of comparing a number of single requests against an existing database, as in retrospective searching, dissemination mode searching compares single publications against an existing "database" of search profiles. In effect, the role of the search pattern and the database are reversed in the dissemination mode of searching. One of the novel features of the present invention is that it can handle both retrospective and dissemination modes of searching without hardware modification.

FIG. 1A shows a basic system configuration for performing searches in accordance with the invention, including a search engine 10 having multiple, serially connected search cells 12, three of which are shown in the figure. In the retrospective mode of operation, a database is stored in a high-speed mass storage device, indicated at 14, and a search pattern is provided, as indicated at 16. Prior to performing the search, the pattern 16 is shifted into the search cells 12, as indicated by the broken line 18, and remains stationary in the cells during the search. Then the database is streamed through the cells, as indicated by the solid line 20, and various comparisons are made between the pattern and the database, such that data emerging from the search engine 10 contain the results of the comparisons, as indicated at 22. Alternatively, search results may be extracted anywhere in the string of cells. For convenience, the parameters of the search are predefined, as indicated at 24, using a logical programming language. Then a compiler, shown in block 26 interprets the programming language statements and converts them into appropriate code for storing in the search cells 12. In the retrospective mode of operation, the pattern definition derived from the compiler 26 is supplied to the search engine 10 over line 28, and then line 18.

In dissemination mode, the pattern, or a combination of patterns, are stored in the mass storage device 14 and the database is shifted into the search cells 12 (over line 18) prior to initiation of the search. In this mode, the search pattern is supplied from the compiler 26 over line 30 to the mass storage device 14. The compiler 26 is not a necessary part of the present invention, since the pattern can be formulated without a compiler, but some type of compiler is an obvious advantage when the search pattern definitions become complex.

Each of the search cells 12 includes, as shown in FIG. 1B, a set of shift register stages 34 through which database and pattern data elements are shifted, an arithmetic and logic unit (ALU) 36 for performing comparisons and other arithmetic and logical operations on the data in the shift register stages, and microcode storage 38 for holding all of the control codes associated with the pattern. The microcode determines the functions performed by the search engine. The shift register stages 34 and the microcode storage 38 in the presently preferred embodiment of the invention comprise a total of twelve bytes of storage in each cell 12, five of which are shift register stages and seven of which are for microcode storage.

In terms of hardware, the shift register stages 34 and the microcode storage 38 are similarly structured, and have input lines 40 from a neighboring cell located to the left, and output lines 42 connected to a neighboring cell located to the right. Depending on the mode of operation, some of the twelve data bytes in each cell 12 will be shifted from left to right under control of clock signals, some will remain stationary in the cell, and some may be shifted in the opposite direction. Specifically, during the retrospective search mode the bytes associated with the database will travel through the search cell pipeline from left to right, while those associated with the pattern will remain stationary within the cells. Some of the shift register stages 34 are associated with the database and some are associated with the pattern, as will be further explained. All of the microcode storage bytes are associated with the pattern. In the dissemination mode, the situation is reversed. Bytes associated with the database remain stationary and bytes associated with the pattern are shifted through the pipeline. Control of data movement is effected by shifting and decision logic 44 in each search cell 12.

The search engine hardware is completely defined by the specification of a single search cell 12 and by the manner in which multiple cells communicate with each other. Details of the structure of a single cell are more meaningful when one understands the manner in which the entire pipeline of cells will be used in various types of search operations. Therefore, the manner of communication between cells will be discussed in some detail before providing a more complete description of a single cell.

Communication between cells:

The search engine, as has been briefly described, has a number single-byte registers in each search cell 12. In the illustrative embodiment of the invention, there are twelve registers in each cell. Corresponding registers in each cell are connected in series to form a pipeline that is potentially twelve bytes wide. This is shown from a different perspective in FIG. 1, where a cell is indicated at 12, and the registers in each cell are indicated at 50. It will be seen that the connected cells form twelve large shift registers, only four of which are shown. As has also been briefly described, each cell also includes control and computation logic (the ALU 36 and the shifting and decision logic 44). By varying the rates at which values flow through the shift registers, and by manipulating the other logic in a suitable fashion, the search engine can be made to perform a variety of searching functions, some of which will be described in this specification by way of example.

For convenience, the database and the search pattern will be referred to as comprising information in the form of "characters." Although this terminology is suggestive of a textual database, it should be understood that the invention is equally well suited for searching other types of data, whether consisting of textual characters, numerical data, or symbols of some other type. In the figures to be described, the registers referred to by numeral 50 in FIG. 1 will, for simplicity, not bear a reference numeral in subsequent figures, since they appear many times and are always recognizable as a rectangular symbol. In some instances, for example in FIG. 2, the same symbol is used to depict multiple registers rather than a single register, but this distinction is clear from the context of the illustration.

The search engine operates by moving database characters and pattern characters through the pipeline. The two types of characters flow in opposite relative directions; more precisely characters of one type are stationary and characters of the other type are moved through the pipeline. In these illustrations, characters are shown as being moved through the pipeline from left to right. Several bytes (registers) are needed to load information associated with each database character, and likewise several bytes are needed for each pattern character.

Figure 2:
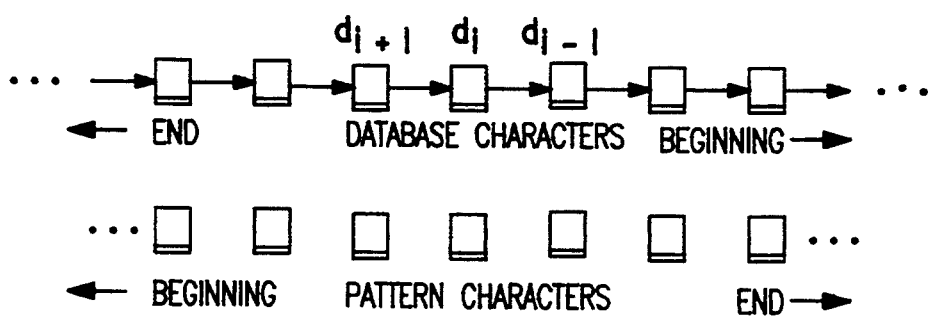
FIG. 2 is a diagram showing data flow in retrospective search mode.

The difference between the retrospective and dissemination modes of operation has already been discussed in general terms. FIG. 2 shows the retrospective mode. The database characters are shifted through the pipeline from left to right, with the logical beginning of the database string of characters entering the pipeline first. The pattern characters are stored in the pattern registers of the cells and remain stationary during the search, with the beginning of the pattern being located toward the left end of the pipeline.

Figure 3:
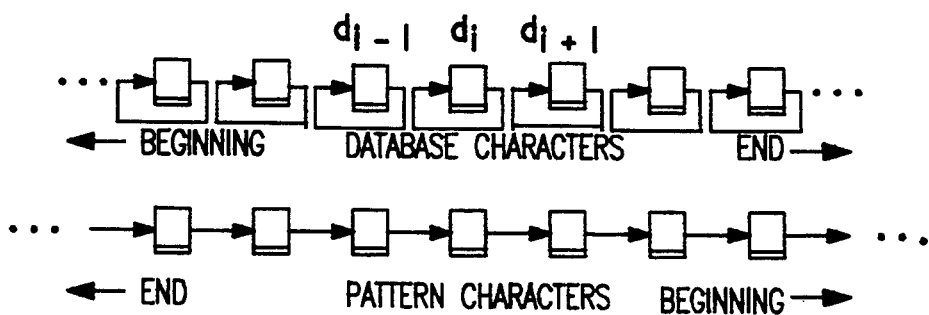
FIG. 3 is a diagram showing data flow in dissemination search mode.

FIG. 3 shows data flow in the dissemination mode of operation. In this case the database characters remain stationary and are stored with the beginning of the sting located toward the left of the pipeline. The pattern is shifted through the pipeline from left to right, with the beginning of the pattern entering the pipeline first.

In both modes of operation, the beginning characters of the database and the pattern are first to meet in a single cell. Comparisons are performed in much the same way in the two modes. Values associated with the pattern are determined prior to the search, by the pattern compiler if it is used, and remain the same during the search. These unchanging pattern values are either held stationary, in the retrospective mode, or are shifted from cell to cell, in the dissemination mode. In contrast, the values associated with the database are computed as the search proceeds and are therefore highly dynamic. The circuitry needed to manipulate them is correspondingly more complex.

There are basically two types of shifting circuitry that are called for. Shifting of the microcode bytes is a relatively simple matter because the microcode values are all determined prior the search and do not change during the search. Shifting is needed to initially store the microcode prior to a retrospective mode search, and to move the microcode from cell to cell during a dissemination-mode search. Since the data values in the microcode bytes do not change, shifting is simply a matter of clocking the bytes from one cell to the next. When shifting is not called fort as in the retrospective mode of operation, clocking signals are denied to the microcode bytes and they remain stationary. Shifting of database bytes is more complex because they contain some values that are modified as the search proceeds.

For purposes of description, the database can be thought of as a sequence of characters d. The ith character in this sequence is $d_i$, and the corresponding element of another parallel sequence is referred to as $m_i$. At any instant, $d_i$ and $m_i$, together with the ith elements of other sequences associated with the database, occupy the same search cell. In dissemination mode, when the database remains fixed in the pipeline, character $d_{i-1}$ is in the cell immediately upstream from the one holding $d_i$, and character $d_{i+1}$ is in the cell immediately downstream. Similarly, in retrospective search mode, when the database travels through the pipeline, character $d_{i-1}$ is in the cell immediately downstream of the one holding character $d_i$, and character $d_{i+1}$ is immediately upstream. These cell assignments are indicated in FIGS. 2 and 3. Notice that the order in which individual database and pattern characters meet in individual cells is the same, regardless of whether the pipeline is operating in dissemination or retrospective mode.

A search using the search engine of the invention can be characterized as a process in which a sequence of values is modified as it proceeds through the pipeline, as a result of computations performed in each cell. Consequently, a basic operation is the computation of a new sequence from an old one. The arithmetic unit in each cell handles all byte-size comparisons and arithmetic operations. A new sequence m' can be defined in terms of an existing sequence m and the value AU produced by the arithmetic unit.

$$m'_i = \left\{ \begin{array}{l} m_i \text{ if Change} = 0; \\ AU \text{ otherwise} \end{array} \right\}$$

Change is a condition derived from the microcode that tells whether to accept a new value or to maintain the present value of m. Other microcode bits control the configuration of the arithmetic unit to determine the value of AU.

Figure 4:
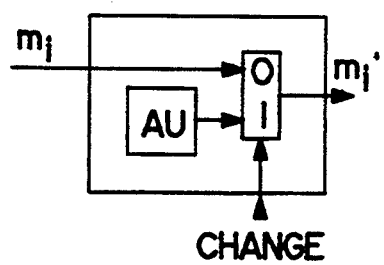
FIG. 4 is a diagram of a change circuit that can retain an old value or accept a new one.
Figure 5:
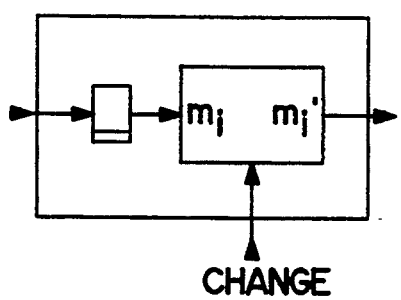
FIG. 5 is a diagram showing the change circuit of FIG. 4 configured for retrospective mode searching.
Figure 6:
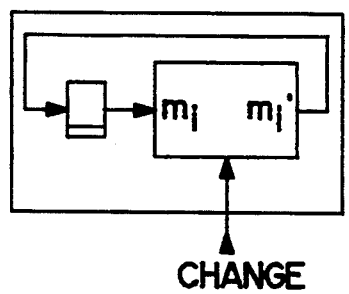
FIG. 6 is a diagram showing the change circuit of FIG. 4 configured for dissemination mode searching.

A circuit that computes $m'_i$ from $m_i$ and the result of the arithmetic unit appears in FIG. 4. This combinational circuit includes a 2:1 multiplexer, in which the Change signal selects between the unchanged $m_i$ value and the value AU provided by the arithmetic unit. The disposition of the new value will depend on the search mode. In retrospective mode, the new value m' is to be shifted into the next downstream cell, but in dissemination mode the new value m' is to remain in the current cell. FIGS. 5 and 6 illustrate this point. FIG. 5 shows that the new value $m'_i$ is made available for output toward a neighboring cell to the right. FIG. 6 shows that the new value is returned to the same register from which the old value was derived.

Figure 7:
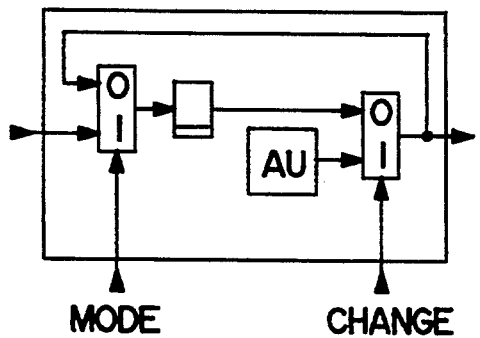
FIG. 7 is a diagram of a change circuit that can be configured either for retrospective or dissemination modes.

FIG. 7 illustrates a circuit that is effective in both modes of operation. It includes an additional multiplexer having a Mode input signal that determines whether the cell register accepts input from the upstream neighboring cell, as in the retrospective mode, or from the new value computed in this cell, as in the dissemination mode. The Mode signal is a global control signal.

Figure 8:
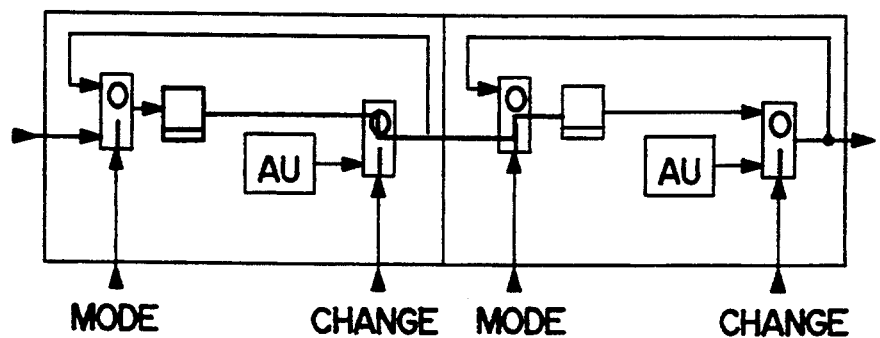
FIG. 8 is a diagram showing the change circuit of FIG. 7 configured to perform a no-operation in retrospective search mode.
Figure 9:
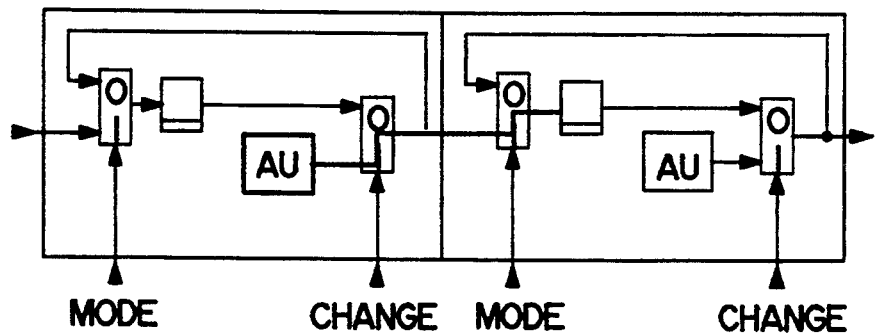
FIG. 9 is a diagram showing the change circuit of FIG. 7 configured to perform a change operation in retrospective search mode.
Figure 10:
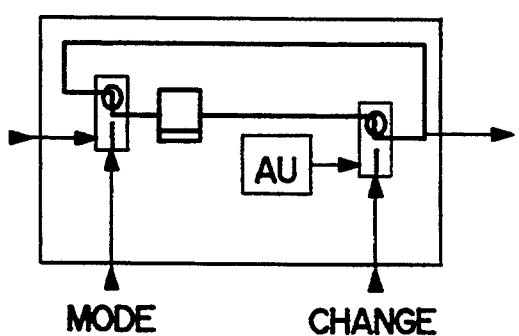
FIG. 10 is a diagram showing the change circuit of FIG. 7 configured to perform a no-operation in dissemination search mode.
Figure 11:
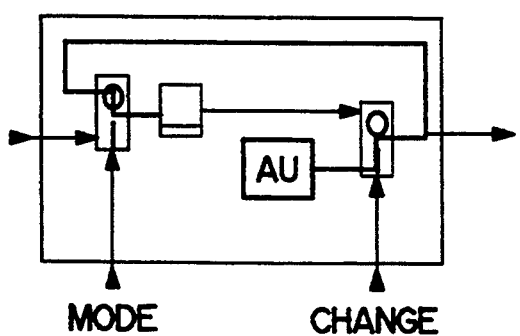
FIG. 11 is a diagram showing the change circuit of FIG. 7 configured to perform a change operation in dissemination search mode.

FIGS. 8-11 show how this basic change circuit is used in operations in both modes. The dark line indicates the data flow in each instance. In FIG. 8 there is no change in the data value, which flows from one cell to the next in retrospective mode. In FIG. 9, a new value computed in one cell is flowed to the next cell in retrospective mode. In FIG. 10, there is no change in the data value that is retained for use in the same cell, in dissemination mode. In FIG. 11, a new data value is substituted for the old value in dissemination mode.

In the discussion thus far, a value such as the sequence m can follow a database character through the pipeline. But in order to implement some text searching functions, it must also be possible to shift values between adjacent database characters. For forward searching, values referred to as character marks must be propagated to the subsequent database character position, while for reverse searching they must be moved to the preceding character position. The reason for this is apparent from a consideration of a simple searching process. For example, if a first character of the pattern finds a match with a database character d, this may be of no concern at all unless the second character of the pattern matches database character $d_{i+1}$, and the third pattern character matches $d_{i+2}$, and so forth. The entire matching sequence can only be determined if a character mark relative to the first character is passed to the second character. Then, if there is a second-character match, a mark will be propagated to the third character, and so forth. The process of passing values from one database character to another is further complicated by operations referred to as ignore and kill, which may require values to be modified as they move between characters.

The function that describes what it means to shift a value to the subsequent database character may be defined as:

$$m'_i = \left\{ \begin{array}{ll} x_{i-1} & \text{if kill}_i = 0; \\ 0 & \text{otherwise.} \end{array} \right\}$$

where $$x_i = \left\{ \begin{array}{ll} m_i & \text{if ignore}_i = 0; \\ \left\{ \begin{array}{ll} x_{i-1} & \text{if kill}_i = 0; \\ 0 & \text{otherwise.} \end{array} \right\} & \text{otherwise.} \end{array} \right\}$$

$$= \left\{ \begin{array}{ll} m_i & \text{if ignore}_i = 0; \\ m'_i & \text{otherwise.} \end{array} \right\}$$

Figure 12:
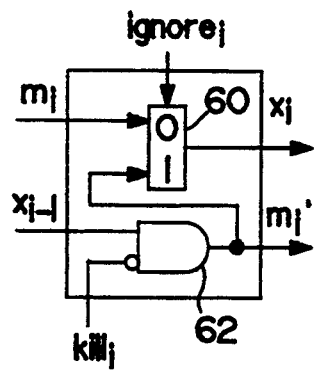
FIG. 12 is a diagram of a circuit that can shift a data value to the right.

This function is referred to as "shift right" because it causes values to move to the right when the database is written from left to right on the page. FIG. 12 depicts a combinational circuit that computes $m'_i$ and $x_i$ from $m_i$ and $x_{i-1}$. Basically this circuit includes only a multiplexer 60 and an AND gate 62.

It is appropriate to point out that the logic circuits shown symbolically in FIG. 12 and other figures as simple one-bit components, such as the AND gate 62, are in fact byte-wide circuits. The symbols x and m represent quantities such as textual characters in the illustrative embodiment of the invention. Therefore, these values are all one-byte quantities, and circuits such as the apparently simple AND gate 62 have byte-wide inputs and outputs, as well as control signal inputs, such as the kill signal applied to the AND gate.

The multiplexer 60 has ignore$_i$ as its control signal, and m$_i$ for output as x$_i$ if the ignore signal is zero. Otherwise the output selected is m'$_i$, which is derived from the output of the AND gate 62. The inputs to the AND gate are x$_{i-1}$ on one terminal and the inverted form of kill$_i$ on the other terminal. Thus, if the kill signal is zero x$_{i-1}$ is selected for output as x$_i$. If the kill signal is nonzero, a zero output is supplied as x$_i$. This is all consistent with the equations given above.

Figure 13:
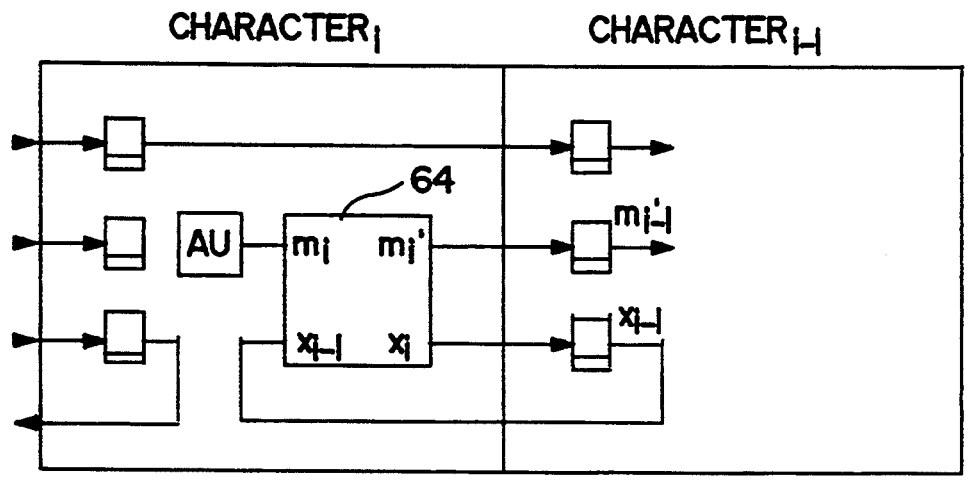
FIG. 13 is a diagram of a circuit for shifting to the right in retrospective search mode.
Figure 14:
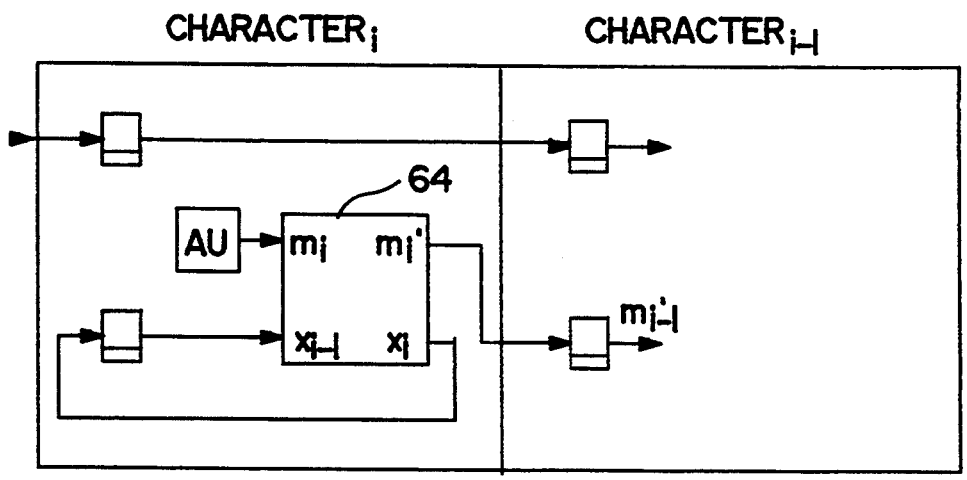
FIG. 14 is a diagram of a further improved circuit similar to FIG. 13 for shifting to the right in retrospective search mode.

Implementation of the shifting function requires that the circuit of FIG. 12 be connected to the cell's registers. Again, the connections depend on whether the pipeline is operating in the retrospective mode or the dissemination mode. FIG. 13 shows one form of connection for a retrospective mode search. The shifting circuit of FIG. 12 is indicated at 64, portions of the cells containing characters i and i−1 are shown. The kill and ignore signals are omitted for clarity. The changed output m$_i$ is carried to the next character (i−1), where it is referred to as m$_{i-1}$, and the x$_i$ output is likewise carried into the next cell as x$_{i-1}$. This value can be obtained for looping back into the x$_{i-1}$ input to the circuit 64. While this circuit is in accordance with the right-shifting logic, it is in inefficient in its use of two byte registers in each cell. An improvement is possible if the arrangement of FIG. 14 is followed. Here the x$_i$ output of the circuit 64 is simply looped back into a byte register in the current cell, i.e. the ith cell.

Figure 15:
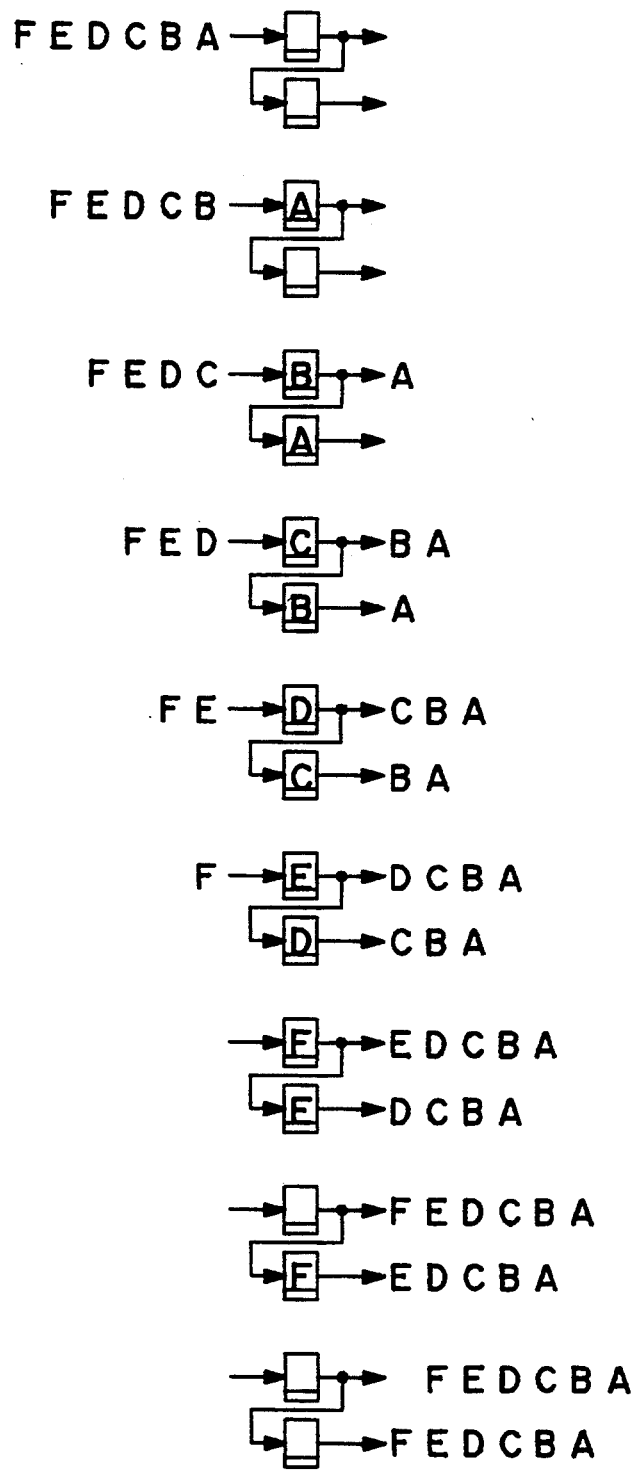
FIG. 15 is a diagram giving an example of a right shift operation performed on a simple database, in retrospective search mode.

FIG. 15 provides an example of right-shifting in the retrospective mode, using the improved circuit of FIG. 14. A database entering a search cell is indicated by the letters A, B, C, and so forth, flowing from left to right across the top of the cell, and the shifted values are available at the bottom output of the cell. When the ignore and kill signals are zero, indicating that these functions are inactive, the output m'$_i$ is x$_{i-1}$, which is derived from the prior value of x$_i$, which is m$_i$. The cell produces both the shifted an unshifted values of the database. This function is useful for efficiently implementing an error tolerance in a search where adjacent elements of a sequence are to be compared.

Figure 16:
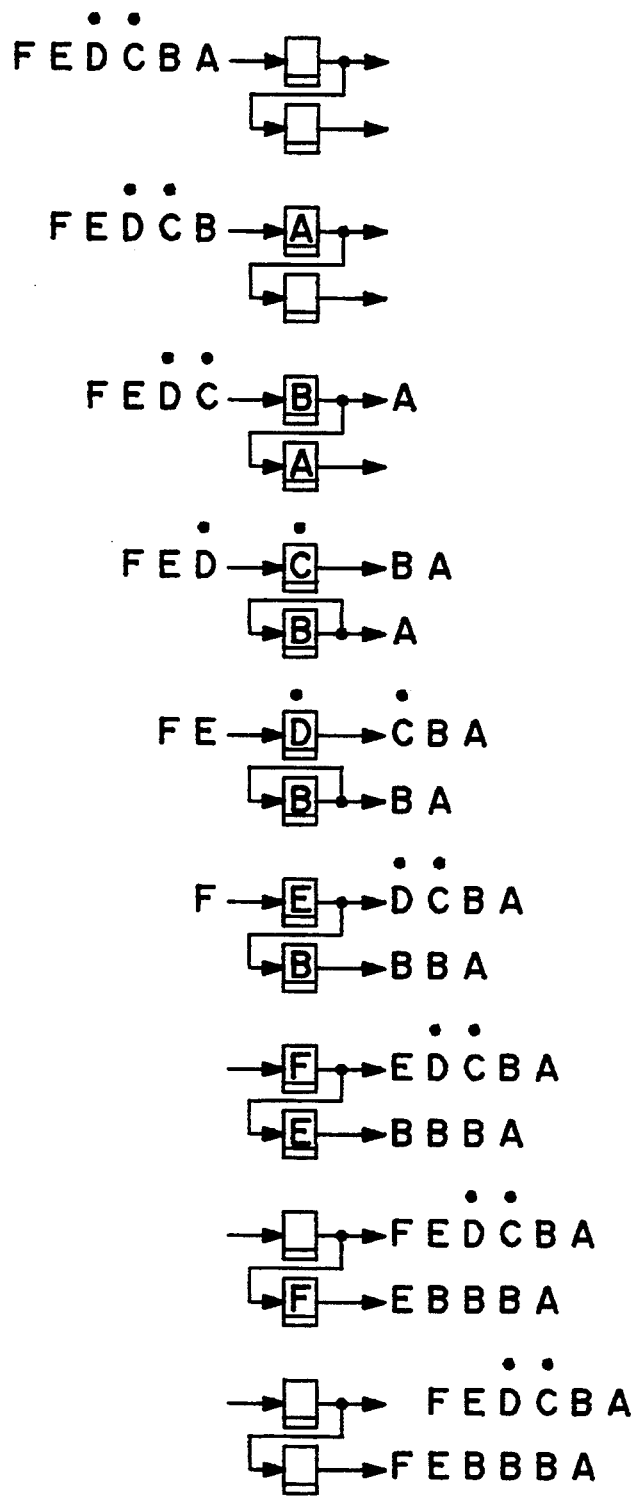
FIG. 16 is a diagram similar to FIG. 15, but including ignored characters in the database.

FIG. 16 is a further example of this type of processing, where some of the database characters are marked as ignored, indicated in the figure by the black dot over the letter. In this example, C and D are marked as being ignored. As might be expected, the original sequence is reproduced at the top of the cell. The output m'$_i$ is again x$_{i-1}$, since the kill signal is still zero; and x$_{i-1}$ is derived from the prior value of x$_i$, which, when the ignore signal is nonzero, is m'$_i$. That is to say, the output m'$_i$ remains the same, as reflected in FIG. 16 when the ignored letter C enters the cell. Thus the lower output of the cell produces an additional letter B when processing the ignored C and D characters.

Figure 17:
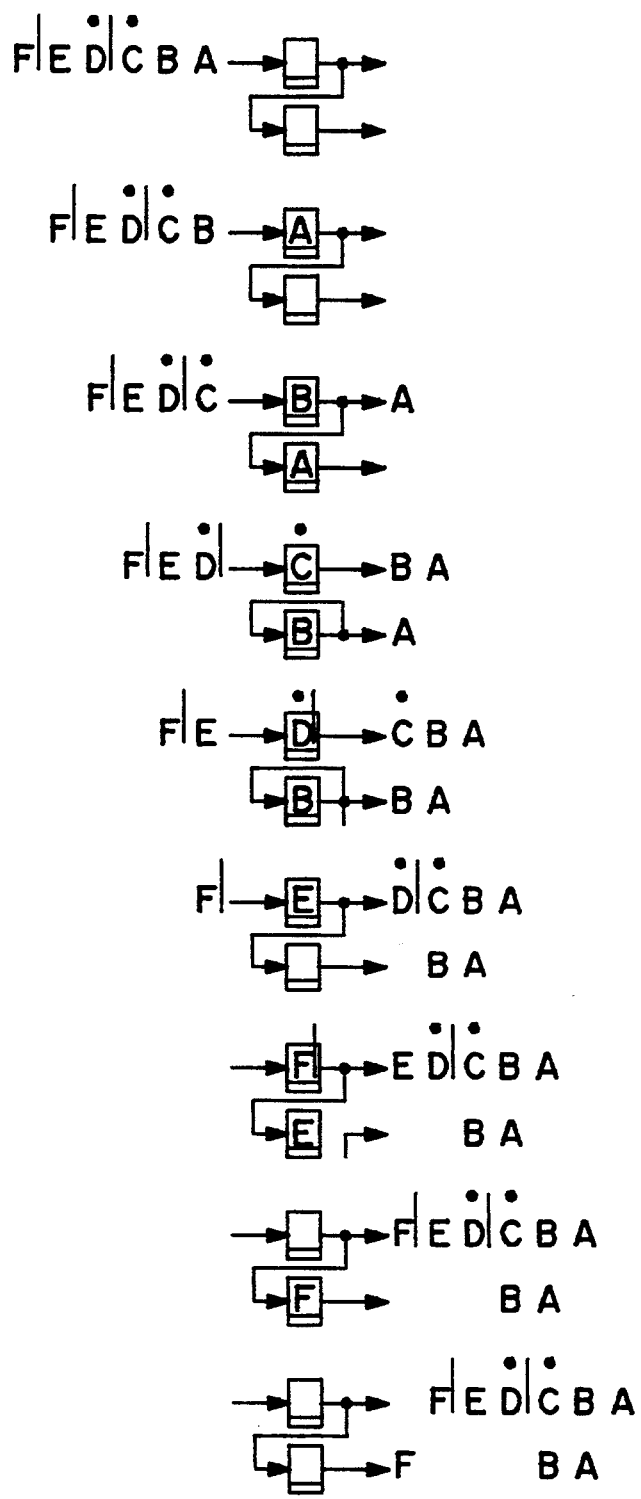
FIG. 17 is a diagram similar to FIG. 16, but including "kill" boundaries in the database.

FIG. 17 carries the example one step further, including a "kill" boundary associated with letter D, and another associated with letter F. When the ignored C character reaches the cell, the B character in the lower register shown is recycled, i.e. stays in the same register for the next clock cycle. When the next character, D, reaches the cell, the kill signal associated with it causes the lower register to be cleared to zero on the next following clock cycle. When the E character reaches the cell, a blank character is output from the lower register, following the previously output A and B characters. When the F character reaches the cell, another blank character is output and the kill signal again breaks the connection between the lower register and its output line. Thus, a third blank is output on the subsequent cycle, but the F character goes into the lower register, and is output on the next cycle, following the blanks.

Figure 18:
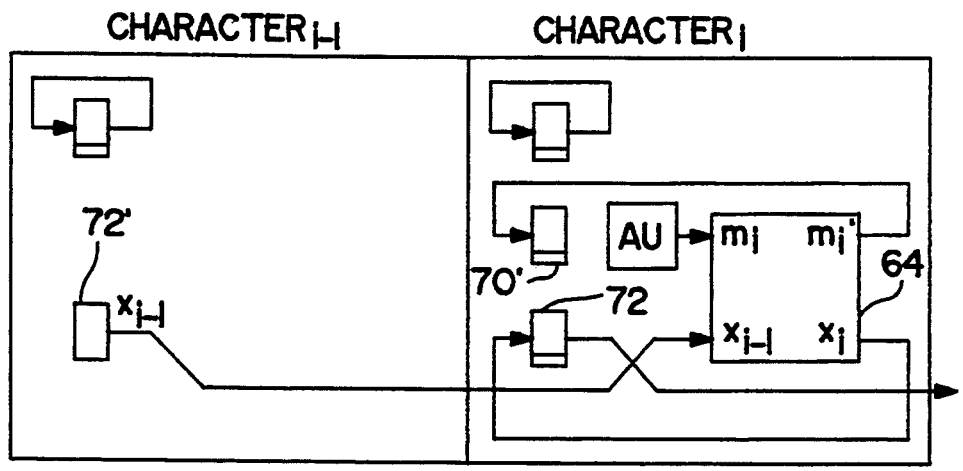
FIG. 18 is a diagram of a circuit for shifting right in dissemination search mode.
Figure 19:
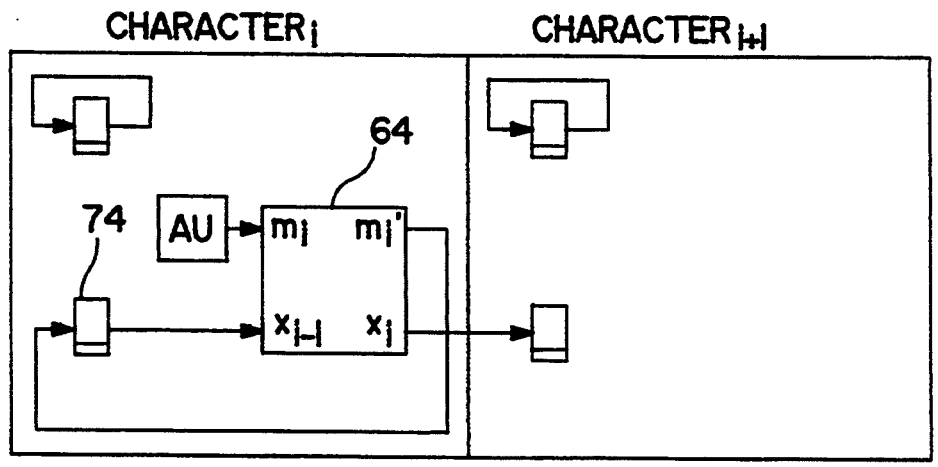
FIG. 19 is a diagram of a further improved circuit similar to FIG. 18, for shifting right in dissemination search mode.

In the dissemination mode, the connections between a cell's registers and combinational logic for performing the shifting function are different from those used in the retrospective mode. FIG. 18 shows a straightforward approach in which the value of x$_{i-1}$ is taken from the cell holding database character d$_{i-1}$. Here the right-shift circuit 64 in the character i position has its m'$_i$ output connected to a register 70 in the same cell, and has its x$_i$ output connected to a register 72 in the same cell. The x$_{i-1}$ input is derived from a corresponding register 72' in the character (i−1) position. The state of the register 72 is fed forward to the other neighboring position (i+1), which is not shown in the drawing. An improved and more storage-efficient version of this circuit is shown in FIG. 19, in which the functions of registers 70 and 72 are combined and only one register 74 is needed. The m'$_i$ output is connected to register 74, which also supplies the x$_{i-1}$ input to the circuit 64. The x$_i$ output of the circuit 64 is fed forward to the neighboring i+1 character position.

Figure 20:
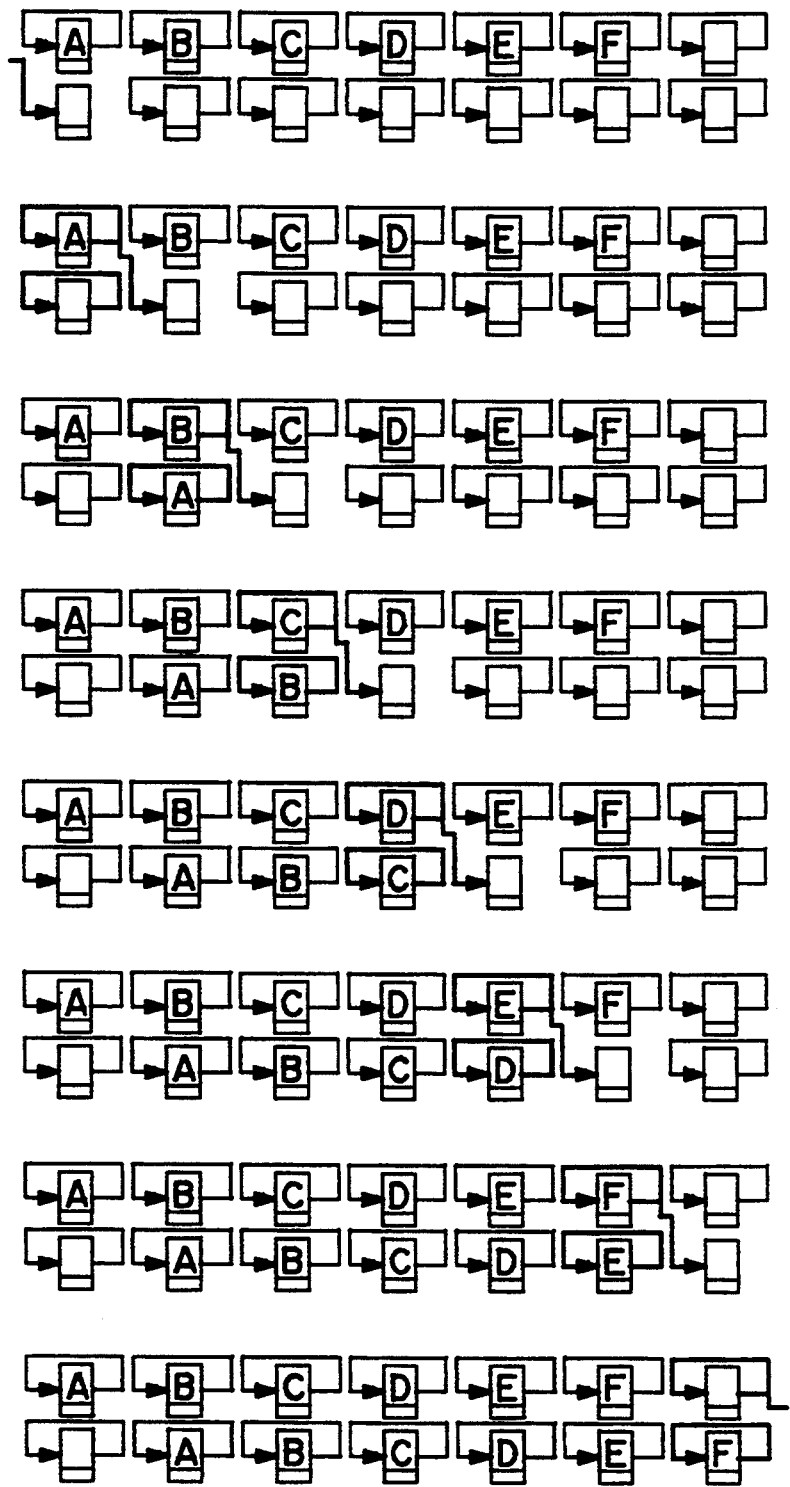
FIG. 20 is a diagram giving an example of a right shift operation performed on a simple database, in dissemination search mode.
Figure 21:
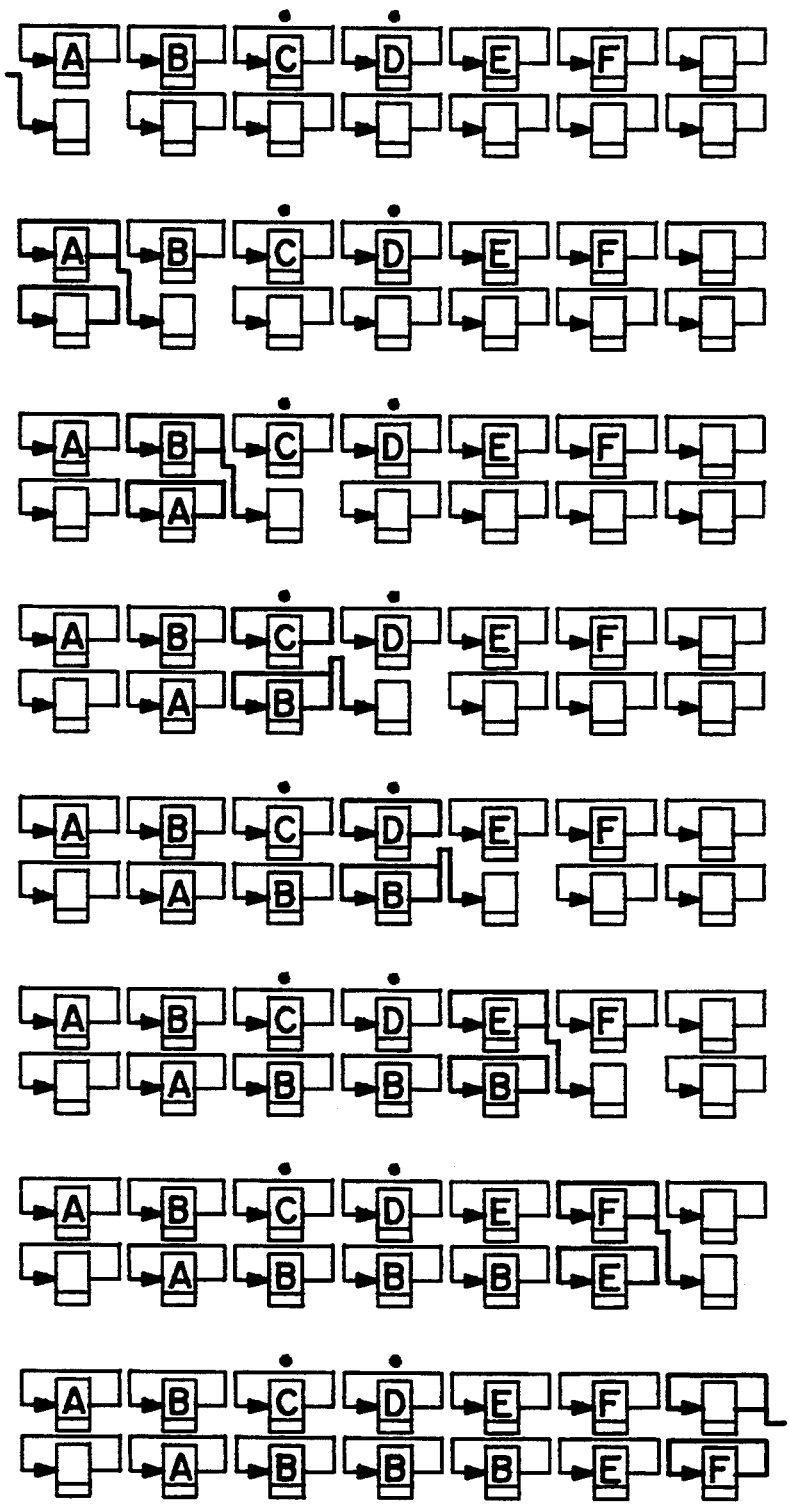
FIG. 21 is a diagram similar to FIG. 20, but including ignored characters in the database.
Figure 22:
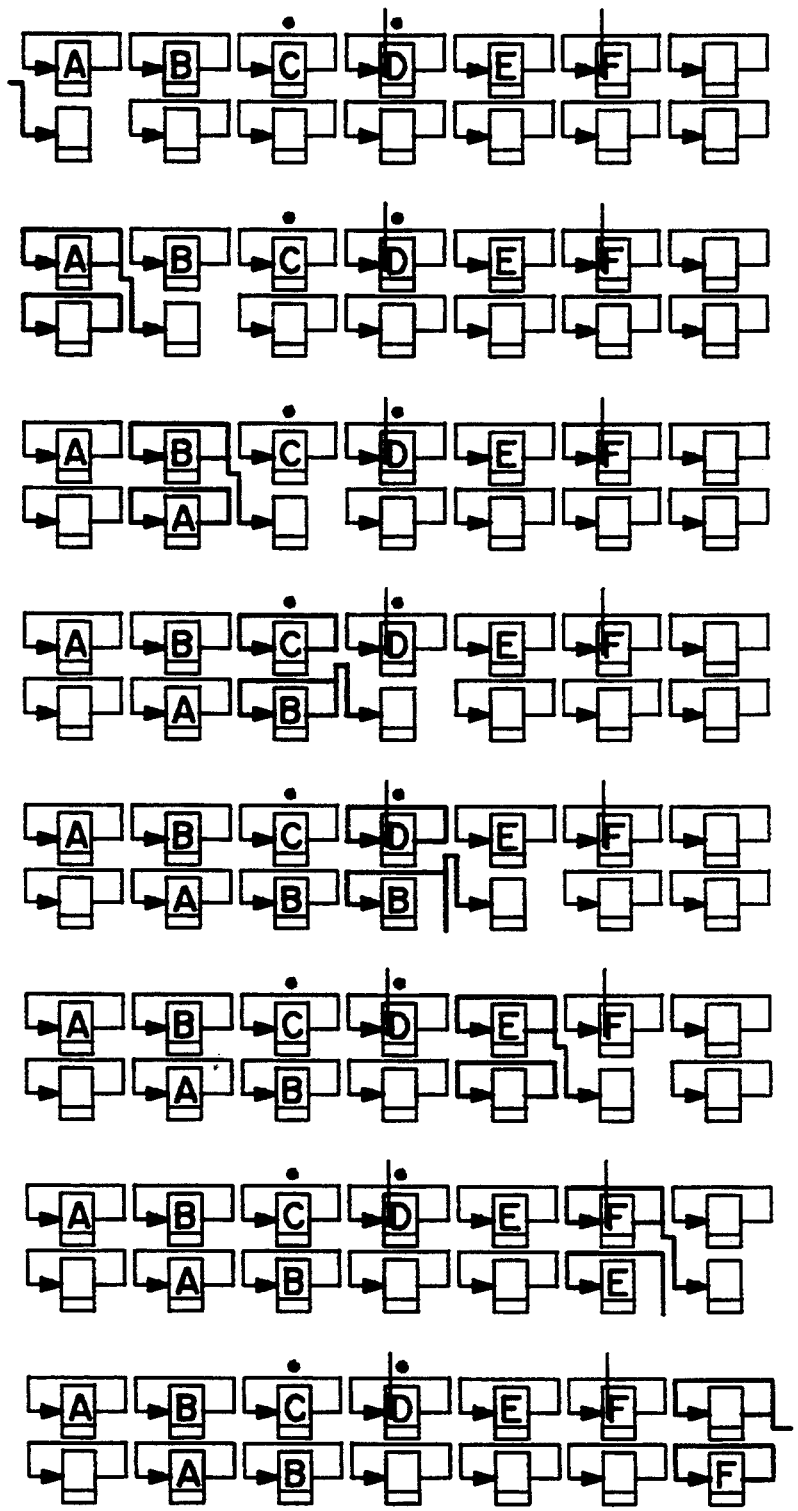
FIG. 22 is a diagram similar to FIG. 21, but including kill boundaries in the database.

FIGS. 20–22 show the effect of this right-shift circuit on a sample database (the letters A–F), operating in dissemination mode. In FIG. 20, neither ignore nor kill functions are in effect. As data flows through the pipeline, and as indicated by the highlighted data flow paths, a right-shifted sequence is generated in the lower row of registers. In FIG. 21, the same sequence is processed by the right-shift circuit,but the characters C and D are flagged as characters to ignore. As in the retrospective mode case, when the ignored characters are processed, duplicates of the last-shifted character (B) are generated in the shifted sequence, which then reads A,B,B,B,E,F. In FIG. 22, a kill signal is generated at the D and F characters, in addition to the ignore signals associated with the C and D characters. The A and B characters are shifted as before, then the ignored C character results in the generation of an additional B character in the shifted string. However, the kill signal at character D clears the second B character and clears the following two character positions. The final kill signal results in the generation of an F in the shifted sequence.

The function of shifting right, in either operation mode, can be used to implement regular forward searching. For reverse searches, i.e. scanning backwards from the end of the pattern to the beginning, the ability to shift in the opposite direction must also be provided. That is to say, there must be a left shifting function, wherein a value in each database character is propagated to the immediately preceding character position. Formally, this Operation can be described by the expression:

$$m_i = \left\{ \begin{array}{ll} m_{i+1} & \text{if kill}_{i+1} = 0; \\ 0 & \text{otherwise.} \end{array} \right\}$$

Figure 23:
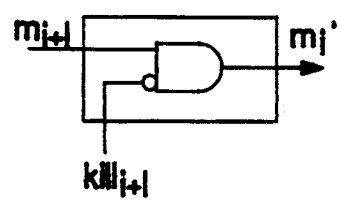
FIG. 23 is a diagram of a circuit that can shift a data value to the left.
Figure 24:
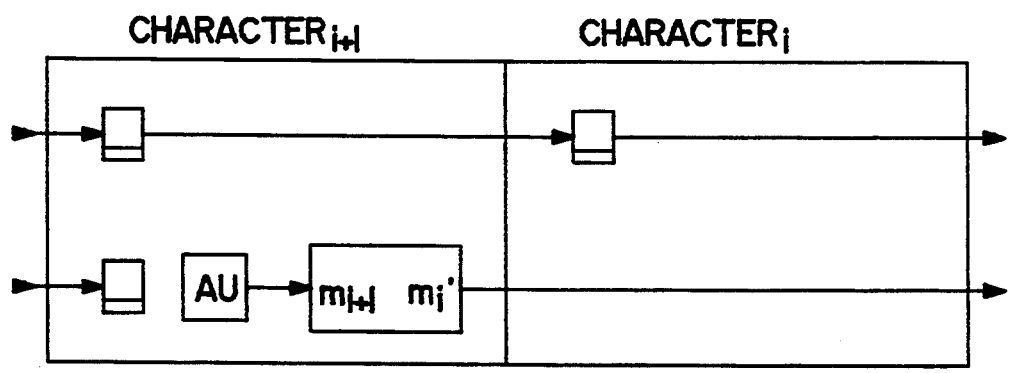
FIG. 24 is a diagram of a circuit for shifting left in retrospective search mode.

The search engine cannot handle ignored characters during a reverse search, so the value of the ignore flag does not appear in this definition of left shifting. FIG. 23 is a simple combinational circuit that implements the definition, and it will be seen to be a simple AND gate with one input carrying the m$_{i+1}$ signal and the other input carrying the inverted kill signal. The output is the $m'_i$ signal. As in the case of the shift right operation, the relationship between the storage cell and the combinational logic for implementing a left shift are different in the retrospective and dissemination modes of operation. FIG. 24 shows how two adjacent cells cooperate to implement a left shift in retrospective mode. So long as there is no kill signal in the i+1 character position, the $m_i$ value is propagated forward in such a way as to skip one character position, thereby effecting the shift in retrospective mode.

Figure 25:
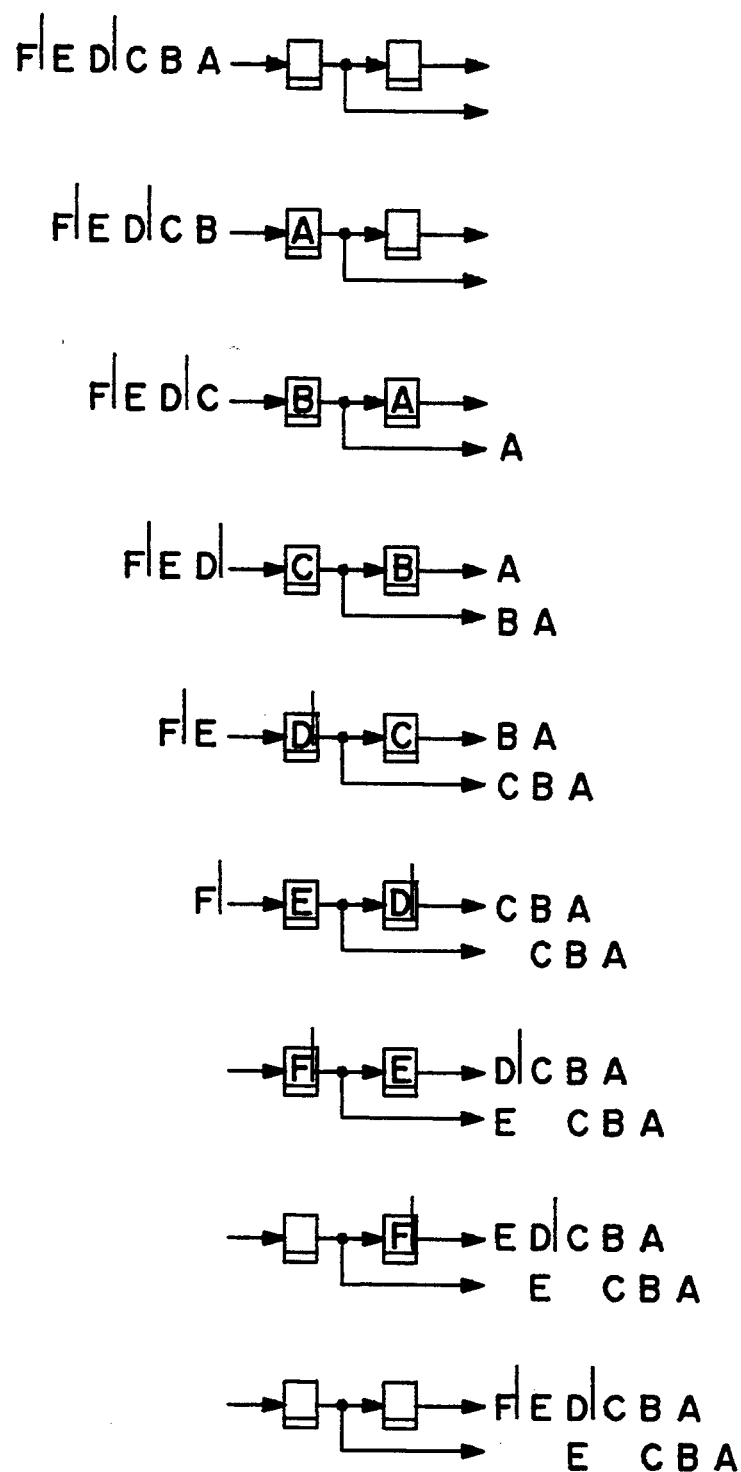
FIG. 25 is a diagram giving an example of a left shift operation performed on a simple database including kill boundaries.

FIG. 25 is an example of a left shift in retrospective mode, with the vertical bars in the database indicating kill boundaries at the D and F characters. A left-shifted character sequence is generated in parallel with the original sequence, with blanks introduced in the shifted sequence at each kill boundary.

Figure 26:
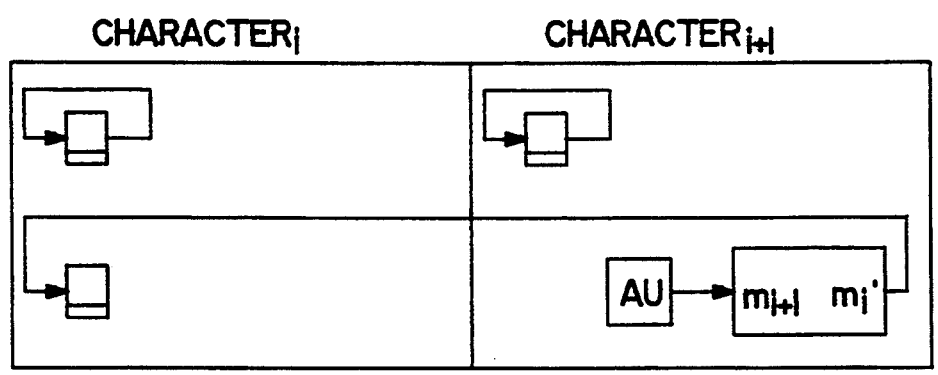
FIG. 26 is a diagram of a circuit for shifting left in dissemination mode.
Figure 27:
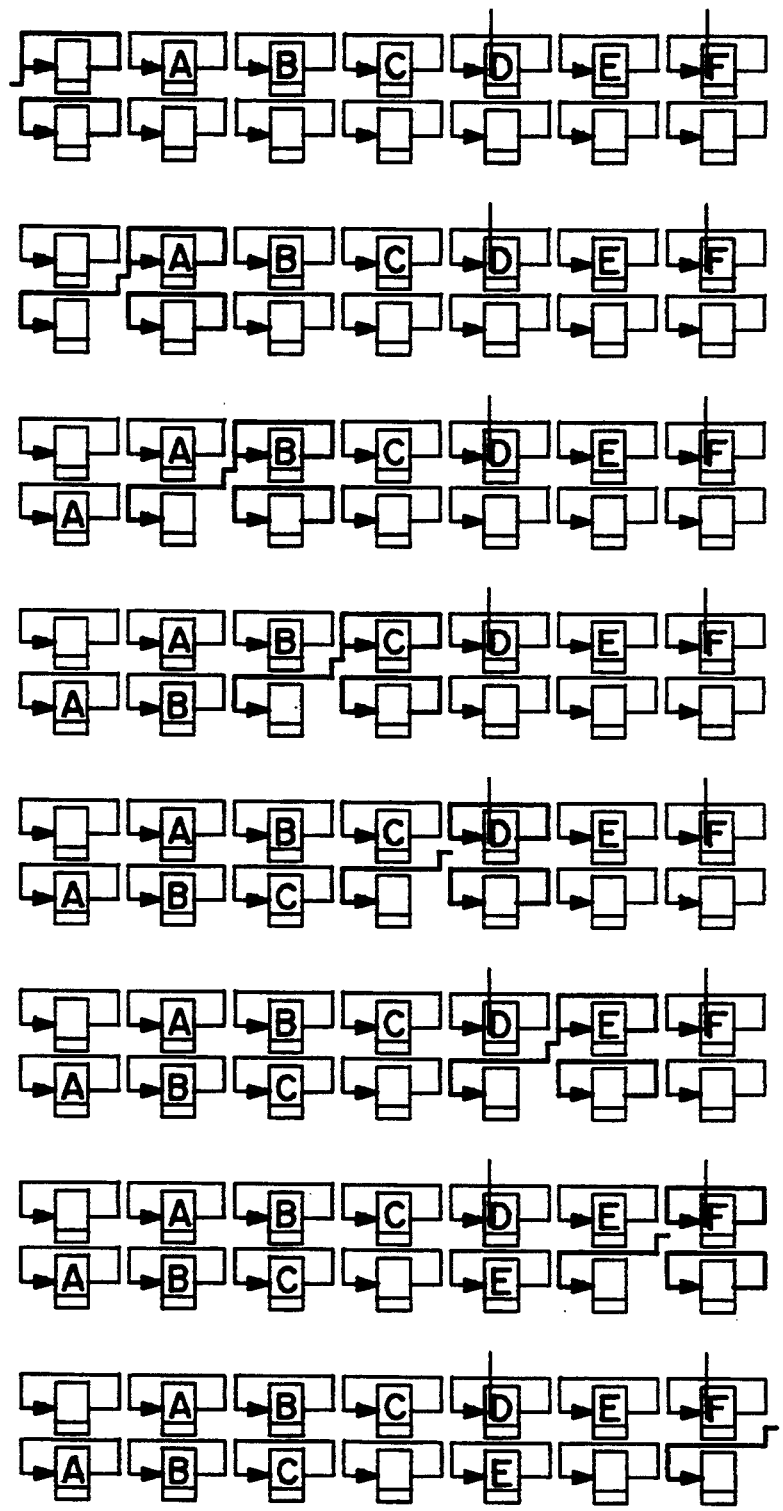
FIG. 27 is a diagram giving an example of a left shifting operation performed on a simple database including kill boundaries.

Shifting left in dissemination mode is shown in the implementation of FIG. 26. Since the database characters are stationary, the m value has simply to be propagated one character position to the left if there is no kill signal in the i+1 character position. FIG. 27 shows the effect of left shifting on a database in the dissemination model, using the letters A–F, with kill boundaries at the D and F characters. A left-shifted sequence is generated in the lower row of registers, until a kill boundary is reached, which results in the generation of a blank character in the shifted sequence. Thus the shifted sequence is $A,B,C_{13},E_{13}$.

Figure 28:
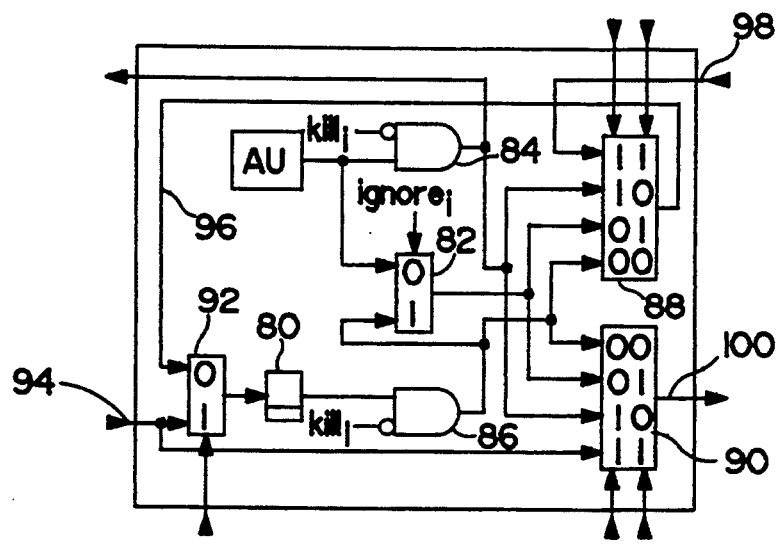
FIG. 28 is a diagram of a universal circuit for performing no-operation, change, shift left, and shift right operations in retrospective search mode or dissemination search mode.

The circuits described thus far, for performing no-operation, change, shift right and shift left, in either of the two modes, have been specific to the type of operation performed and to the mode of operation. FIG. 28 is a universal circuit that can perform any of the described operations, in either of the two modes. The circuit has a single register 80, a 2:1 multiplexer 82 to take into account the effect of the ignore signal, two AND gates 84, 86 to take into account the effect of the kill signal, two 4:1 multiplexers 88, 90, and an additional 2:1 multiplexer 92, which determines the input source for the register, either from an input line or from a line 96 deriving a value from multiplexer 88. The latter value may be either a recirculated value from the register itself, a new value generated by the arithmetic unit, or a value shifted from an adjacent cell position over line 98. Thus the multiplexer 88 functions to select a value to feed back to the register 80. The multiplexer 90 functions to select a value to output on line 100 to an adjacent cell position. This may be a value derived directly from the register 80, a value fed from input line 94 but bypassing the register, or a new value derived from the arithmetic unit. Output line 102 from the AND gate 84 is for the purpose of transmitting a new value from the arithmetic unit to an adjacent cell position, in some left shifting operations.

How the circuit of FIG. 28 operates in the two modes and for the various functions is best shown by further examples. FIGS. 29 through 36 show in highlighted form the exact circuit configurations for each operation and mode. Control of the circuit is effected by control lines to the multiplexers 88, 90 and 92, as well as by the ignore and kill control signals. All of these signals are obtained from microcode associated with each cell, to configure the circuit automatically to perform the desired function.

Figure 29:
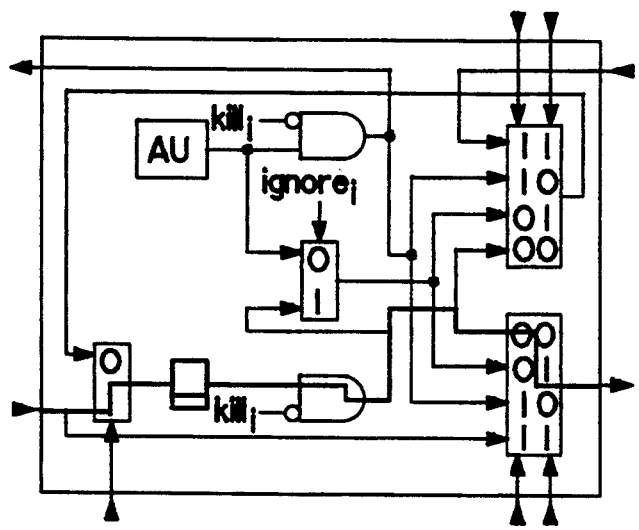
FIG. 29 is a diagram similar to FIG. 28, with highlighting indicating data flow for a no-operation in retrospective search mode.
Figure 30:
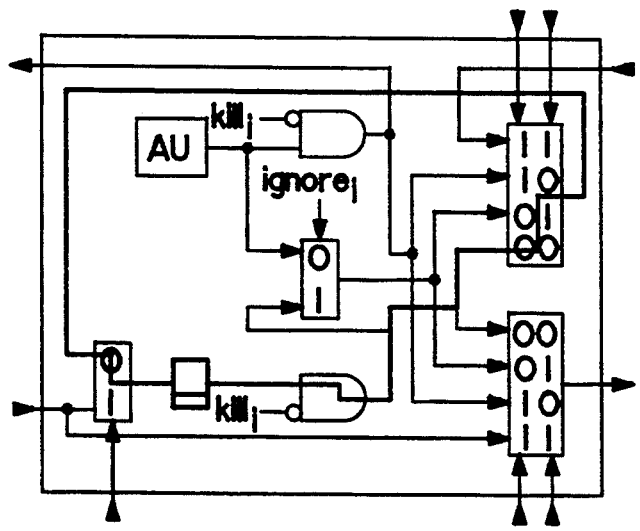
FIG. 30 is a diagram similar to FIG. 28, with highlighting indicating data flow for a no-operation in dissemination search mode.
Figure 31:
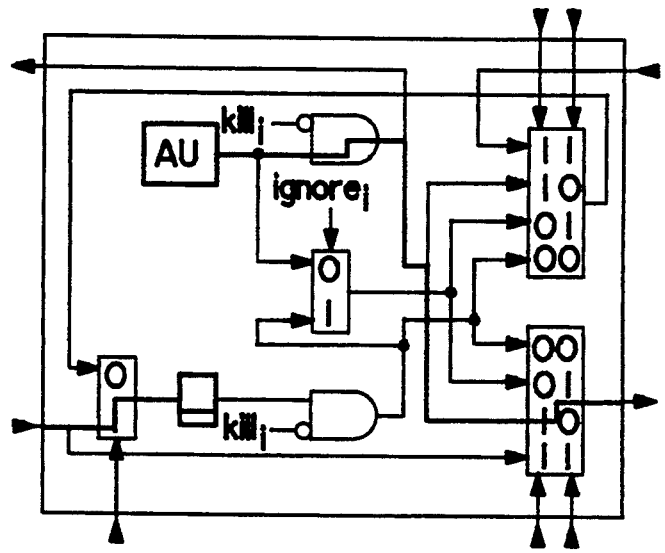
FIG. 31 is a diagram similar to FIG. 28, with highlighting indicating data flow for a change operation in retrospective search mode.
Figure 32:
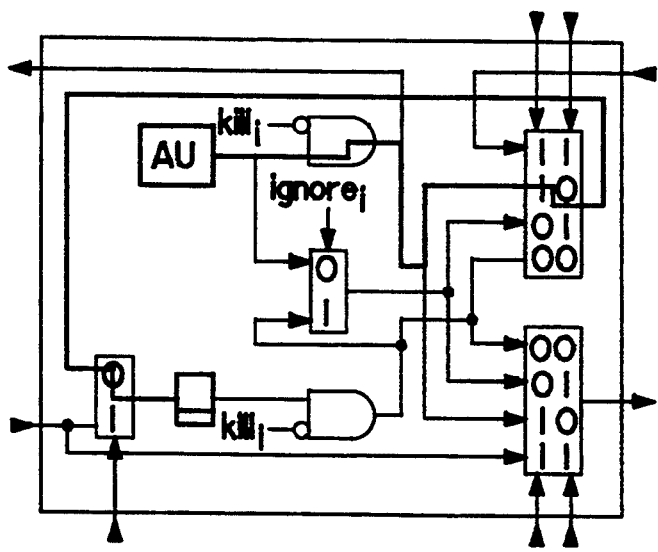
FIG. 32 is a diagram similar to FIG. 28, with highlighting indicating data flow for a change operation in dissemination search mode.

FIG. 29 shows a "no-op" function of the circuit in retrospective mode, wherein a data value is simply shifted through the cell from input line 94 to output line 100. Similarly, FIG. 30 shows the no-op function for the dissemination mode, wherein the data value is recirculated within the cell. FIG. 31 shows a change operation in retrospective mode. A new value computed in the arithmetic unit is output on line 100, while another value is input to the register 80 over input line 94. FIG. 32 shows a change operation in dissemination mode. A new value from the arithmetic unit replaces the existing value in the register 80.

Figure 33:
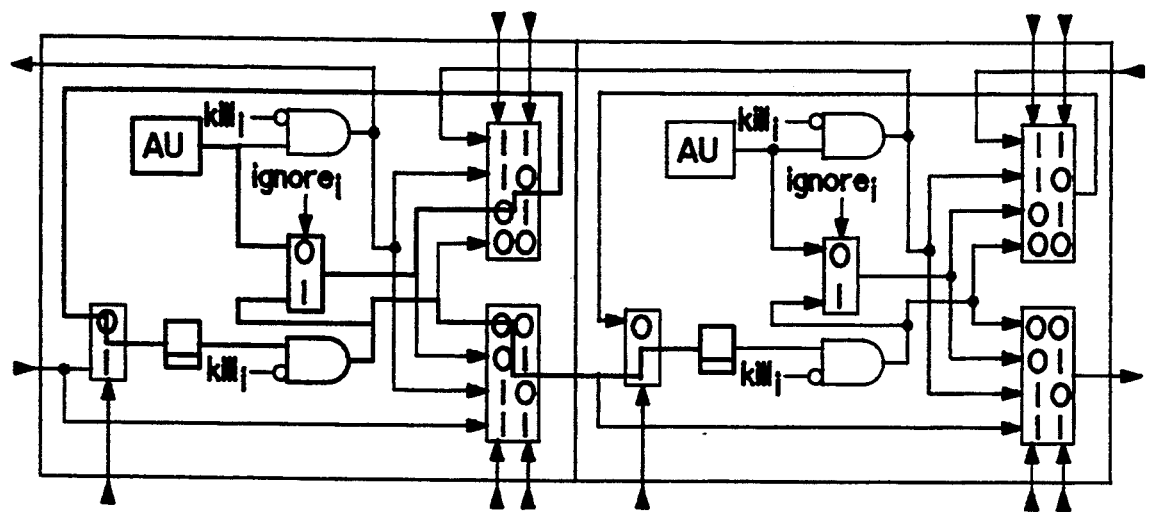
FIG. 33 is a diagram including two of the circuits of FIG. 28, with highlighting indicating data flow for a shift right operation in retrospective search mode.
Figure 34:
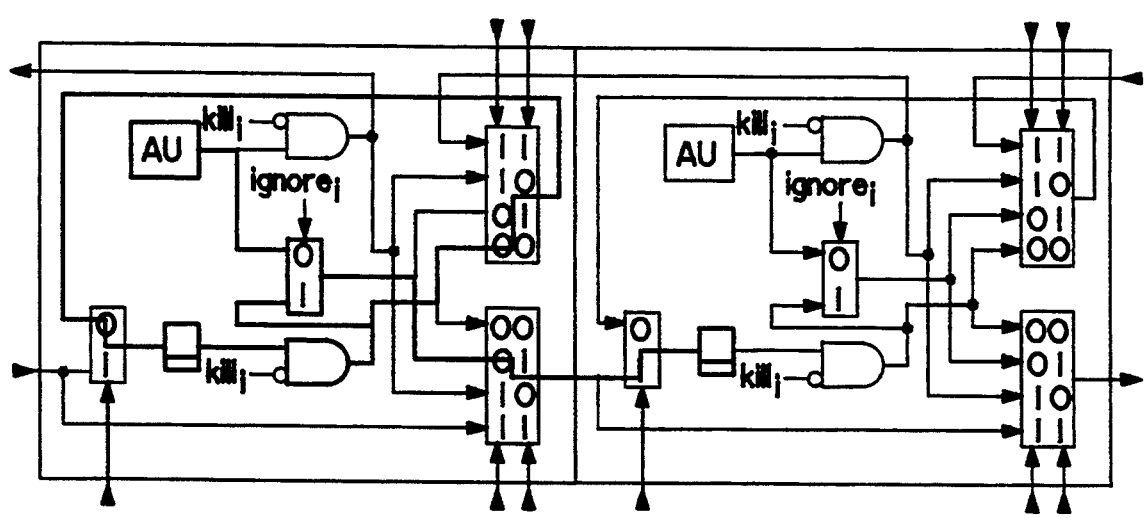
FIG. 34 is a diagram including two of the circuits of FIG. 28, with highlighting indicating data flow for a shift right operation in dissemination search mode.

The shift right operation in retrospective mode is shown in FIG. 33. This will be seen to be similar in operation to the previously described circuit of FIG. 14. The shift right operation in dissemination mode is shown in FIG. 34, and will be seen to be similar operation to the previously described FIG. 19.

Figure 35:
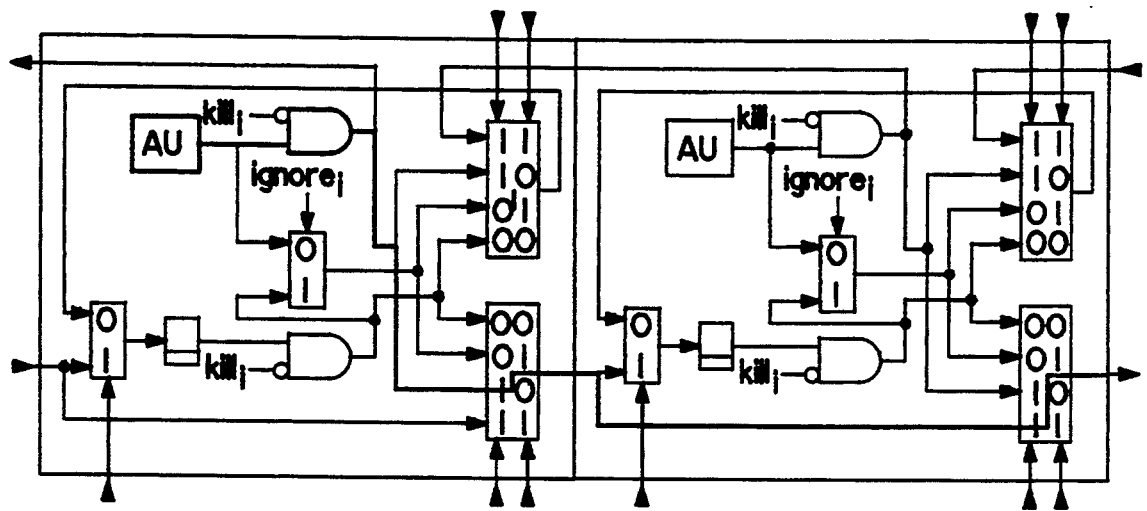
FIG. 35 is a diagram including two of the circuits of FIG. 28, with highlighting indicating data flow for a shift left operation in retrospective search mode.
Figure 36:
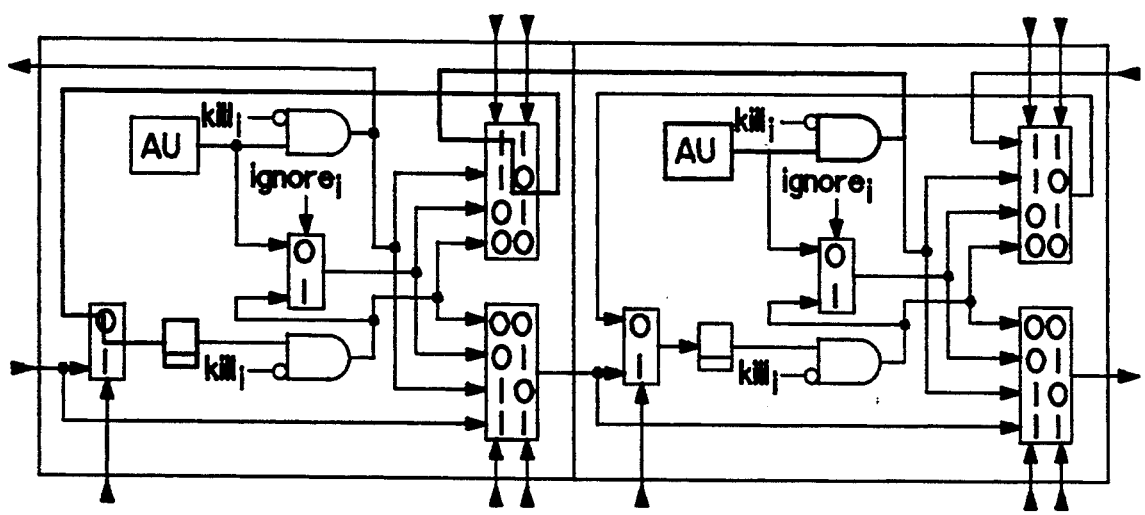
FIG. 36 is a diagram including two of the circuits of FIG. 28, with highlighting indicating data flow for a shift left operation in dissemination search mode.

FIGS. 35 and 36 show the shift left operation in retrospective and dissemination modes, respectively. These will be seen to be similar in operation to FIGS. 14 and 26, respectively.

Structure of a single search cell:

As described with reference to FIG. 1B, each search cell includes a number of one-byte registers. There are twelve such registers in the illustrative embodiment of the invention. The assignment of bits within each of the twelve registers is largely a matter of design choice, but some appreciation of the functions provided by the various flags and microcode is needed to gain a complete understanding of the invention. For convenience, the assignment and function of the various fields of the registers is discussed only briefly in this section. A complete description of the registers is provided in Appendix A to this specification. The appendix also contains a complete definition of the cell logic. Given the contents of a cell's registers, the states of signals forwarded from adjacent cells, and the states of various global control signals, the cell logic defines precisely how to compute the values that will be loaded into the registers at the next clock cycle.

The twelve cell registers are:

1. Flags register: This is a register associated with the database. It holds eight single-bit values, each of which has a dedicated function in the operation of the cell. Of interest are the ignore flag, which controls whether to ignore the associated database character, and the kill flag, which determines whether a value can be shifted between the associated database character and the previous character in the database.

2. Database register: This is the register that initially contains a character of the database, but can be changed during a search.

3. Phase register: This is another register associated with the database. It holds temporary values associated with the database character. If the character is a multiple-precision one (needing more than one byte of storage), part of the register is used to indicate a "phase" value of the character, i.e. to indicate which portion of a multiple-precision value the character pertains to.

4. Temporary register: contains temporary values associated with the database character.

5. Error tolerance register: This register is also associated with the database and has three alternate functions, selectable by microcode values. It can be used either to provide additional temporary storage, to assist in some types of shifting operations, or to contain a numeric mark. A numeric mark is a number of errors needed to cause a match to fail.

Before a search, the microcode must initialize this value to reflect the desired amount of error tolerance. When a search is complete, the value can be inspected to determine how much tolerance remains.

6. Pattern register: This is associated either with the database or with the search pattern. When a cell is configured to compare a database character with a pattern character, the latter is typically held in this register, although the register may alternatively be used to hold any other value associated with the pattern, or to hold a count when the cell is configured as a counter, or to hold temporary values associated with the database.

7. Mask register: This is a register associated with the pattern, and its primary function is to contain a bit mask that is used in operation of the arithmetic unit. Its other functions are: to hold an eight-bit constant for use in arithmetic operations, and to contain a count reset value when the cell is used as a counter.

8. Logic unit microcode: This byte of microcode, like all the microcode, is associated with the pattern. The bits in this byte of microcode determine which functions are to be performed by a logic unit in the cell. The logic unit performs any of sixteen boolean functions on two logical unit input operands. The microcode specifies the source of each operand and the function to be performed.

9. Arithmetic unit microcode: Microcode in this byte identifies the inputs and outputs of the arithmetic unit in the cell. Two inputs are selected from a list of eight possible sources, including all the registers associated with database and the pattern. An output selection field determines which 8-bit result will be generated by the arithmetic unit. Depending on the output of the logic unit, the output of the arithmetic unit is selected to be one or the other of the inputs, or the sum or difference of the inputs, or zero.

10. Change microcode: This is another byte of microcode associated with the pattern. It controls selection of which register will receive a changed value from the arithmetic unit. An alternate function is to assign error tolerances for extra, missing and misspelled characters.

11. Condition microcode: This is yet another byte of microcode associated with the pattern. It determines the conditions under which this instruction (contained in this cell) will be executed. If the conditions are met, execution will proceed normally. If not, no action is taken in the cell.

12. Shift microcode: This is the last of the microcode bytes and, like the others, is associated with the pattern. The shift microcode determines how the pattern register will be used. It tells whether the contents of the pattern register will be associated with the database or with the pattern, and also whether the pattern register is being used to shift a byte to the previous or next database character. The value being shifted or loaded comes from the result of the arithmetic unit.

Figure 37:
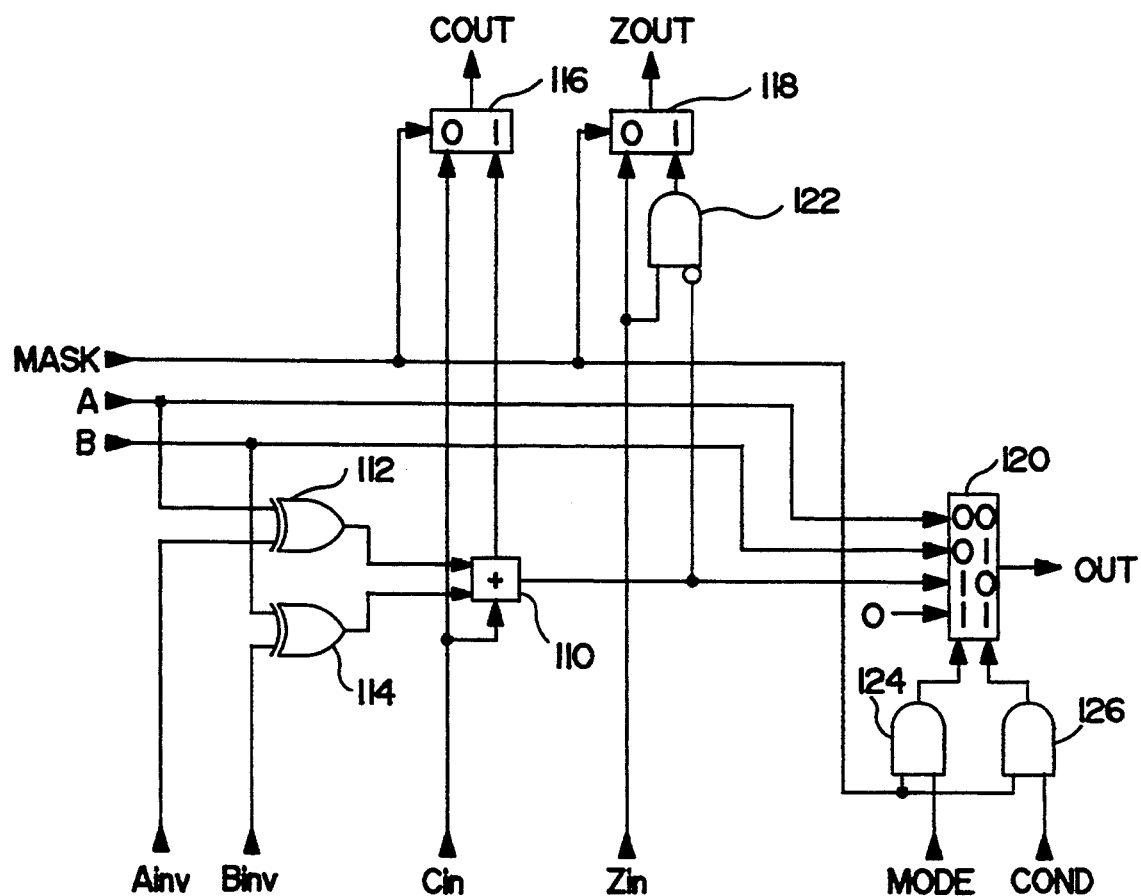
FIG. 37 is a circuit diagram of an arithmetic unit used in the search cells of the invention.
Figure 38:
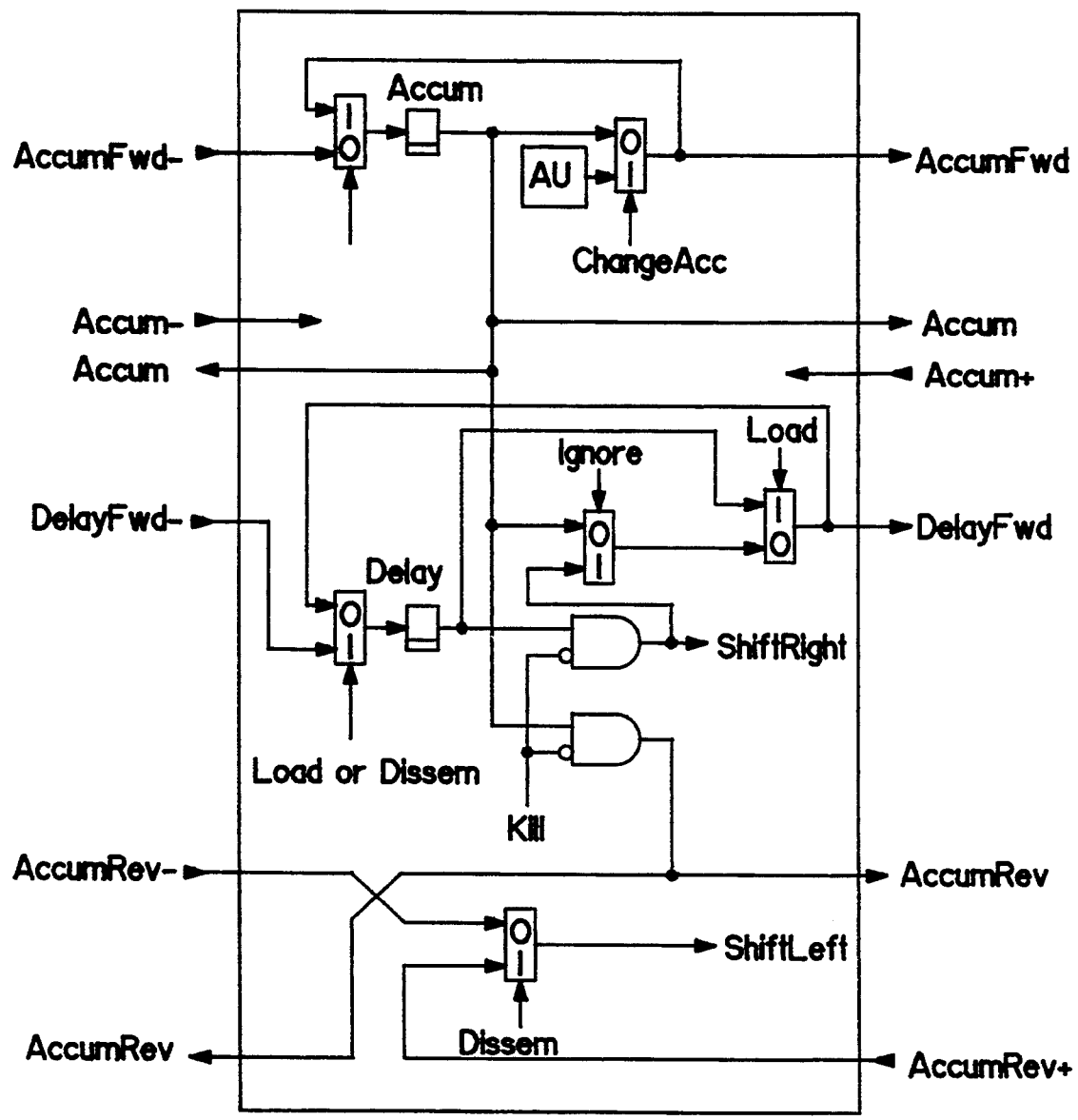
FIGS. 38–44 are logic diagrams together defining in detail the logic associated with a single search cell in the apparatus of the invention.
Figure 39:
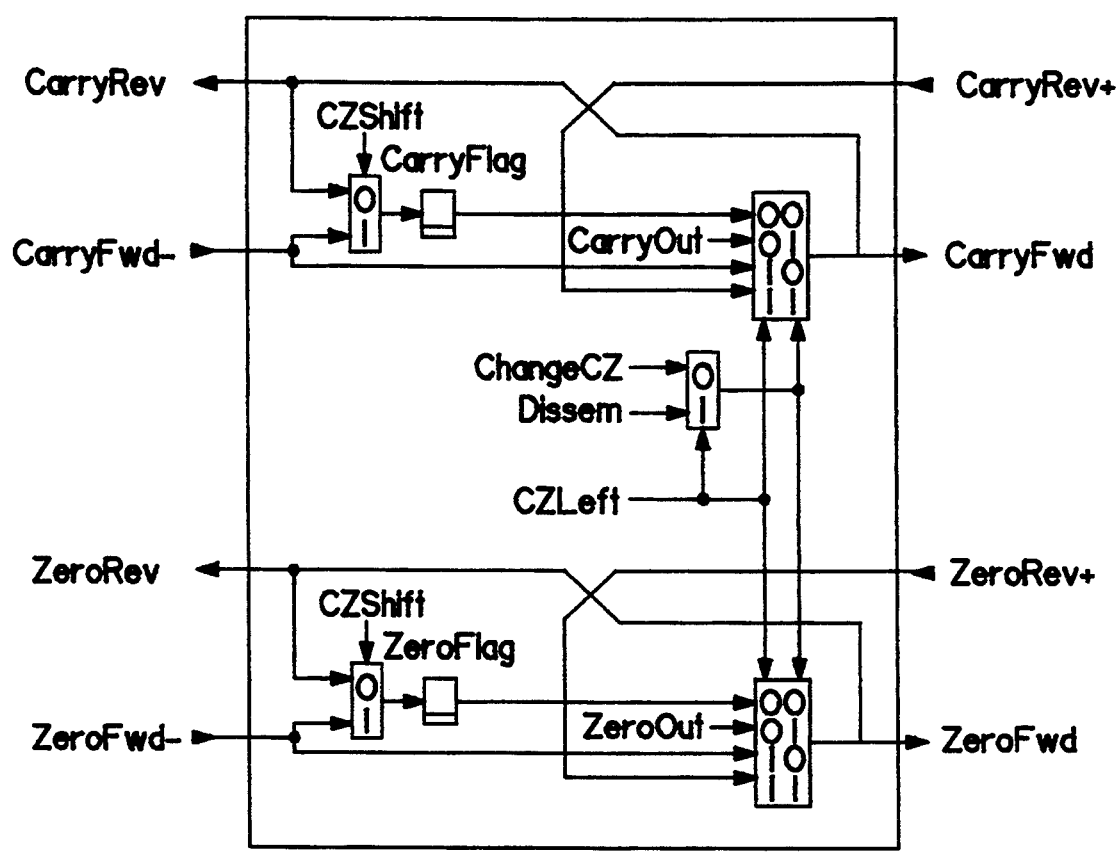
Figure 40:
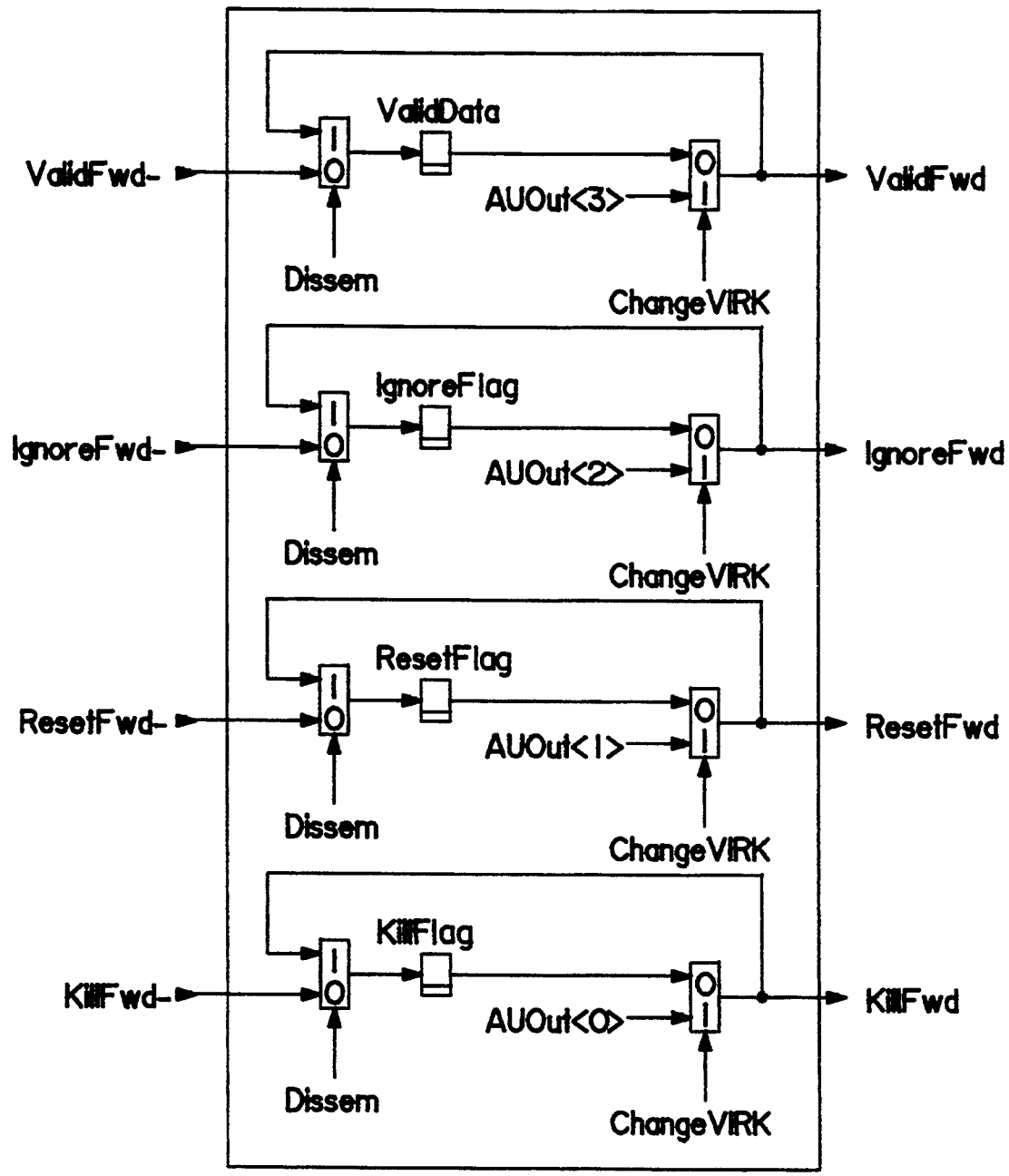
Figure 41:
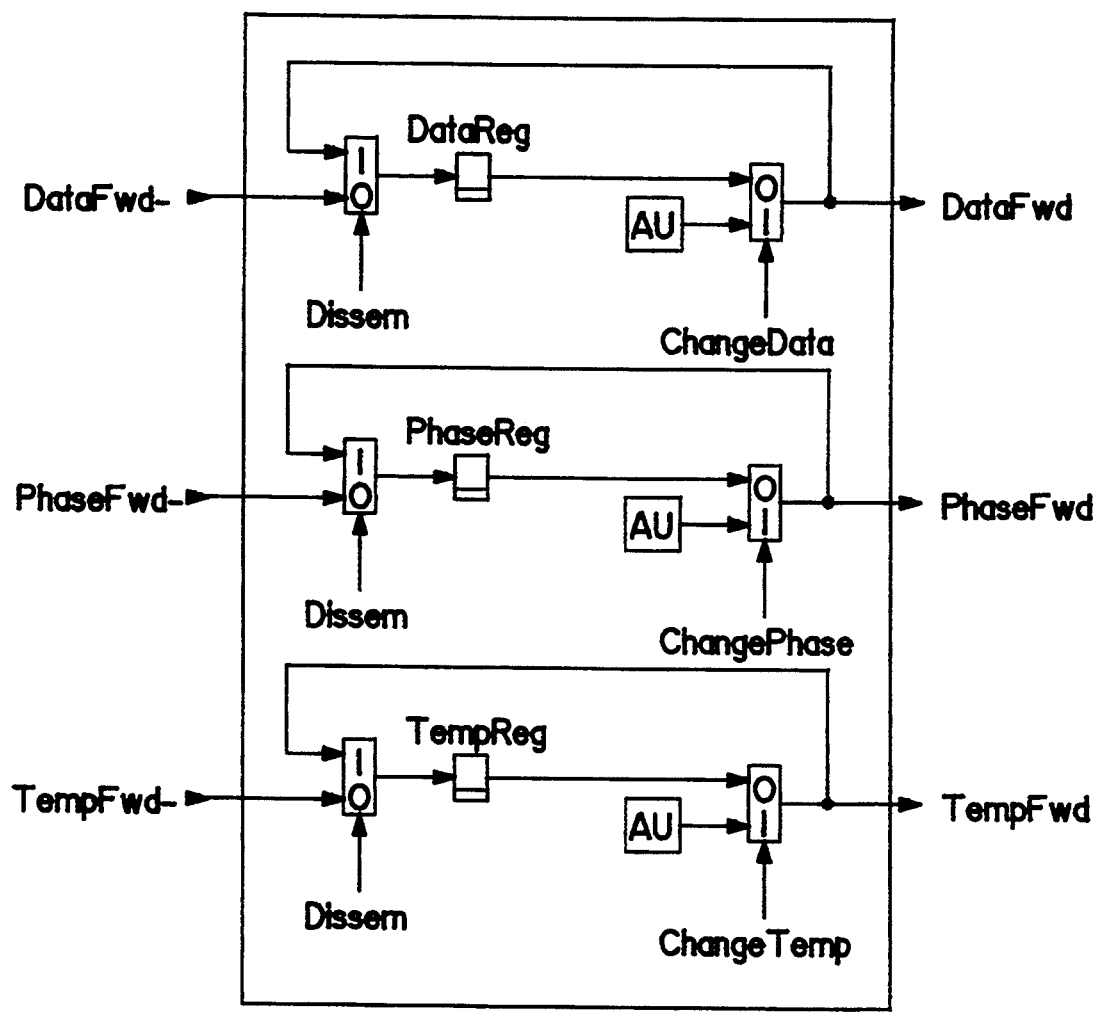
Figure 42:
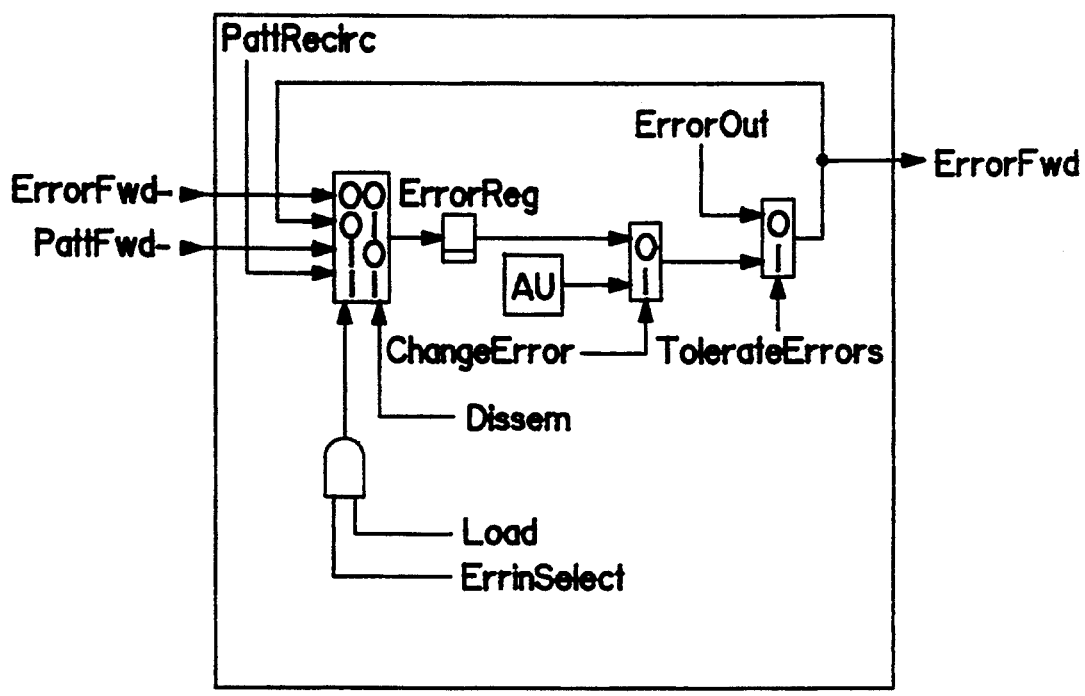
Figure 43:
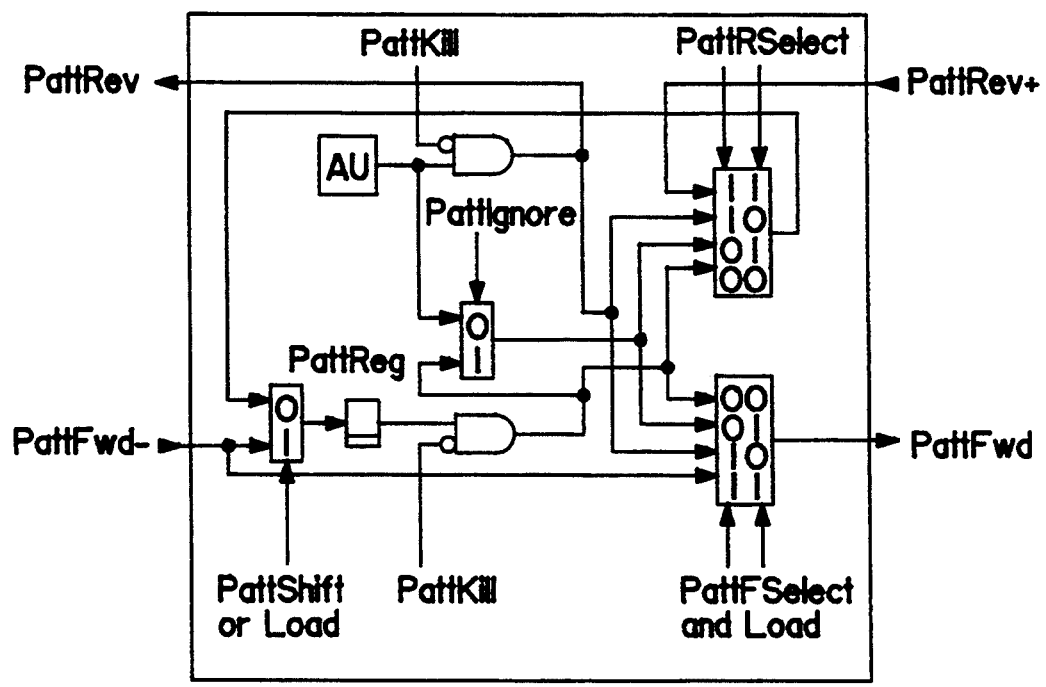
Figure 44:
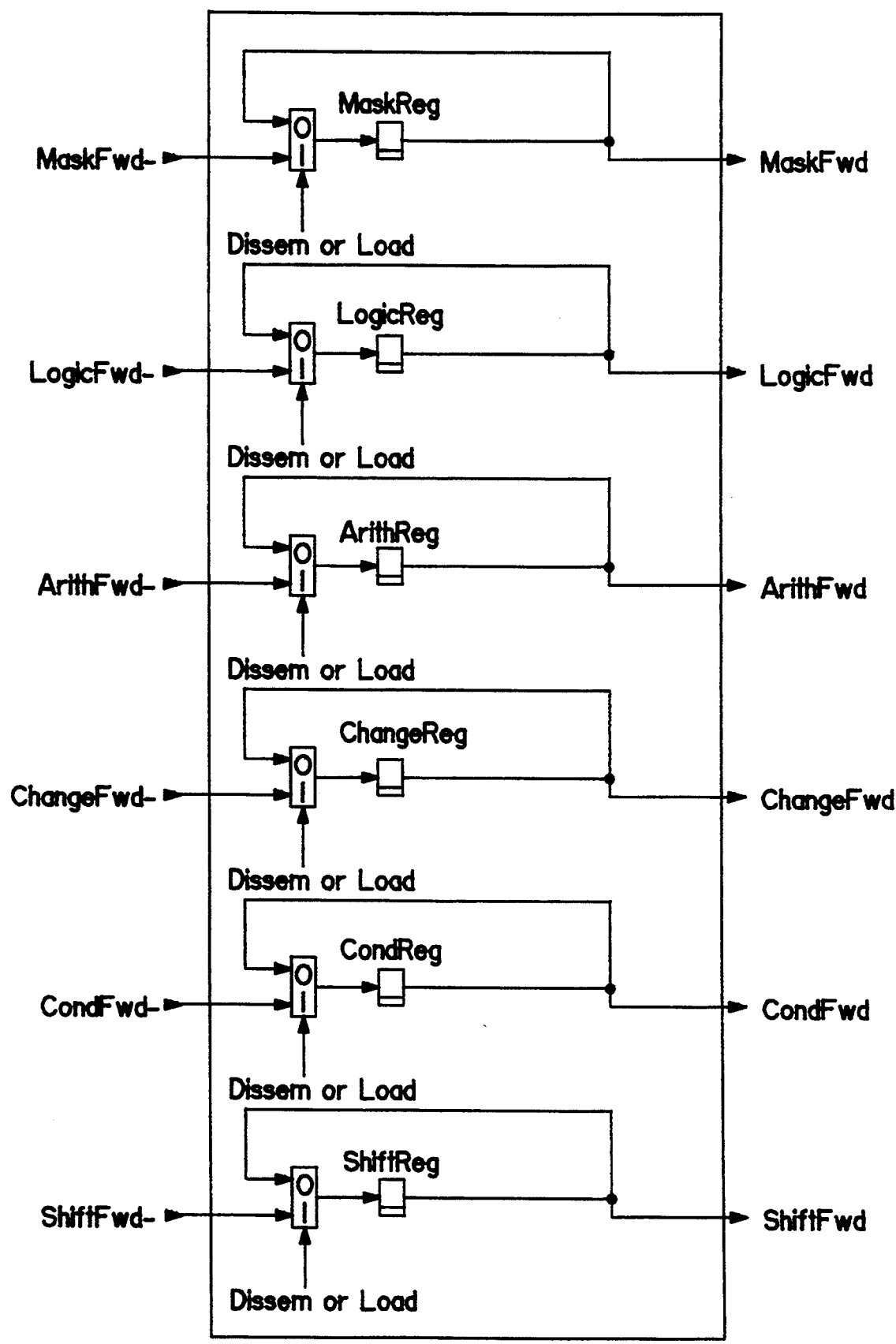

The arithmetic unit is designed to perform a variety of operations on two one-byte inputs and a one-byte mask, or on subfields within a byte. A bit slice of the arithmetic unit is shown in FIG. 37. It includes a one-bit adder 110, two exclusive OR gates 112, 114, two 2:1 multiplexers 116, 118, a 4:1 multiplexer 120, and three AND gates 122, 124, 126. A bit mask is central to operation of the unit. When a mask bit is zero, output from the unit will be taken from one of the inputs, the A input. If the mask bit is a one, the output is taken from the A input, the B input, the adder output, or zero, as determined by the states of two control signals, designated the mode and the condition signals. Inputs to the adder 110 are either the A and B input signals or inverted forms of those signals produced by XOR gates 112, 114 in response to inverting control signal applied to their inputs. A carry input signal is also applied to the adder 110, and a carry output is generated by the arithmetic unit if the mask bit is a one, as determined by the multiplexer 116. If the mask bit is a zero, the carry input signal is directly sent to the output, bypassing the adder 110. A $Z_{in}$ signal is propagated through the unit to a $Z_{out}$ line if the mask bit is a zero. If the mask bit is a one, $Z_{in}$ is propagated to the $Z_{out}$ line only if the output of the adder 110 is zero. Otherwise a zero value is output, as determined by AND gate 122.

The arithmetic unit can be specifically configured, using the mask and control bits, to perform such functions as: shifting a byte left by one position, shifting an arbitrary collection of bits within a byte, accessing a single bit within a byte, adding, subtracting, or comparing arbitrary subfields within a byte, finding the maximum or minimum of identical subfields in two separate bytes, subtracting two values but producing a result that is never less than zero, changing an arbitrary set of bits to all zeros or all ones, and complementing an arbitrary set of bits.

It will appreciated from this brief description of the registers and the microcode that the search cell can be programmed to perform a variety of functions on the data values stored in it or passing through it, and these functions can be conditioned on a variety of states and values within the cell. Performing a particular type of search involves setting up a pattern for input to the pipeline of cells. As has been discussed, the pattern may be shifted into the cells prior to the search, in the retrospective mode, or streamed through the pipeline in the dissemination mode. In either case, the pattern that has to be formulated includes not only the pattern characters, but also the associated microcode bits, which determine the type of operation to be performed in each cell.

Programming the Search Engine:

As indicated above, performing a specific search requires that a search pattern be established, including associated microcode that determines the functions performed in each search cell as database characters are compared with the pattern. For simplicity, the following description assumes, unless otherwise stated, that the search engine is being operated in retrospective mode, but it will be understood that much the same considerations apply to searches performed in dissemination mode. It will be recalled that, in retrospective mode, the search pattern is stored in the pipeline of cells prior to the search. Then the database characters are streamed through the pipeline, comparisons are made between pattern characters and pipeline characters, and the results of the comparisons are collected.

As described in the preceding descriptive section, each search cell includes twelve one-byte registers, some of which are used to store an element of the pattern and associated microcode, and some of which are used to store a database character and associated data. Each cell also has a collection of arithmetic and other logic, for performing transformations and computations on the database and related data in the cell. When a global clock signal is applied to the cell, these transformations and computations take place and the database registers assume new values, or retain their old values, or are shifted into registers in adjacent cells, all in accordance with the microcode in each cell. As seen from the description of an individual cell, numerous different types of transformations and computations may be accomplished in each cell. Since each cell has five bytes of microcode, in addition to the pattern register and an associated mask register, programming a specific search for a pattern of, say, twenty characters, involves determining the appropriate values for forty bits of microcode, plus a pattern character and a mask character, i.e. a total of seven bytes of data in each of more than twenty search cells. In a simple search, much of the microcode in cells containing a pattern character will be the same from cell to cell, but determining the microcode for more complex searches is a more demanding task.

To facilitate the generation of search patterns for the apparatus of the invention, a special programming language has been developed, together with a compiler program that converts the programming language statement into "primitives," basic searching and logical instructions for entering into the microcode registers to effect a specific type of search. Although the programming language and the compiler are not considered to be part of the present invention, its symbolic language provides a convenient tool for explaining operation of the search engine in performing various basic and complex search functions. How these search functions are translated into microcode is a matter of design choice. A compiler of some kind provides convenience and rapid implementation of a search. On the other hand, any of the search functions described may be implemented by simply coding each cell of a search pattern at the microcode level, using the provided definitions of the microcode bits to effect the desired functions. As will shortly be appreciated, this microcoding task is not as difficult as it might first appear, because many of the cells of a search pattern will contain much the same microcode, to effect a simple character comparison and a shift of a "mark" associated with a database character.

The use of character marks:

Practically all searches manipulate "marks" associated with characters in a database. A mark is either a one-bit flag or a numerical value stored in one of the database registers in each cell. For purposes of explanation, it is easier to consider the mark to be a one-bit flag. In retrospective mode, the mark is shifted from cell to cell with the database character, but may also be shifted from one character position to another in the course of the search. Each character in the database may be either "marked" or "unmarked," and this status may change in the course of a search.

The basic search operation begins by marking all of the characters in the database. Each cell is conditioned to compare its pattern character with only marked database characters. When a cell encounters a match between its pattern character and database character, the mark is shifted right, i.e. to the next following character. When there is no match, the corresponding database character is unmarked. An example will clarify this principle. Suppose that the database is as follows:

Database: A B C D E F C A T G H I J K
Marks:    * * * * * * * * * * * * * *

The beginning of the database is at the left-hand end and the asterisks indicate that every character is marked. This initial marking can be accomplished in the first cell of the pipeline.

Assume further that the search pattern includes the letters C A T. For consistency with the way the database is shown, the pattern would be T A C, since it will be recalled that the database and pattern move in opposite relative directions, i.e. the search character C will first encounter the database beginning characters A, B, etc. This orientation of the database characters and pattern characters is consistent with the data flow in the dissemination mode of operation, as depicted in FIG. 3. The ensuing discussion, however, is applicable to both the dissemination mode and the retrospective mode. When the pattern character C encounters the database characters A and B, these two characters will be unmarked because no match is detected. When the first C in the database is matched with the C in the pattern, the mark in the C database character will be shifted to the D position. (It is of no consequence that D is already marked.) The A character of the pattern encounters no marked database character until it reaches D. At this point the A pattern character cannot find a match and unmarks the D database character. Database characters D, E and F are unmatched and consequently unmarked. Then the C pattern character finds another C in the database. The mark is moved to the subsequent A in the database. Then the A in the pattern finds a match and the A mark is moved to the subsequent T character in the database. Finally the T in the pattern finds a match and moves the mark to the next following character in the database. Thus the successful location of a matching string in the database results in a mark being placed in the character position next following the matching database string. In the example, the database after the search would appear as follows:

Database: A B C D E F C A T G H I J K
Marks:                            *

This operation of searching in the normal or forward direction can be considered as comprising two steps. First the marks in the database are extinguished for all characters except the one at the end of the pattern; then the remaining mark or marks are shifted one position to the right. Because the unmarking and shifting steps are repeated for every character in the pattern, the result is to provide a pattern marking mechanism that operates regardless of the length of the pattern. In the case of a one-character pattern, for example C, all the marks in positions other than those containing a C in the database are extinguished; then the remaining marks are shifted one position to the right. For a longer pattern string, only the last character in each matching database string is left marked, then these are shifted one to the right. The actual operations performed in each cell are somewhat more complex than this, but it will facilitate explanation of more complex searching functions if the concept described above is kept in mind.

The principle of marking characters in the database, comparing only marked characters, extinguishing marks of nonmatching characters, and shifting the remaining marks to the right, is used in many different types of searches. For example, search alternatives can be combined in boolean logic expressions, such as "CAT or DOG." The following database shows an example of such a search:

```
Database:         C A T ,  R A T ,  D O G .
CAT marks:           *
DOG marks                          *
CAT or DOG marks:    *             *
```

Search functions are perhaps more easily understood in terms of primitive search engine instructions, or "primitives." Each primitive is a symbolic representation of an instruction performed at a particular search cell in the pipeline of cells. The primitive is implemented in microcode associated with the pattern and stored in (or shifted through) the cell. As mentioned earlier, it is difficult to explain operation of the search engine by reference to the microcode, but the symbolic primitives provide a more meaningful approach.
Search engine primitives:

Some of the more commonly used primitives will be discussed here by way of illustration. The database comprises a number of parallel sequences of data. First there is the database character sequence d. The ith character in the sequence is referred to as $d_i$. Then there are a number of parallel sequences of temporary data, which may be one-bit flags. The temporary data sequences are referred to as t. The jth sequence of temporary data is referred to as $t_j$ and the ith element in the jth sequence is referred to as $t_{ji}$. The character mark is contained in one of these sequences, where j=k, i.e. the mark sequence is $t_k$, and $t_{ki}=1$ if the character $d_i$ is marked.

The primary pattern matching primitive is the MATCH primitive. As explained above with reference to the manipulation of marks, when a character match is found the character mark is shifted to the right, and when no match is found the mark is extinguished. These operations involve two primitives: MATCH and SHIFT-RIGHT, which are further expanded as follows:

(MATCH $t_k$ P)    $t'_{ki} = t_{ki}$ if $P(d_i)$ 0 otherwise, (SHIFT-RIGHT $t_k$)    $t'_{ki} = t_{k(i-1)}$.

The expression P(d) refers to the matching of the database character with a pattern character in the current search cell. More specifically, the pattern P is defined in terms of a pattern character p, a mask m, and a relational comparison operator r:

P(d)=r(d.m,p), where d.m represents a bitwise AND of the database character d and the mask m, the result being compared with the pattern character p in a manner specified by the operator r, which can be specified in six different ways. In many searches, r will specify an equality comparison test, but other values of r may specify comparison between d.m and p to determine inequality, less than, greater than, less than or equal to, or greater than or equal to. In any event, if the comparison test is passed, the new value of the mark remains the same as the old value; if the comparison test is failed the mark is extinguished to zero. The SHIFT-RIGHT primitive, which follows the MATCH primitive in a typical searching sequence, shifts the mark one character position to the right in the database.

An example of a search for the characters CAT would be expressed in primitives as follows:
(MATCH $t_0$ "C") (SHIFT-RIGHT $t_0$)
(MATCH $t_0$ "A") (SHIFT-RIGHT $t_0$)
(MATCH $t_0$ "T") ( SHIFT-RIGHT $t_0$)
If the C in CAT was marked anywhere in the database before this sequence of primitives is applied, the character following the T will be marked after the search.

Another important primitive is LOAD, which replaces a value stored in a temporary sequence $t_1$ with a selected boolean combination of the old value and a value from another temporary sequence $t_2$. The LOAD primitive is expanded as follows:

(LOAD $t_1$ b($t_1$,$t_2$)) $t'_{1i}$=b($t_{1i}$, $t_{2i}$).

The boolean function b can be any of sixteen possible functions of two arguments.

For example, (LOAD $t_1$ $t_2$) copies the value of $t_1$ to $t_2$, and (LOAD $t_1$ $t_1+t_2$) loads the logical OR of values $t_1$ and $t_2$ into $t_1$. An example of how these primitives are used will serve to clarify how boolean combination searches may be performed.

A search for occurrences of the words SLIMY or SLEAZY might be performed with the primitives set forth below. The search can be expressed as
"SL"[or,"IM","EAZ"]"Y".

The expression in brackets is to search in the alternative for IM or EAZ Here are the primitives, with explanatory comments:
(MATCH $t_0$ "S") (SHIFT-RIGHT $t_0$) S on $t_0$
(MATCH $t_0$ "L") (SHIFT-RIGHT $t_0$) SL on $t_0$
(LOAD $t_1$ $t_0$) SL on $t_1$ too
(MATCH $t_0$ "I") (SHIFT-RIGHT $t_0$) SLI on $t_0$
(MATCH $t_0$ "M") (SHIFT-RIGHT $t_0$) SLIM on $t_0$
(MATCH $t_1$ "E") (SHIFT-RIGHT $t_1$) SLE on $t_1$
(MATCH $t_1$ "A") (SHIFT-RIGHT $t_1$) SLEA on $t_1$
(MATCH $t_0$ "Z") (SHIFT-RIGHT $t_1$) SLEAZ on $t_1$
(LOAD $t_0$ $t_0+t_1$) SLIM or SLEAZ on $t_0$
(MATCH $t_0$ "Y") (SHIFT-RIGHT $t_0$) SLIMY or SLEAZY on $t_0$ In an approximate sense, each line of the foregoing example represents the coding of a separate search cell. It will be apparent that the LOAD primitive permits temporary values to be used to hold intermediate results of a boolean search, and later combined in a desired manner to effect the goal of the search.
Numeric marks:

The searching examples provided thus far have tacitly assumed that exact matching is to be performed, i.e. that the mark is a single bit of information, which, at the end of a search, indicates whether or not an exact match for the pattern was found in the database. In practice, of course, there is need for a technique for inexact matching. This is handled in the search engine by a numeric mark. Basically, the numeric mark is initialized by the microcode to reflect a sired amount of error tolerance. Rather than being extinguished when a non-matching character is located, the numeric mark is reduced in value and shifted to the next database character. At the end of the search, the numeric mark can be inspected to determine how much tolerance remains. When a search pattern includes alternatives, the numeric mark must be saved and restored on a stack implemented in other cell registers.

When the numeric mark is zero, the character is considered unmarked; when it is nonzero the character is considered marked. Frequently the number 1 is used to denote a marked character, but there are times when the magnitude of the mark is important. When logical "not," "or" and "and" operations are used in conjunction with numeric marks, some assumptions must be made as to how what numeric values will be given to the results of these operations. For example, the "or" operation in the present embodiment selects the maximum numeric value found in the arguments of the "or" operation, and the "and" operation selects the minimum of the values found in its arguments. The "not" operation in general subtracts each mark value from a magnitude specified in the most recent instruction that set the beginning tolerance values in the marks.

Inexact matching:

The use of numeric marks provides the search engine with the capability to search for strings of database characters that do not exactly match the search pattern. Before the search begins, the marks are preset or "weighted" to indicate how many errors will be tolerated. As the search proceeds, the mark values will be reduced to reflect the closeness of the match. Finally, when the search is complete, characters with nonzero marks indicate places in the database where the pattern matches to within the specified tolerance. Moreover, the magnitude of the mark at a specific location indicates how well the pattern matched at that location.

The initializing or resetting of numeric marks in a database may be symbolically represented as the "weight" function:

[weight,N], where N is the numeric mark to be stored in each nonzero mark in a database. A value of N=1 means that no errors will be tolerated; N=2 means one error will be tolerated, and so forth. A value of N means that N−1 errors will be tolerated and N errors will result in no match. After a search has been partially completed, using a numeric mark, the resulting nonzero marks can be converted to binary marks again, to facilitate logical manipulation. Symbolically this is achieved by the function [weight,1].

Several kinds of errors can be tolerated, to selected degrees, including misspellings, missing characters, extra characters, gaps (strings of missing characters counted as single errors), and insertions (strings of extra characters counted as single errors). An important aspect of the invention is that the different types of errors can be assigned different costs, which are stored in the microcode associated with the search pattern. A zero cost indicates that the type of error is always tolerated, and when the error is detected it will have no effect on the numeric mark. In many cases, the error cost will be selected to be one, indicating that each detected error of that type will reduce the numeric mark by one. Other costs may also be selected, however, and for further flexibility it is possible to assign different costs for different specific errors of the same type. For example, a misspelling of a particular character may be assigned a different cost from that of misspelling another character. The feature is general enough that even different misspellings of the same letter may be assigned different costs. A cost of infinity indicates that the type of error is intolerable. Symbolically, the error cost is changed as in the following example, for the misspelling cost:

[misspell,C,S], where C is the cost to applied to each misspelling error, and S is the pattern over which the cost is to apply.

Similar statements can be formulated to change the cost of missing, extra, gap, and insertion errors. Of course, missing and gap detection cannot be operated concurrently. One is either counting a single missing character as an error or a gap of several characters as an error. Therefore, when the cost of a missing character error is assigned, it is assumed that the gap error detection feature is disabled, and vice versa. The same relationship applies between extra character errors and insertion errors.

Handling of misspelled, missing and extra characters is made possible by the concept of the numeric mark passed from character to character in the database. When any type of error is detected, the value of the mark is reduced but the mark is preserved and shifted to the next character position in database, unless or until it is reduced to zero by the occurrence of errors. Depending on the error tolerances permitted and the values assigned to the costs of the errors, a search using numeric marks will usually result in a cluster of nonzero marks, rather than a single mark at one position.

Reverse searching:

In the normal direction of searching, the database searched from beginning to end for a character or string of characters matching the pattern. As has been described, if a matching string is located the character immediately following the string is marked. In some cases, it is desirable to mark the first character in the string, and this can be accomplished by searching in reverse for some portion of the search. The search cell pipeline, with its ability to shift marks right or left with respect to the database, makes this relatively simple to implement.

It will be recalled that, in searching in the forward direction, the matching of a database character with a pattern sequence can result two actions being taken. If there is no match, the mark is extinguished and, second, all remaining marks are shifted to the right, i.e. one character toward the end of the database. When reverse sequencing is in effect, these steps are modified as follows. First all marks are shifted by one character toward the beginning of the database, i.e. to the left, and second, in cells where there is no match the marks are extinguished. It is also necessary to reverse the order of characters in the pattern. An example will help clarify how reverse searching works.

To search in reverse for the string ABC in the database ABABCDAABCDE, the first step is to mark all the characters in the database, which will then appear as:

Database: A B A B C D A A B C D E
Marks:    * * * * * * * * * * * *

In reverse searching, the pattern characters will be applied to the database in the opposite of the normal sequence, i.e. for the search ABC the character C will be applied to the database first. Further, the marks will be left-shifted before the comparison. The result of the reverse-sequence search is summarized by the following:

```
Database:        A B A B C D A A B C D E
Marks:           * * * * * * * * * * * *
After shift:       * * * * * * * * * * *
After test for C:          *         *
After shift:                 *         *
After test for B:        *         *
After shift:           *         *
After test for A:    *         *
```

Note that the final result leaves the A character of the ABC pattern marked, i.e. the first characters of the matching strings are marked. This turns out to be extremely useful in conjunction with the "ignore" function, as will shortly be discussed.

Implementation of reverse sequence searching is a relatively simple matter in a pipeline of search cells constructed in accordance with the invention. As has been explained, the cells contain circuitry that permits shifting sequences of data in either direction with respect to the database sequence. Thus it is a simple matter to program the necessary pattern microcode to perform an initial left shift of the marks, followed by a matching operation. The microcode is associated with pattern characters in reverse sequence, and the entire pattern is either loaded into the pipeline initially (for operation in retrospective mode), or streamed through the pipeline (for operation in dissemination mode).

Reverse sequence searching permits a "lookahead" feature to be implemented. For example, suppose a searcher wishes to locate all occurrences of "Lake" but only if the word is not followed by "Tahoe." In effect, the search has to find all occurrences of "Lake" but to also look ahead in the database to make sure that "Lake" is not followed immediately by "Tahoe." The search can be stated in symbolic form as:

[reverse, "Lake Tahoe"] not "Lake".

This may be illustrated as follows:

```
Database: Lake Tahoe and Lake Isabella
[reverse, "Lake Tahoe"]: *
     ... not:         ****************************
     ... "Lake":                                *
```

The "not" logical function provides a way to mark all characters in the database other than those marked by a selected pattern. The "not" function can be implemented as a special case of the "load" primitive discussed above, wherein a temporary sequence containing the marks is replaced by its inverse. The reverse function results in the marking of the first character of LAKE TAHOE in the database. Then the "not" function inverts the marks, unmarking the first character of LAKE TAHOE and marking all of the other characters in the database. This ensures that no occurrences of LAKE TAHOE will be found in the search. Finally the LAKE part of the pattern locates all other occurrences of the word LAKE, marking the character following the words LAKE, as in any forward searching.

Another way to achieve the same result can be described symbolically as:

[and, "Lake" [[not, [reverse, "Tahoe"]]]

The steps involved in evaluating this search are:

```
Database: Lake Tahoe and Lake Isabella
[reverse, " Tahoe"]:    *
[not, ... ]:         ****  ************************
     "Lake":          *                       *
[and, ... ]:                                  *
```

In both approaches to this search, part of the search is done forwards, and part in reverse; and a logical operation is used to combine the results.

"Ignore" function:

As already discussed, the ignore function is useful in situations in which certain characters in a database should be ignored for some purposes in a search. For example, formatting characters in databases generated in some word processing systems, and hyphens appearing in some contexts, such as at the ends of lines. Using the feature involves, first, identifying the characters to be ignored, then flagging those characters as ones that should be ignored in the search that follows, and finally ignoring the flagged characters. Ignoring selected characters in the context of right and left shifting was discussed in a previous descriptive section.

Locating the characters that should be ignored may require the use of the reverse searching feature discussed above. The following symbolic instructions illustrate how the reverse searching function is used to mark hyphens occurring at the ends of lines of text. The end-of-line symbol shown for convenience as &.

begin "-" & [reverse, [or,,"-"]&]]

Applying this search to a database yields the following results:

```
Database: high-speed re-&trieval
begin:    ***********************
   ..."-":          *       *
   ...&:                        *
   ... [reverse, ... &]:        *
   ... [reverse, "-" ... ]:     *
   ... [reverse, [or, ... ] ... ]:  **
```

First, the pattern searches forward for places where a hyphen is followed by an end-of-line character, and marks the subsequent character. Then, reverse searching is used to move the mark back to the end-of-line character, and then to the hyphen character. Finally, the "or" function is used to combine the two marks located in reverse searching, leaving both the hyphen and the end-of-line characters marked.

Once characters to be ignored have been marked, an additional step is needed to convert these marks to "ignore" flags in the database. Then, when a normal search is performed, as in a search for the word RETRIEVAL, the hyphen and the end-of the-line characters are ignored. The mechanism for ignoring characters was discussed with reference to FIG. 16. Basically, when a character carrying an ignore flag is encountered, a revised character string is generated with the ignored character deleted.

The "kill" function:

The purpose of the "kill" function is to limit propagation of marks though a database. In forward searching, marks are normally shifted (right-shifted) toward the end of the database. In reverse searching, marks are normally shifted in the opposite direction in the database. Sometimes it is useful to limit the range of characters across which a mark may be shifted. For example, if a database is composed of a sequence of documents, it may not always be desirable to have marks propagate across document boundaries. This would mean that a pattern matched partially in one document and partially in another. In other contexts, it may be desirable to limit the propagation of marks to a single paragraph, a single sentence, or a single word within the same document.

One application in which the "kill" operator is useful is in searching for single words, which are assumed to be bounded by spaces. One way of doing this without the kill operator is using reverse searching to eliminate character strings that contain the pattern but do not end in a space. For example, one could search for the word CAT as follows:

```
Database: SCAT CAT CATS
" CAT":           *      *
[reverse, " "]: *    *   *    *
[and, . . . ]             *
```

Two strings containing "CAT" are located; then the reverse search locates all the spaces in the database. Finally, the only CAT string ending in a space is located by ANDing the space locations with the "CAT"s locations, yielding the only location with CAT as a word.

Unfortunately, this approach does not work so well when error tolerance is used. For example in searching for the DIME in this sequence:

```
Database:  DIME A DOZEN
"DIME" (with tolerance 2):  * * * * *       *
           [reverse, " "]: *     *  *       *
           [and, . . . ]:              *    *
```

The search for DIME with a tolerance of two results in a cluster of nonzero marks, ranging from DI (DIME with two missing characters), to DIME A (DIME with two extra characters). There is also a mark after DOZE (DIME with two misspelled characters. Because of the error tolerance, the marks following DIME spill over into the next word. When an AND function is performed to complete the search, an erroneous mark following A is located.

A more practical way to perform word searches employs the "kill" operator to place kill boundaries, indicated as vertical lines, following each space position. Then the error tolerance search is performed as in the foregoing example.

```
Database:  |D I M E  |A  |D O Z E N
"DIME" (with tolerance 2):  * * *        *
            [reverse, " "]:*      *  *         *
            [and, . . . ]:             *
```

The "kill" successfully prevents the error tolerance from spilling over into the next word, and provided an unambiguous search result.

A potential drawback of kill boundaries is in a situation in which it is desired to leave a mark at the last character of a pattern, rather than at the next following character position. As might be suspected from the earlier discussion of reverse sequence searching, this can be accomplished by searching in reverse for any character at all. It will be recalled that a character comparison may be made on the basis of a bit mask. For most character comparisons, the bit mask is set to all ones, or may be utilized to disregard the case of any alphabetic characters. In this instance, the mask is set to all zero bits and the character comparison that is performed is a compare equal to zero. Since all bits of the character are masked out, the comparison will always find a match on the very first character. Hence, the effect of the reverse search is to "backspace" the mark by one position. The potential difficulty is that, if the mark has to pass through a kill boundary to get to the character position following the located matching character string, the mark will be lost and there will be nothing to backspace into the preceding character position.

A solution to this difficulty is to provide that the last character in a pattern can be specially coded as an "end" character. This special coding simply suppresses shifting the mark into the next following position. For example, to search for CAT and leave the mark at the T position:

```
Database:  C A T  C A T C H E R
 . . . "C":       *       *
 . . . "A":         *       *
 . . . "T" end:       *        *
```

The special T pattern character is specially coded to suppress shifting of the mark, leaving it on the last character of matching string in the database, regardless of whether or not there are kill boundaries at the spaces.

A similar problem exists for reverse searching, as shown here:

```
Database:  C A T|  C A T C H E R|
[reverse, "T"]:   |    *                  |
[reverse, "A"]:   |    *                  |
[reverse, "C"]:   | *                     |
```

In the reverse T search, the kill boundary prevents movement of a mark from the space after CAT to the T position, so the thread of that search is lost. A special "end" character search can be used to eliminate this initial left shift of the mark from the T position, and locate both CAT strings, as shown here:

```
Database:      C A T|  C A T C H E R|
[reverse, "T" end]:   * |    *                |
[reverse, "A"]:     *   |  *                  |
[reverse, "C"]:   *     | *                   |
```

Application to genetics:

Molecular biologists are accumulating a growing database of information about the structure of living cells. Of particular interest are two classes of large molecules: proteins and DNA. Each of these molecules is organized as a chain of smaller molecules, and the identity and order of these links determines the physical shape and chemical properties of the molecule. By means of fairly intricate chemical processes, biologists can determine the sequence of nucleotides that make up a selected portion of a DNA molecule. Sometimes they can determine the sequence of amino acids in a protein by direct analysis, although it is more usual to infer this sequence indirectly from the structure of the corresponding DNA molecule. Individual researchers contribute their sequencing results to a readily accessible database known as GenBank.

The GenBank database consists of plain text in which DNA and protein sequences are represented as strings of letters. DNA sequences contain the letters a, g, c, and t, corresponding to the initial letters of the four nucleotide bases. Similarly, protein sequences are represented by strings of single-letter codes, where each letter is an abbreviation for one of the twenty amino acids. Other fields in each GenBank database entry may identify an organism from which the sequence was obtained, the identity of the researcher, and so forth.

The present invention facilitates searching in biotechnology databases of the GenBank type. It is particularly important to be able to locate places in the database that match a pattern only approximately. The database information is not always known with complete certainty, because of experimental errors and differences between individual organisms. Further, the sequences being compared may indeed be different, and it is the degree of similarity or difference that is important.

The present invention meets the requirements for searching such a database principally because of its generality and versatility in performing inexact searches. A suitably large number of errors can be tolerated for each search; different costs can be assigned for different types of errors; and different costs can be assigned to different errors of the same type, such as misspellings. In matching DNA sequences, errors occurring while attempting to match the end of a sequence sample are less important than errors occurring near the middle of the sample. Assigning different costs to different misspellings is useful when attempting to match protein sequences. Some amino acids are more similar than others and can therefore be interchanged without making a big difference in the protein. The costs used when preparing the search pattern can be chosen to reflect these similarities.

Registers, Microde and Logic:

This note describes the assignment of bits within each of tile twelve bytes needed to represent the state of an FDF 3 cell. Every state byte is associated either with the database or with the pattern. During retrospective search mode, the bytes associated with the database travel through the pipeline, while those associated with the pattern remain stationary inside the cells. In dissemination mode, the situation is reversed. In most cases, the FDF 3 cell hardware determines whether a particular byte is associated with the database or with the pattern, but one of the bytes permits this association to be specified in microcode. Values stored in registers associated with the pattern are determined by the pattern compiler, and they cannot be changed during the course of a search. On the other hand, if a byte can be associated with the database, its contents may be loaded from the output of tile arithmetic unit under microcode control. What follows is a summary of a cell's twelve state bytes.

1. Flags Register                                              Database

The flags register holds eight single-bit values, each of which has a dedicated function in the operation of the cell. The assignment of bits within the byte are as follows.

- (7) Accumulator—holds the output of the logic unit when the previous instruction executed on the current database character.
- (6) Accumulator Delay—used by the cell logic to shift the accumulator bit to the subsequent database character.
- (5) Carry Flag—buffers the arithmetic unit carry out signal for multiple precision arithmetic.
- (4) Zero Flag—buffers the arithmetic unit zero signal for multiple precision arithmetic.
- (3) Valid Data—distinguishes characters in the database from those that precede or follow it.
- (2) Ignore Flag—controls whether to ignore the associated database character.
- (1) Reset Flag—determines whether a counter should be reset immediately before the associated database character.
- (0) Kill Flag—determines whether a value can be shifted between the associated database character and the previous character in the database.

The flags byte may be used either as an input or an output of the arithmetic unit. If used as an output, only the Valid Data, Ignore, Reset, and Kill flags will be taken from the arithmetic unit. The other bits will be set in the usual way: the Accumulator and Accumulator Delay bits will come from the logic unit and delay logic, and the Carry and Zero flags generally come from the carry out and zero out signals generated by the arithmetic unit.

2. Database Register                                           Database

Before a search begins, the board hardware will initialize the database register to contain a character from the database.

(7:0) Database character

The register can also be programmed to accept the output of the arithmetic unit, allowing an FDF 3 program to change the database during a search.

3. Phase Register                                              Database

The Phase Register holds values associated with the database character. During ordinary single precision operation, all eight bits are available to hold these values.

(7:0) Temporary values associated with the database

In horizontal multiple precision operation, however, the cell hardware interprets the low-order three bits are the phase of the database character. In this case, the bit assignments are as follows.

(7:3) Temporary bits associated with the database
(2:0) Phase of byte in this cell For example, if database characters were four bytes long, each byte would be assigned a phase value from 0 to 3 to identify its position within the four-byte character. The low order byte is positioned closest to the beginning of the database. With three phase bits, the FDF 3 can process characters up to eight bytes long.

4. Temporary Register                                          Database

The temporary register holds values that need to be associated with database characters during a search.

(7:0) Temporary value associated with the database

5. Error Tolerance Register                                    Database

The error tolerance register has one of three functions, depending on microcode settings.

It can hold temporary values associated with database characters.

(7:0) Temporary value associated with the database

It provides an interface to the hardware error tolerance circuitry. When the microcode specifies this function, the error tolerance register supplies the necessary storage. When it operates in this capacity, bit assignments within the error tolerance register are as follows.

(7:4) Temporary storage used by the error tolerance circuitry. These bits are not available for other uses when error tolerance is active.

(3:0) Numeric Mark—This is the number of errors needed to cause a match to fail. Before a search, the microcode must initialize this value to reflect the desired amount of error tolerance. When a search is complete, the value can be inspected to determine how much tolerance remains. When a search pattern includes alternatives, the numeric mark must be saved and restored on a stack implemented in other registers.

The error tolerance register can also participate in full-byte right shift operations. It can accept the shifted byte frown the previous instruction. This capability allows a pattern to specify an N byte shift using only N microcode instructions.

(7:0) Byte shifted from previous microcode instruction.

6. Pattern Register                                Database/Pattern

The pattern register is the most versatile register in the FDF 3 cell. Its many uses include the following.

The pattern register can hold temporary values associated with the database. This behavior is subject to the hardware constraint that values cannot propagate across chip boundaries during retrospective search mode.

When a cell is configured to compare the database character with a pattern character, the pattern is typically held in the pattern register. It can equally well hold any other value associated with the pattern.

When a cell is configured as a counter, the count will be maintained in the pattern register.

The pattern register has extra circuitry for shifting a byte either to the next or previous database character. The hardware does not permit bytes to be shifted across chip boundaries during retrospective search mode.

The contents of the pattern register is initialized by the pattern compiler, but it may be modified by microcode during a search.

7. Mask Register                                              Pattern

The mask register has three distinct functions.

Most of the time, the mask register holds the mask that identifies significant bits for the arithmetic unit. Bit positions that have a 1 in the mask byte are considered significant by the arithmetic unit. The carry and zero signals will propagate over insignificant bits.

The mask register can hold an 8-bit constant value for use in full byte arithmetic operations. In this case, the arithmetic unit will assume that all operand bits are significant.

When a cell is configured as a counter, the mask register contains the value to which the counter should be reset. When a counters computes atLeast M or N mod M, the mask register will hold the value M. When the mask register is serving in this capacity, the arithmetic unit will use a mask consisting of all ones, meaning that all bits are significant.

The contents of the mask register is determined by the pattern compiler and cannot be modified by microcode.

8. Logic Unit Microcode                                       Pattern

Microcode in this byte identifies the operands of the logic unit and determines which function it should perform. The first input of the logic unit is derived from the flags register.

(7:6) LU A Input Select determines where the logic unit will obtain its first operand.
  00 Accumulator—Accumulator bit in the flags register. Generally, this will be the output of the logic unit from executing the previous instruction on the current database character.
  01 Shift Left—Accumulator shifted from the next database character. Remember that this option requires an additional cell during retrospective search mode.
  10 Shift Right—Accumulator shifted from the previous database character.
  11 Counter Flag—Output of the logic unit when it was executing this instruction on the previous database character, or zero if the reset flag is set. This selection can be used to implement a counter when the logic unit is configured to compute the logical-OR of its two operands. The B input will signal when the counter is first satisfied, and the A input will tell whether the counter was satisfied on the previous database character.

The second operand of the logic unit is computed from the carry and zero flags in the flags register and those generated by the arithmetic unit.

(5:4) LU B Input Select determines where the logic unit will obtain its second operand.
  00 Logical—AND of arithmetic unit carry output with the complement of the arithmetic unit zero output. Can be used to test whether $A > B$.
  01 Arithmetic unit carry out. Tests $A \geq B$.
  10 Complement of arithmetic unit zero output. Tests $A \neq B$.
  11 Either the carry flag in the flags register or the arithmetic unit carry out, depending on the zero flag in the flags register.
     0 means use the carry flag in the flags register.
     1 means use the arithmetic unit carry out.

This last function is used for implementing multiple precision minimum and maximum operations.

The value computed by the logic unit can be any of the sixteen possible boolean functions of its two arguments LU A Input and LU B Input.

(3:0) LU Function
  0000 False (zero always)
  0001 AB
  0010 A$\bar{B}$
  0011 A
  0100 $\bar{A}$B
  0101 B
  0110 A$\oplus$B
  0111 A+B
  1000 $\overline{A+B}$
  1001 $\overline{A\oplus B}$
  1010 $\bar{B}$
  1011 A+$\bar{B}$
  1100 $\bar{A}$
  1101 $\bar{A}$+B
  1110 $\overline{AB}$
  1111 True (one always)

9. Arithmetic Unit Microcode                                  Pattern

Microcode in this byte specifies the 8-bit inputs and outputs of the arithmetic unit.

(7:5) AU A Input Select identifies the first input of the arithmetic unit.

000 Flags Register
001 Database Register
010 Phase Register
011 Temporary Register
100 Error Tolerance Register
101 Pattern Register if the reset signal is zero; Mask Register if the reset signal is one.
110 Pattern Register
111 Pattern Register if the reset signal is zero and either the accumulator bit is clear or the zero bit in the flags register is clear. Mask Register otherwise. This will happen when the reset signal one or when both the accumulator bit and the zero bit in the flags register are set to one.

When AU A Input Select is 101 or 111, the mask value supplied to the arithmetic unit will be all ones. These two cases can be used to implement ordinary counters and modulo counters.

(4:2) All B Input Select identifies the second input of the arithmetic unit.
000 Flags Register
001 Database Register
010 Phase Register
011 Temporary Register
100 Error Tolerance Register
101 Mask Register
110 Pattern Register
111 Zero When AU B Input select is 101, the mask value supplied to the arithmetic unit will be all ones. This case provides an additional constant operand. The constant zero input is useful for incrementing or decrementing values, particularly those stored in the pattern register.

(1:0) AU Output Select determines which 8-bit result will be generated by the arithmetic unit.
00 AU A Input if the output of the logic unit is zero; AU B Input if the output, of the logic unit is one.
01 AU B Input always
10 Zero if the logic unit output is zero; Sum or difference of AU A Input and AU B Input if the Logic unit output is one.
11 Sum or difference always.

In all cases, when a mask bit is zero, the corresponding bit of the arithmetic unit output will be a copy of the same bit in AU Input A. Where mask bits are one, the output will be determined according to the AU Output Select. In cases 10 and 11, additional microcode determines whether the arithmetic unit generates the sum or difference of its two operands.

10. Change Microcode                                    Pattern

The output of the arithmetic unit can be directed to any one register in the following list: flags, database, phase, temporary, or error tolerance. This is in addition to whatever happens with the pattern register. The microcode for selecting the register to be modified is overlapped with the code for specifying hardware error tolerance.

(7:6) Extra Character Cost
00 Error tolerance is not active
01 Each extra character costs infinity
10 Each extra character costs one
11 Each extra character costs zero
(5:4) Missing Character Cost (valid unless bits (7:6)=00)
00 Tolerate extra characters only
01 Missing character costs infinity
10 Missing character costs one
11 Missing character costs zero
(3) Misspelled Character Cost (valid unless bits (7:6)=00)
0 Misspelling costs infinity
1 Misspelling costs one When bits (7:6)=00, the error tolerance hardware is not active and bits (5:3), instead of controlling missing and misspelling costs, now determine which register should receive the output of the arithmetic unit.

(5:3) Change Specification (valid when bits (7:6)=00)
000 Do not change anything. This is what will happen when error tolerance is inactive and the instruction execution condition is not met. See the conditional execution microcode.
001 Change the valid data, kill, ignore, and reset flags to the output of the arithmetic unit. Change the accumulator, carry, and zero flags as in case 111.
010 Change the database register to the output of the arithmetic unit. Change the accumulator, carry, and zero flags as in case 111.
011 Change the phase register to the output of the arithmetic unit. Change the accumulator, carry, and zero flags as in case 111.
100 Change the temporary register to the output of the arithmetic unit. Change the accumulator, carry, and zero flags as in case 111.
101 Change error tolerance register to the output of the arithmetic unit. Change the accumulator, carry, and zero flags as in case 111.
110 Copy the accumulator contents to a tap. Change the accumulator, carry, and zero flags as in case 111.
110 Change the accumulator to the output of the logic unit. Also change the carry and zero flags to the flags generated by the arithmetic unit. This is also what will happen when error tolerance is active.

The accumulator delay bit of the flags register is not controlled by this microcode.

The final three bits in this microcode byte identify the single-bit inputs of the arithmetic unit.

(2:1) AU Carry In Select identifies the value that should be supplied to the carry in of the least significant bit of the arithmetic unit.
00 Zero.
01 One.
10 Accumulator if adding; Complement of accumulator if subtracting.
11 Carry flag from the flags register When AU A Input Select is 111, the cell is being used as a modulo counter, and the value used for the accumulator in case 10 above will be slightly different. Specifically, zero will be used instead of the accumulator unless the reset flag is set or the zero flag is clear. This behavior allows modulo counters to obey the reset signal.

(0) AU Zero In Select identifies the value that should be supplied to the zero in of the least significant bit of the arithmetic unit.
0 Zero flag from the flags register
1 One 11. Condition Microcode                                 Pattern The microcode in this byte determines the conditions under which this instruction will be executed. If the conditions are met, execution will proceed normally. If the conditions are not satisfied, the following differences will occur.

If the error tolerance logic is active, it will behave as though the ignore flag were set and the kill flag were clear. The error tolerance register will still receive the output of the error tolerance logic.

If the error tolerance logic is not active, the other registers will behave as if the 3-bit change code were 000. This will force the registers to maintain their current values.

The mask used by the arithmetic unit will be all zeros.

The behavior of the pattern register is not affected except for the difference in the result of the arithmetic unit.

The execution of an instruction may be conditioned on the value of the accumulator or, during multiple precision, on the phase of the database character.

(7:6) Accumulator Condition—the instruction will be executed if the accumulator bit of the flags register has the expected value.
00 Always execute this instruction.
01 Execute if accumulator is 0.
10 Execute if accumulator is 1.
11 Always execute this instruction. In addition, configure the arithmetic unit to add or subtract based on the value of the accumulator. See the description of the AU Function bit for more information.
(5) Phase Condition—the instruction will be executed if the phase of the database, stored in the phase register, matches the phase of the instruction. This feature can be used to implement multiple precision.
0 Always execute this instruction
1 Execute if phase is the same Both the Accumulator Condition and the Phase Condition must be satisfied in order for the instruction to be executed.

The next bit tells whether the arithmetic unit should compute the sum or difference of its two operands.

(4) AU Function tells whether the arithmetic unit should add or subtract. This bit is interpreted differently depending on the accumulator condition bits.
Unless the accumulator condition is 11:
0 Form the sum of A and B.
1 1 Form the sum of A and the complement of B.
When the accumulator condition is 11:
0 If the accumulator is zero, form the sum of A and B. If the accumulator is one, complement B before adding.
1 If the accumulator is one, form the sum of A and B. If the accumulator is zero, complement B before adding.

Note that in order to effect a subtraction, the value of the AU carry in must be chosen properly. It should normally be zero for single precision addition and one for subtraction.

The next bit controls the use of the kill and ignore flags in the error tolerance logic and in the logic associated with the accumulator.

(3) Accumulator Flags Enable
0 Pretend the kill, ignore, and reset flags are zero in the circuitry associated with the logic unit, the flags byte, and the hardware error tolerance.
1 Use the actual value of the flags.

When the cell hardware compares phases, it obtains the database phase from the phase register and the microcode phase from these three bits.
(2:0) Microcode Phase
12. Shift Microcode                                    Pattern This microcode determines how the pattern register will be used. It tells whether the contents of the register will be associated with the database or with the pattern, and also whether the pattern register is being used to shift a byte to the previous or next database character. The value being shifted or loaded comes from the result of the arithmetic unit.
(7) Pattern Register Shift Control—selects the next contents of the pattern register.
0 Recirculate from this cell
1 Shift in from the previous cell in the pipeline
(6:5) Pattern Recirculate Select—determines which value will be recirculated into the pattern register, assuming the shift control is set for recirculation.
00 Contents of pattern register if the kill flag is zero; otherwise zero.
01 Output of the arithmetic unit if the ignore flag is zero; Contents of pattern register if the ignore flag is one and kill flag is zero; otherwise zero.
10 Output of the arithmetic unit if the kill flag is zero; otherwise zero.
11 Backwards path from next cell in the pipeline.
(4:3) Pattern Forward Select—determines which value will be sent to the next cell in the pipeline.
00 Contents of pattern register if the kill flag is zero; otherwise zero.
01Output of the arithmetic unit if the ignore flag is zero; Contents of pattern register if the ignore flag is one and kill flag is zero; otherwise zero.
10 Output of the arithmetic unit if the kill flag is zero; otherwise zero.
11 Unclocked input to this cell from the previous cell.

One additional bit controls whether the kill and ignore flags will be obeyed in the pattern register logic.
(2) Pattern Register Flags Enable
0 Pretend the kill and ignore flags are zero in the pattern register circuitry.
1 Use actual values of flags.

The bits used to control the pattern register are more adequately described in the technical note about communication between cells. For now, here are some of the more useful configurations.
(7:2) Pattern Register Configuration
In retrospective search mode:
1xx000 Maintain a value associated with the database.
000xx0 Maintain a value associated with the pattern.
1xx100 Change a value associated with the database to the output of the arithmetic unit.
010xx0 Change a value associated with the pattern to the output of the arithmetic unit.
00100y First of two instructions for shifting the output of the arithmetic unit to the next database byte.
1xxxxx Second of two instructions for shifting a value to the next database byte.
xxx10y First of three instructions for shifting the output of the arithmetic unit to the previous database byte.

xxx11x Second of three instructions for shifting a value to the previous database byte.

1xxxxx Third of three instructions for shifting a value to the previous database byte.

In dissemination mode:

000xx0 Maintain a value associated with the database.

1xx000 Maintain a value associated with the pattern.

010xx0 Change a value associated with the database to the output of the arithmetic unit.

1xx100 Change a value associated with the pattern to the output of the arithmetic unit.

1xxxxx First of two instructions for shifting the output of the arithmetic unit to the next database byte.

00001y Second of two instructions for shifting a value to the next database byte.

xxxxxy First of two instructions for shifting the output of the arithmetic unit to the previous database byte.

011xxx Second of two instructions for shifting a value to the previous database byte.

Other useful combinations are possible. An "x" in the micro op-code means that the desired function will occur regardless of the function of that bit. A "y" signifies a bit that is a parameter of the function. Two adjacent functions can be combined into the same instruction if the corresponding op-codes are compatible.

The shifting behavior of the carry and zero flags is partly controlled by the following microcode bit, but it is also affected by the current operating mode and by various other microcode fields. In simple terms, this bit determines how the flags should be passed between successive bytes of multiple byte operands.

(1) Carry/Zero Propagation Direction

0 Propagate from least significant byte to most significant byte of multiple precision operands.

1 Propagate from most significant byte to least significant byte of multiple precision operands.

The situation is actually a bit more complicated than this brief description might suggest. There are ten cases to consider when analyzing the flag shifting behavior. The first five occur in retrospective mode.

1. When this cell is being used as a modulo counter, the carry and zero flags will be loaded with the values produced in this cell. Thus, the flag will be associated with the pattern. Modulo counters are considered active when the AU A Input Select bits are $111_2$; these bits (7.5) of the arithmetic unit microcode.

If this cell isn't implementing a modulo counter, the shifting behavior of the carry and zero flag depends on two microcode bits: the Carry/Zero Propagation Direction bit listed above, and the Phase condition bit in the condition microcode.

2. Zero Propagation Direction=0, Phase Condition=0: For ordinary operation, including vertical multiple precision, the carry and zero flags will be shifted in from the cell immediately upstream in the pipeline. Thus, they will be associated with the database character.

3. Carry/Zero Propagation Direction=0, Phase Condition=1: When a cell is operating in horizontal multiple precision mode, the carry and zero bits will either be loaded from the cell immediately upstream or they will be recirculated within this same cell, depending on whether the execution condition is satisfied. If microcode in this cell is enabled, the flags will recirculate; otherwise the flags will be loaded in from the upstream cell. This behavior effectively shifts the flags to the next byte in the database: from the low to high order bytes of a multiple byte value.

4. Carry/Zero Propagation Direction=1, Phase Condition=1: The flags will always be shifted in from the previous cell, just as in Case 2.

5. Carry/Zero Propagation Direction=1, Phase Condition=0: The flags will completely bypass this cell, moving directly from the upstream cell to the downstream cell without being delayed in a register. This feature can be used to shift the flags to the previous byte in the database: from the high to low order bytes of a multiple byte value. Two microcode instructions are needed for each stage of shift. A Case 5 instruction sends the flags through the pipeline faster than everything else, and everything comes together in Case 4 instruction.

There are five cases for dissemination mode as well.

6. When this cell is being used as a modulo counter, the carry and zero flags will be loaded from the upstream cell. Thus, the flags will be associated with the pattern, which is also flowing through the pipeline. Note that the instruction in the cell immediately downstream from this one must be prepared to accept the flags generated here. The instruction immediately before this one must therefore be either another modulo counter or a Case 10 instruction.

The remaining cases assume that the cell is not configured to behave as a modulo counter.

7. Carry/Zero Propagation Direction=0, Phase Condition=0: This is the usual case in which the carry and zero flags recirculate within the same cell. They will thus be associated with the database character.

8. Carry/Zero Propagation Direction=0, Phase Condition=1: The behavior here is identical to Case 3. Again, this case can be used to implement horizontal multiple precision mode in which the flags pass from low order to high order bytes of multiple precision operands.

9. Carry/Zero Propagation Direction=1, Phase Condition=1: The carry and zero flags in this cell will be loaded from the carry and zero flags generated by the downstream cell. Pairs of Case 9 instructions may be used to implement horizontal multiple precision operations in which the flags must travel from high order bytes to low order bytes. The first instruction in the pair performs the high-order operation and sends the resulting flags back to the second instruction.

10. Carry/Zero Propagation Direction=1, Phase Condition=0: Shift the carry and zero flags in from the upstream cell, which now holds the next instruction. This behavior associates the flags with the pattern and can be used in association with modulo counters.

The usefulness of all these conditions is more adequately covered in the technical note about multiple precision.

Finally, one more bit controls where the error tolerance register will obtain its input.

(0) Error Register Input Select

0 Value forwarded to the error tolerance register from the previous instruction.

1 Value forwarded to the pattern register from the previous instruction.

For correct operation, input 0 must be selected when error tolerance is active.

Microcode Summary

The fields in the five microcode bytes may be summarized as follows.

8. Logic Unit Microcode
   (7:6) LU A Input Select
   (5:4) LU B Input Select
   (3:0) LU Function
9. Arithmetic Unit Microcode
   (7:5) AU A Input Select
   (4:2) AU B Input Select
   (1:0) AU Output Select
10. Change Microcode
    (7:6) Extra Character Cost
    (5:4) Missing Character Cost (unless bits (7:6)=00)
    (3) Misspelled Character Cost (unless bits (7:6)=00)
    (5:3) Change Specification (when bits (7:6)=00)
    (2:1) AU Carry In Select
    (0) AU Zero In Select
11. Condition Microcode
    (7:6) Accumulator Condition
    (5) Phase Condition
    (4) AU Function
    (3) Accumulator Flags Enable
    (2:0) Microcode Phase
12. Shift Microcode
    (7) Pattern Register Shift Control
    (6:5) Pattern Recirculate Select
    (4:3) Pattern Forward Select
    (2) Pattern Register Flags Enable
    (1) Carry/Zero Propagation Direction
    (0) Error Register Input Select Cell Logic Definition The following definitions are intended to form a complete description of the FDF 3 cell functionality. Given the contents of a cell's registers, they describe how to compute the values that will be loaded into the registers at the next clock cycle.

Inputs to the cell logic come from four places: registers in the cell itself, signals forwarded from the previous cell in the pipeline, signals sent backwards from the next cell, and global control signals. Bytes derived from register contents are:

FlagsReg=Contents of the Flags Register
DataReg=Contents of the Database Register
PhaseReg=Contents of the Phase Register
TempReg=Contents of the Temporary Register
ErrorReg=Contents of the Error Tolerance Register
PattReg=Contents of the Pattern Register
MaskReg=Contents of the Mask Register
LogicReg=Contents of the Logic Unit Microcode Register
ArithReg=Contents of the Arithmetic Unit Microcode Register
ChangeReg=Contents of the Change Microcode Register
CondReg=Contents of the Condition Microcode Register
ShiftReg=Contents of the Shift Microcode Register Values obtained from the previous cell are:
FlagsFwd_=Flags byte forwarded from previous cell
DataFwd_=Database byte forwarded from previous cell
PhaseFwd_=Phase byte forwarded from previous cell
TempFwd_=Temporary byte forwarded from previous cell
ErrorFwd_=Error Tolerance byte forwarded from previous cell
PattFwd_=Pattern byte forwarded from previous cell
MaskFwd_=Mask byte forwarded from previous cell
LogicFwd_=Logic Unit Microcode byte forwarded from previous cell
ArithFwd_=Arithmetic Unit Microcode byte forwarded from previous cell
ChangeFwd_=Change Microcode byte forwarded from previous cell
CondFwd_=Condition Microcode byte forwarded from previous cell
ShiftFwd_=Shift Microcode byte forwarded from previous cell
ErrorReg_=Error Tolerance value from previous cell
Accum_=Accumulator bit from the previous cell
AccumRev_=Left-shifted accumulator bit for retrospective search mode Values obtained from the next cell in the pipeline are:
PattRev_+=Pattern byte retrieved from next cell
ErrorReg_+=Error tolerance register from the next cell
Accum_+=Accumulator bit from the next cell
AccumRev_+=Left-shifted accumulator bit for dissemination mode
CarryRev_+=Left-shifted carry flag for dissemination mode
ZeroRev_+=Left-shifted zero flag for dissemination mode The global control signals are:

$$\text{Load} = \begin{cases} 0 & \text{Normal searching operation} \\ 1 & \text{Pipeline initialization} \end{cases}$$

$$\text{Dissem} = \begin{cases} 0 & \text{Load} = 1 \text{ or retrospective search mode} \\ 1 & \text{Load} = 0 \text{ and dissemination mode} \end{cases}$$

Note that for proper operation, we require that Dissem=0 whenever Load=1. In addition, the flip-flops that implement registers require global clock signals.

Most of the register bytes, especially the microcode bytes, are made up of smaller bit fields. Here are some names for those fields. First, from the Flags Register:

Accum=FlagsReg(7)
Delay=FlagsReg(6)
CarryFlag=FlagsReg(5)
ZeroFlag=FlagsReg(4)
ValidData=FlagsReg(3)
IgnoreFlag=FlagsReg(2)
Reset Flag=FlagsReg(1)
KillFlag=FlagsReg(0)

From the Phase Register:
DataPhase=PhaseReg(2:0)

From the Logic Unit Microcode Register:
LUASelect=LogicReg(7:6)
LUBSelect=LogicReg(5:4)
LUFunction=LogicReg(3:0)

From the Arithmetic Unit Microcode Register:

AUASelect=ArithReg(7:5)
AUBSelect=ArithReg(4:2)
AUOutSelect=ArithReg(1:0)
From the Change Microcode Register:
ExtraCost=ChangeReg(7:6)
MissingCost=ChangeReg(5:4)
SpellCost=ChangeReg(3)
ChangeSpec=ChangeReg(5:3)
AUCSelect=ChangeReg(2:1)
AUZSelect=ChangeReg(0)
From the Condition Microcode Register:
AccumCond=CondReg(7:6)
PhaseCond=CondReg(5)
AUFunction=CondReg(4)
FlagEnable=CondReg(3)
CodePhase=CondReg(2:0)
And finally, from the Shift Microcode Register:
PattShift=ShiftReg(7)
PattRSelect=ShiftReg(6:5)
PattFSelect=ShiftReg(4:3)
PattFlagEnable=ShiftReg(2)
CZDirect=ShiftReg(1)
ErrInSelect=ShiftReg(0)

Microcode instructions will be executed only if the accumulator and phase associated with the database character meet the specified conditions. Instructions will never be executed for characters that are not marked as part of the valid database.

$$AccumTest = \begin{cases} 1 & \text{if AccumCond} = 00_2 \\ Accum & \text{if AccumCond} = 01_2 \\ \overline{Accum} & \text{if AccumCond} = 10_2 \\ 1 & \text{if AccumCond} = 11_2 \end{cases}$$

$$PhaseTest = \begin{cases} 1 & \text{if PhaseCond} = 0 \\ 1 & \text{if PhaseCond} = 1 \quad \text{CodePhase} = \text{DataPhase} \\ 0 & \text{if PhaseCond} = 1 \quad \text{CodePhase} \ne \text{DataPhase} \end{cases}$$

Execute = AccumTest · PhaseTest · ValidData · Load

Note that instruction execution is disabled while the pipeline is being loaded.

The Ignore, Reset, and Kill flags will be valid only when the appropriate microcode enables them.
Ignore=IgnoreFlag.FlagEnable
Kill=KillFlag.FlagEnable
CtrReset=ResetFlag.FlagEnable
ModReset=(Accum.ZeroFlag)+CtrReset
ErrIgnore=Ignore+Execute
ErrKill=Kill.Execute
PattIgnore=IgnoreFlag.PattFlagEnable
PattKill=KillFlag.PattFlagEnable.Load CtrReset tells when to reset ordinary counters; ModReset tells when to reset modulo counters. The pattern kill flag must be disabled when the pipeline is loading to insure that values may be passed without modification.

The function of the arithmetic units is partially determined by the condition microcode.

$$Subtract = \begin{cases} AUFunction & \text{if AccumCond} \ne 11_2 \\ AUFunction \oplus Accum & \text{if AccumCond} = 11_2 \end{cases}$$

The mask must be set to all ones whenever the mask register is being used as an operand of the arithmetic unit.

$$MaskOnes = \begin{cases} 0 & \text{if AUASelect} \ne 101_2 \\ & \text{AUASelect} \ne 111_2 \\ & \text{AUBSelect} \ne 101_2 \\ 1 & \text{if AUASelect} = 101_2 \\ & \text{AUASelect} = 111_2 \\ & \text{AUBSelect} = 101_2 \end{cases}$$

Mask$<i>$ = (MaskReg$<i>$ + MaskOnes) · Execute

Where $0 \le i \le 7$. The first operand of the arithmetic unit comes from one of the registers.

$$AUA = \begin{cases} FlagsReg & \text{if AUASelect} = 000_2 \\ DataReg & \text{if AUASelect} = 001_2 \\ PhaseReg & \text{if AUASelect} = 010_2 \\ TempReg & \text{if AUASelect} = 011_2 \\ ErrorReg & \text{if AUASelect} = 100_2 \\ PattReg & \text{if AUASelect} = 101_2 \quad CtrReset = 0 \\ MaskReg & \text{if AUASelect} = 101_2 \quad CtrReset = 1 \\ PattReg & \text{if AUASelect} = 110_2 \\ PattReg & \text{if AUASelect} = 111_2 \quad ModReset = 0 \\ MaskReg & \text{if AUASelect} = 111_2 \quad ModReset = 1 \end{cases}$$

AddendA$<i>$ = AUA$<i>$ · Mask$<i>$ $$Modulo = \begin{cases} 0 & \text{if AUASelect} \ne 111_2 \\ 1 & \text{if AUASelect} = 111_2 \end{cases}$$

Where $0 \le i \le 7$. Masking is implemented by forcing masked out bits to be 1 in AddendA and 0 in AddendB. This combination insures that the carry will propagate over these bits. The second arithmetic unit operand also comes from the registers.

$$AUB = \begin{cases} FlagsReg & \text{if AUBSelect} = 000_2 \\ DataReg & \text{if AUBSelect} = 001_2 \\ PhaseReg & \text{if AUBSelect} = 010_2 \\ TempReg & \text{if AUBSelect} = 011_2 \\ ErrorReg & \text{if AUBSelect} = 100_2 \\ MaskReg & \text{if AUBSelect} = 101_2 \\ PattReg & \text{if AUBSelect} = 110_2 \\ 00000000_2 & \text{if AUBSelect} = 111_2 \end{cases}$$

AddendB$<i>$ = (AUB$<i>$ $\oplus$ Subtract) + Mask$<i>$

Where $0 \le i \le 7$. When the arithmetic unit is configured for subtraction the second operand must be complimented before the masking operation takes place. The flags referenced by the arithmetic unit are either constant values or values computed by the previous instruction.

AccumIncr = Accum · (Modulo + CtrReset + ZeroFlag)

$$\text{CarryIn} = \begin{cases} 0 & \text{if AUCSelect} = 00_2 \\ 1 & \text{if AUCSelect} = 01_2 \\ \text{AccumIner} \oplus \text{Subtract} & \text{if AUCSelect} = 10_2 \\ \text{CarrFlag} & \text{if AUCSelect} = 11_2 \end{cases}$$

ZeroIn = ZeroFlag + AUZSelect

We now have enough information to perform the addition. First, the least significant bit references the carry in and zero in flags.

Sum<0> = AddendA<0> ⊕ AddendB<0> ⊕ CarryIn
Carry<0> = majority(AddendA<0>, AddendB<0>, CarryIn)
Zero<0> = ZeroIn · (Sum<0> + Mask<0>)

The seven most significant bits reference the carry and zero flags generated by the previous stage.

Sum<i> = AddendA<i> ⊕ AddendB<i> ⊕ Carry<i − 1>
Carry<i> = majority(AddendA<i>, AddendB<i>, Carry<i − 1>)
Zero<i> = Zero<i − 1> · (Sum<i> + Mask<i>)

Where $1 \leq i \leq 7$. The carry and zero flags generated by the most significant bit will be propagated outside of the arithmetic unit.

CarryOut = Carry(7)
ZeroOut = Zero(7)

The final result of the arithmetic unit cannot be determined without the result of the logic unit.

The first operand of the logic unit can come from any of four places.

ShiftRight = Delay · Kill $$\text{ShiftLeft} = \begin{cases} \text{AccumRev}_- & \text{if Dissem} = 0 \\ \text{AccumRev}_+ & \text{if Dissem} = 1 \end{cases}$$

$$\text{Counter} = \begin{cases} \text{Accum}_+ \cdot \text{CtrReset} & \text{if Dissem} = 0 \\ \text{Accum}_- \cdot \text{CtrReset} & \text{if Dissem} = 1 \end{cases}$$

$$\text{LUA} = \begin{cases} \text{Accum} & \text{if LUASelect} = 00_2 \\ \text{ShiftLeft} & \text{if LUASelect} = 01_2 \\ \text{ShiftRight} & \text{if LUASelect} = 10_2 \\ \text{Counter} & \text{if LUASelect} = 11_2 \end{cases}$$

The second operand of the logic unit uses the flags generated by the arithmetic unit.

$$\text{MinMax} = \begin{cases} \text{CarryFlag} & \text{if ZeroFlag} = 0 \\ \text{CarryOut} & \text{if ZeroFlag} = 1 \end{cases}$$

$$\text{LUB} = \begin{cases} \text{CarryOut} \cdot \text{ZeroOut} & \text{if LUBSelect} = 00_2 \\ \text{CarryOut} & \text{if LUBSelect} = 01_2 \\ \text{ZeroOut} & \text{if LUBSelect} = 10_2 \\ \text{MinMax} & \text{if LUBSelect} = 11_2 \end{cases}$$

The output of the logic unit is one of the sixteen possible boolean combinations of its two inputs.

$$\text{LUOut} = \begin{cases} 0 & \text{if LUFunction} = 0000_2 \\ \overline{\text{LUA}} \cdot \overline{\text{LUB}} & \text{if LUFunction} = 0001_2 \\ \overline{\text{LUA}} \cdot \text{LUB} & \text{if LUFunction} = 0010_2 \\ \overline{\text{LUA}} & \text{if LUFunction} = 0011_2 \\ \text{LUA} \cdot \overline{\text{LUB}} & \text{if LUFunction} = 0100_2 \\ \overline{\text{LUB}} & \text{if LUFunction} = 0101_2 \\ \text{LUA} \oplus \text{LUB} & \text{if LUFunction} = 0110_2 \\ \overline{\text{LUA} + \text{LUB}} & \text{if LUFunction} = 0111_2 \\ \text{LUA} + \text{LUB} & \text{if LUFunction} = 1000_2 \\ \overline{\text{LUA} \oplus \text{LUB}} & \text{if LUFunction} = 1001_2 \\ \text{LUB} & \text{if LUFunction} = 1010_2 \\ \overline{\text{LUA}} + \text{LUB} & \text{if LUFunction} = 1011_2 \\ \text{LUA} & \text{if LUFunction} = 1100_2 \\ \text{LUA} + \overline{\text{LUB}} & \text{if LUFunction} = 1101_2 \\ \overline{\text{LUA} \cdot \text{LUB}} & \text{if LUFunction} = 1110_2 \\ 1 & \text{if LUFunction} = 1111_2 \end{cases}$$

With this information, we can now determine the final result of the arithmetic unit.

$$\text{Result} = \begin{cases} \text{AUA} & \text{if AUOutSelect} = 00_2 \quad \text{LUOut} = 0 \\ \text{AUB} & \text{if AUOutSelect} = 00_2 \quad \text{LUOut} = 1 \\ \text{AUB} & \text{if AUOutSelect} = 01_2 \\ 00000000_2 & \text{if AUOutSelect} = 10_2 \quad \text{LUOut} = 0 \\ \text{Sum} & \text{if AUOutSelect} = 10_2 \quad \text{LUOut} = 1 \\ \text{Sum} & \text{if AUOutSelect} = 11_2 \end{cases}$$

$$\text{AUOut}<i> = \begin{cases} \text{AUA}<i> & \text{if Mask}<i> = 0 \\ \text{Result}<i> & \text{if Mask}<i> = 1 \end{cases}$$

Where $0 \leq i \leq 7$. Notice that unmasked bits in the output of the arithmetic unit will be identical to the corresponding bits in its first operand.

The error tolerance circuitry is controlled by several flags that determine the cost of different errors.

$$\text{TolerateErrors} = \begin{cases} 0 & \text{if ExtraCost} = 00_2 \quad \text{Load} = 1 \\ 1 & \text{if ExtraCost} \neq 00_2 \quad \text{Load} = 0 \end{cases}$$

ExtraInf = ExtraCost<1>
ExtraOne = ExtraCost<0>
MissingInf = MissingCost<1>
MissingOne = MissingCost<0>
SpellInf = SpellCost Three 4-bit operands are required.

M = ErrorReg<3:0>

$$\text{MPPrev} = \begin{cases} \text{ErrorReg}_+<3:0> & \text{if Dissem} = 0 \\ \text{ErrorReg}_-<3:0> & \text{if Dissem} = 1 \end{cases}$$

$$\text{YPrev} = \begin{cases} \text{ErrorReg}_+<7:4> & \text{if Dissem} = 0 \\ \text{ErrorReg}_-<7:4> & \text{if Dissem} = 1 \end{cases}$$

Four 4-bit intermediate results are needed to handle error tolerance. Here is the first of four.

XDecr = Accum $$XClear = \begin{cases} 1 & \text{if } M = 0000_2 \\ Accum \cdot SpellInf & \text{if } M \neq 0000_2 \end{cases}$$

$$X = \begin{cases} 0000_2 & \text{if } XClear = 1 \\ M & \text{if } XClear = 0 \quad XDecr = 0 \\ M - 0001_2 & \text{if } XClear = 0 \quad XDecr = 1 \end{cases}$$

Second of four intermediate results.

$$XXDecr = MissingInf \cdot MissingOne$$

$$XXClear = \begin{cases} 1 & \text{if } M = 0000_2 \\ MissingOne \cdot MissingInf & \text{if } M \neq 0000_2 \end{cases}$$

$$XX = \begin{cases} 0000_2 & \text{if } XXClear = 1 \\ M & \text{if } XXClear = 0 \quad XXDecr = 0 \\ M - 0001_2 & \text{if } XXClear = 0 \quad XXDecr = 1 \end{cases}$$

Third of four intermediate results.

$$XXXDecr = ErrIgnore \cdot ExtraOne$$

$$XXXClear =$$

$$\begin{cases} 1 & \text{if } MPPrev = 0000_2 \\ (ErrIgnore \cdot ExtraInf) + ErrKill & \text{if } MPPrev \neq 0000_2 \end{cases}$$

$$XXX =$$

$$\begin{cases} 0000_2 & \text{if } XXXClear = 1 \\ MPPrev & \text{if } XXXClear = 0 \quad XXXDecr = 0 \\ MPPrev - 0001_2 & \text{if } XXXClear = 0 \quad XXXDecr = 1 \end{cases}$$

The error tolerance circuitry produces three 4-bit values as its results. It is convenient to pack two of these 4-bit values into a single byte.

$$Z\langle i \rangle = YPrev(i) \cdot ErrKill$$

$$Y = \begin{cases} X & \text{if } ErrIgnore = 0 \\ Z & \text{if } ErrIgnore = 1 \end{cases}$$

$$ErrorOut = Y \parallel MP$$

fourth of four intermediate results.

$$SCompare = \begin{cases} 0 & \text{if } Z \geq XX \\ 1 & \text{if } Z < XX \end{cases}$$

$$SSelect = SCompare + (MissingOne \cdot MissingInf)$$

$$S = \begin{cases} Z & \text{if } SSelect = 0 \\ XX & \text{if } SSelect = 1 \end{cases}$$

Here is the third and final 4-bit output of the error tolerance circuitry.

$$MPCompare = \begin{cases} 0 & \text{if } S \geq XXX \\ 1 & \text{if } S < XXX \end{cases}$$

$$MPSelect = (MPCompare \cdot ErrKill) + ErrIgnore$$

$$MP = \begin{cases} S & \text{if } MPSelect = 0 \\ XXX & \text{if } MPSelect = 1 \end{cases}$$

The change specification tells which register should be loaded from the arithmetic unit. Its value will be forced to $111_2$ when error tolerance is active. It will be forced to $000_2$ when instruction execution is disabled or when the pipeline is configured for initialization.

Change (i) = (ChangeSpec(i) + TolerateErrors)·Execute

Where $0 \leq i \leq 2$.

The accumulator contents will be copied to the tap whenever the change specification is $110_2$.

$$ChangeTap = \begin{cases} 0 & \text{if Change} \neq 110_2 \\ 1 & \text{if Change} = 110_2 \end{cases}$$

$$TapOut = Accum \cdot ChangeTap$$

The flags register consists of eight fairly independent bits. Accumulator bit of the flags register:

$$ChangeAcc = \begin{cases} 0 & \text{if Change} = 000_2 \\ 1 & \text{if Change} \neq 000_2 \end{cases}$$

$$AccumFwd = \begin{cases} Accum & \text{if ChangeAcc} = 0 \\ LUOut & \text{if ChangeAcc} = 1 \end{cases}$$

$$AccumRev = Accum \cdot Kill$$

$$Accum' = \begin{cases} FlagsFwd\_\langle 7 \rangle & \text{if Dissem} = 0 \\ AccumFwd & \text{if Dissem} = 1 \end{cases}$$

Delay bit of the flags register:

$$DelayFwd = \begin{cases} Delay & \text{if Load} = 1 \\ Accum & \text{if Load} = 0 \quad Ignore = 0 \\ ShiftRight & \text{if Load} = 0 \quad Ignore = 1 \end{cases}$$

$$Delay' = \begin{cases} DelayFwd & \text{if Load} + Dissem = 0 \\ FlagsFwd\_\langle 6 \rangle & \text{if Load} + Dissem = 1 \end{cases}$$

Carry and Zero bits of the flags register:

$$CZLeft = Load \cdot Modulo \cdot CZDirect \cdot (Dissem \oplus PhaseCond)$$

$$ChangeCZ =$$

$$\begin{cases} 0 & \text{if LUBSelect} = 11_2 \quad ZeroFlag = 0 \\ ChangeAcc & \text{if LUBSelect} \neq 11_2 \quad ZeroFlag = 1 \end{cases}$$

CarryFwd =
$$\begin{cases} \text{CarryFlag} & \text{if CZLeft} = 0 \quad \text{ChangeCZ} = 0 \\ \text{CarryOut} & \text{if CZLeft} = 0 \quad \text{ChangeCZ} = 1 \\ \text{FlagsFwd}_-<5> & \text{if CZLeft} = 1 \quad \text{Dissem} = 0 \\ \text{CarryRev}_+ & \text{if CZLeft} = 1 \quad \text{Dissem} = 1 \end{cases}$$

CarryRev = CarryFwd

ZeroFwd =
$$\begin{cases} \text{ZeroFlag} & \text{if CZLeft} = 0 \quad \text{ChangeCZ} = 0 \\ \text{ZeroOut} & \text{if CZLeft} = 0 \quad \text{ChangeCZ} = 1 \\ \text{FlagsFwd}_-<4> & \text{if CZLeft} = 1 \quad \text{Dissem} = 0 \\ \text{ZeroRev}_+ & \text{if CZLeft} = 1 \quad \text{Dissem} = 1 \end{cases}$$

ZeroRev = ZeroFwd

CZShift = Load + Dissem · Modulo · (CZDirect +
    PhaseCond + PhaseTest) + Dissem · Modulo +
    Dissem · CZDirect · PhaseTest +
    Dissem · CZDirect · PhaseCond $$\text{CarryFlag}' = \begin{cases} \text{CarryFwd} & \text{if CZShift} = 0 \\ \text{FlagsFwd}_-<5> & \text{if CZShift} = 1 \end{cases}$$

$$\text{ZeroFlag}' = \begin{cases} \text{ZeroFwd} & \text{if CZShift} = 0 \\ \text{FlagsFwd}_-<4> & \text{if CZShift} = 1 \end{cases}$$

Valid Data, Ignore, Reset, and Kill bits of the flags register:

$$\text{ChangeVIRK} = \begin{cases} 0 & \text{if Change} \neq 001_2 \\ 1 & \text{if Change} = 001_2 \end{cases}$$

$$\text{ValidFwd} = \begin{cases} \text{ValidData} & \text{if ChangeVIRK} = 0 \\ \text{AUOut}<3> & \text{if ChangeVIRK} = 1 \end{cases}$$

$$\text{IgnoreFwd} = \begin{cases} \text{IgnoreFlag} & \text{if ChangeVIRK} = 0 \\ \text{AUOut}<2> & \text{if ChangeVIRK} = 1 \end{cases}$$

$$\text{ResetFwd} = \begin{cases} \text{ResetFlag} & \text{if ChangeVIRK} = 0 \\ \text{AUOut}<1> & \text{if ChangeVIRK} = 1 \end{cases}$$

$$\text{KillFwd} = \begin{cases} \text{KillFlag} & \text{if ChangeVIRK} = 0 \\ \text{AUOut}<0> & \text{if ChangeVIRK} = 1 \end{cases}$$

$$\text{ValidData}' = \begin{cases} \text{FlagsFwd}_-<3> & \text{if Dissem} = 0 \\ \text{ValidFwd} & \text{if Dissem} = 1 \end{cases}$$

$$\text{IgnoreFlag}' = \begin{cases} \text{FlagsFwd}_-<2> & \text{if Dissem} = 0 \\ \text{IgnoreFwd} & \text{if Dissem} = 1 \end{cases}$$

$$\text{ResetFlag}' = \begin{cases} \text{FlagsFwd}_-<1> & \text{if Dissem} = 0 \\ \text{ResetFwd} & \text{if Dissem} = 1 \end{cases}$$

$$\text{KillFlag}' = \begin{cases} \text{FlagsFwd}_-<0> & \text{if Dissem} = 0 \\ \text{KillFwd} & \text{if Dissem} = 1 \end{cases}$$

The eight flags bits form a single byte:
FlagsFwd=AccumFwd || DelayFwd || CarryFwd- || ZeroFwd || ValidFwd || IgnorFwd || ResetFwd- || KillFwd
FlagsReg'=Accum' || Delay' || CarryFlag' || Zero- Flag' || ValidData' || IgnoreFlag' || ResetFlag'- || KillFlag'

The remaining registers are treated as full-byte quantities. Data register:

$$\text{ChangeData} = \begin{cases} 0 & \text{if Change} \neq 010_2 \\ 1 & \text{if Change} = 010_2 \end{cases}$$

$$\text{DataFwd} = \begin{cases} \text{DataReg} & \text{if ChangeData} = 0 \\ \text{AUOut} & \text{if ChangeData} = 1 \end{cases}$$

$$\text{DataReg}' = \begin{cases} \text{DataFwd}_- & \text{if Dissem} = 0 \\ \text{DataFwd} & \text{if Dissem} = 1 \end{cases}$$

Phase register:

$$\text{ChangePhase} = \begin{cases} 0 & \text{if Change} \neq 011_2 \\ 1 & \text{if Change} = 011_2 \end{cases}$$

$$\text{PhaseFwd} = \begin{cases} \text{PhaseReg} & \text{if ChangePhase} = 0 \\ \text{AUOut} & \text{if ChangePhase} = 1 \end{cases}$$

$$\text{PhaseReg}' = \begin{cases} \text{PhaseFwd}_- & \text{if Dissem} = 0 \\ \text{PhaseFwd} & \text{if Dissem} = 1 \end{cases}$$

Temporary register:

$$\text{ChangeTemp} = \begin{cases} 0 & \text{if Change} \neq 100_2 \\ 1 & \text{if Change} = 100_2 \end{cases}$$

$$\text{TempFwd} = \begin{cases} \text{TempReg} & \text{if ChangeTemp} = 0 \\ \text{AUOut} & \text{if ChangeTemp} = 1 \end{cases}$$

$$\text{TempReg}' = \begin{cases} \text{TempFwd}_- & \text{if Dissem} = 0 \\ \text{TempFwd} & \text{if Dissem} = 1 \end{cases}$$

Error tolerance register:

$$\text{ChangeError} = \begin{cases} 0 & \text{if Change} \neq 101_2 \\ 1 & \text{if Change} = 101_2 \end{cases}$$

ErrorFwd =

$$\begin{cases} \text{ErrorReg} & \text{if ToleradeErrors} = 0 \quad \text{ChangeError} = 0 \\ \text{AUOut} & \text{if TolerateErrors} = 0 \quad \text{ChangeError} = 1 \\ \text{ErrorOut} & \text{if TolerateErrors} = 1 \end{cases}$$

ErrorReg' =

$$\begin{cases} \text{ErrorFwd}_- & \text{if (ErrInSelect} \cdot \text{Load)} = 0 \quad \text{Dissem} = 0 \\ \text{ErrorFwd} & \text{if (ErrInSelect} \cdot \text{Load)} = 0 \quad \text{Dissem} = 1 \\ \text{PattFwd}_- & \text{if (ErrInSelect} \cdot \text{Load)} = 1 \quad \text{Dissem} = 0 \\ \text{PattRecirc} & \text{if (ErrInSelect} \cdot \text{Load)} = 1 \quad \text{Dissem} = 1 \end{cases}$$

Pattern register:

$\text{Patt00}\langle i\rangle = \text{PattReg}\langle i\rangle \cdot \text{PattKill}$ $$\text{Patt01} = \begin{cases} \text{AUOut} & \text{if PattIgnore} = 0 \\ \text{Patt00} & \text{if PattIgnore} = 1 \end{cases}$$

$\text{Patt10}\langle i\rangle = \text{AUOut}\langle i\rangle \cdot \text{PattKill}$ $$\text{PattFwd} = \begin{cases} \text{Patt00} & \text{if PattFSelect} = 00_2 \quad \text{Load} = 1 \\ \text{Patt01} & \text{if PattFSelect} = 01_2 \quad \text{Load} = 0 \\ \text{Patt10} & \text{if PattFSelect} = 10_2 \quad \text{Load} = 0 \\ \text{PattFwd}_- & \text{if PattFSelect} = 11_2 \quad \text{Load} = 0 \end{cases}$$

$\text{PattRev} = \text{Patt10}$ $$\text{PattRecirc} = \begin{cases} \text{Patt00} & \text{if PattRSelect} = 00_2 \\ \text{Patt01} & \text{if PattRSelect} = 01_2 \\ \text{Patt10} & \text{if PattRSelect} = 10_2 \\ \text{PattRev}_+ & \text{if PattRSelect} = 11_2 \end{cases}$$

$$\text{PattReg}' = \begin{cases} \text{PattRecirc} & \text{if PattShift} = 0 \quad \text{Load} = 0 \\ \text{PattFwd}_- & \text{if PattShift} = 1 \quad \text{Load} = 1 \end{cases}$$

Mask register:

$\text{MaskFwd} = \text{MaskReg}$ $$\text{MaskReg}' = \begin{cases} \text{MaskFwd} & \text{if Dissem} + \text{Load} = 0 \\ \text{MaskFwd}_- & \text{if Dissem} + \text{Load} = 1 \end{cases}$$

Logic unit microcode register:

$\text{LogicFwd} = \text{LogicReg}$ $$\text{LogicReg}' = \begin{cases} \text{LogicFwd} & \text{if Dissem} + \text{Load} = 0 \\ \text{LogicFwd}_- & \text{if Dissem} + \text{Load} = 1 \end{cases}$$

Arthmetic unit microcode register:

$\text{ArithFwd} = \text{ArithReg}$ $$\text{ArithReg}' = \begin{cases} \text{ArithFwd} & \text{if Dissem} + \text{Load} = 0 \\ \text{ArithFwd}_- & \text{if Dissem} + \text{Load} = 1 \end{cases}$$

Change microcode register:

$\text{ChangeFwd} = \text{ChangeReg}$ $$\text{ChangeReg}' = \begin{cases} \text{ChangeFwd} & \text{if Dissem} + \text{Load} = 0 \\ \text{ChangeFwd}_- & \text{if Dissem} + \text{Load} = 1 \end{cases}$$

Condition microcode register:

$\text{CondFwd} = \text{CondReg}$ $$\text{CondReg}' = \begin{cases} \text{CondFwd} & \text{if Dissem} + \text{Load} = 0 \\ \text{CondFwd}_- & \text{if Dissem} + \text{Load} = 1 \end{cases}$$

Shift microcode register:

$\text{ShiftFwd} = \text{ShiftReg}$ $$\text{ShiftReg}' = \begin{cases} \text{ShiftFwd} & \text{if Dissem} + \text{Load} = 0 \\ \text{ShiftFwd}_- & \text{if Dissem} + \text{Load} = 1 \end{cases}$$

Summary:

The method and apparatus of the invention represent a significant advance in the field of automated searching of databases. One aspect of the invention is a highly generalized data search engine, capable of performing a variety of searches of different types, detecting exact and inexact matches between a search pattern and sequences of characters in the database. Although the search engine of the invention can perform all the functions of apparatus typical of the prior art, there are several features that clearly distinguish the invention from its predecessors. One distinction is the ability to operate in either the retrospective mode or the dissemination mode using the same apparatus. Another is the ability to perform inexact matching in many different ways, even within the same search, including the ability to assign different costs to different types of errors and to different specific errors of the same type. In terms of the types of search functions that can be performed, a number stand out as clear advances in the art. Specifically, the ability to do forward and reverse searching is a significant advantage, and facilitates a novel lookahead feature. Other functions distinguishing the search engine of the invention are the ability to selectively ignore some characters in the database, and the ability to locate "kill" boundaries in the database, to selectively prevent transmission of character marks from one database character to the next.

It will be appreciated from the foregoing that the present invention represents a significant advance in the automated data searching art. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. High speed data searching apparatus capable of operation in retrospective and dissemination modes, the apparatus comprising:

a plurality of functionally identical search cells, wherein each search cell includes a plurality of registers;

means for connecting corresponding registers in each cell together to form a number of serially connected pipelines of registers through which data can be passed;

means for inputting into the apparatus a first data stream from a database to be searched; and means for inputting into the apparatus a second data stream defining a pattern to be searched for in the database;

wherein each search cell includes means for comparing a database character with a pattern character and means for controlling further operation of the cell in response to the result of each such comparison;

and wherein some of the registers in each cell are designated to hold a database character and associated data, and others of the registers are designated to hold a pattern character and associated data;

and wherein either one of the data streams is first stored in the designated registers of the search cells, and then the other of the data streams is streamed through the search cells to perform the search, whereby the search may be performed in either a retrospective mode in which pattern characters are first stored in and database characters are then streamed through the apparatus, or in a dissemination mode in which database characters are first stored in and pattern characters are then streamed through the apparatus;

and wherein the first data stream includes a sequence of database characters and parallel sequences of associated data, one of the parallel sequences being a sequence of character marks, and wherein a character mark of a particular state indicates that the corresponding database character is to be compared with a pattern character in any cell in which both characters are present.

2. Apparatus as defined in claim 1, wherein:

the means for comparing a database character with a pattern character provides a match signal for any selected condition of equality or inequality, including having one character equal to the other, or having the equivalent numerical value of one character greater than or less than that of the other.

3. Apparatus as defined in claim 1, wherein:

the second data stream, containing the pattern characters and associated data, is shifted into the search cells prior to the search;

the first data stream, containing the database characters and associated data, is streamed through the search cells during the search; and the search is of the retrospective type, to locate relatively small patterns in a large database.

4. Apparatus as defined in claim 1, wherein:

the first data stream, containing the database characters and associated data, is shifted into the search cells prior to the search;

the second data stream, containing the pattern characters and associated data, is streamed through the search cells during the search; and the search is of the dissemination type, to locate a relatively large number of patterns in a relatively small database.

5. High speed data searching apparatus capable of operation in retrospective and dissemination modes, the apparatus comprising:

a plurality of functionally identical search cells, wherein each search cell includes a plurality of registers;

means for connecting corresponding registers in each cell together to form a number of serially connected pipelines of registers through which data can be passed;

means for inputting into the apparatus a first data stream from a database to be searched;

means for inputting into the apparatus a second data stream defining a pattern to be searched for in the database;

wherein each search cell includes means for comparing a database character with a pattern character and means for controlling further operation of the cell in response to the result of each such comparison;

and wherein some of the registers in each cell are designated to hold a database character and associated data, and others of the registers are designated to hold a pattern character and associated data;

and wherein either one of the data streams is first stored in the designated registers of the search cells, and then the other of the data streams is streamed through thee search cells to perform the search, whereby the search may be performed in either a retrospective mode in which pattern characters are first stored in and database characters are then streamed through the apparatus, or in a dissemination mode in which database characters are first stored in and pattern characters are then streamed through the apparatus;

and wherein the first data stream includes a sequence of database characters and parallel sequences of associated data, one of the parallel sequences being a sequence of character marks;

the second data stream includes a sequence of pattern characters and parallel sequences of coded data that determine the manner in which comparisons and other functions are performed in each element of the pattern; and a character mark of a particular state indicates that the corresponding database character is to be compared with a pattern character in any cell in which both characters are present.

6. Apparatus as defined in claim 5, wherein:

each cell further includes means for shifting any of the parallel sequences of data associated with the database characters in either direction with respect to the sequence of database characters, whereby a mark associated with a particular database character may be shifted to and associated with a neighboring database character.

7. Apparatus as defined in claim 6, wherein:

each cell further includes means for modifying data in any of the parallel sequences associated with the database characters, as determined by code contained within the parallel sequences of coded data associated with the pattern characters, and conditioned as desired on the results of any comparison operation performed in the cell, whereby a cell has the ability to mark or unmark a database character currently present in one of the cell's registers.

8. Apparatus as defined in claim 7, wherein:

the parallel sequences of data in the second data stream are conditioned to have the collective effect of initially marking all of the database characters, extinguishing the marks that do not match a first encountered pattern character, and shifting any remaining marks by one position toward the end of the sequence of database characters;

a second pattern character can be next compared with each database character that is still marked; and a character mark is propagated toward the end of the sequence of database characters if a matching comparison is made at each successive database character position, whereby a match of all of the pattern characters with a corresponding string of database characters results in a mark being left in a database position immediately following the last character in the matching string.

9. Apparatus as defined in claim 7, wherein:

at least some of the pattern characters in the second data stream are stored in reverse order, to effect a search of the database in reverse sequence;

the parallel sequences of data in the second data stream are conditioned to have the collective effect of initially marking all of the database characters, shifting the marks by one position toward the beginning of the sequence of database characters, and then extinguishing the marks that do not match a first encountered pattern character;

a second pattern character in the reverse sequence of pattern characters can be next compared with each database character that is still marked;

a character mark is propagated toward the beginning of the sequence of database characters if a matching comparison is made at each database character position, whereby a match of all of the pattern characters with a corresponding string of database characters results in a mark being left in a database position corresponding to the first character in the matching string.

10. Apparatus as defined in claim 8, wherein:

one of the parallel sequences of data associated with the sequence of database characters contains an "ignore" flag; and each cell includes means for ignoring any character in the sequence of database characters when the "ignore" flag accompanies the character, whereby searches can be performed in such a manner that selected characters in the database can be ignored.

11. Apparatus as defined in claim 8, wherein:

one of the parallel sequences of data associated with the sequence of database characters contains a "kill" flag, indicative of a "kill" boundary between a cell containing the flag, in a selected state, and a neighboring cell; and each cell includes means responsive to detection of the "kill" flag in the selected state, for extinguishing any character mark that would otherwise be propagated across the "kill" boundary in either direction.

12. Apparatus as defined in claim 8, wherein:

each character mark is a numeric value;

each cell includes means, responsive to the coded data in the parallel sequences associated with the sequence of pattern data, for initially setting the numeric marks to a value indicative of a degree to which errors will tolerated in a search; and each cell further includes means for reducing the numeric value of a mark in the event that no match is found in the cell, whereby nonzero marks still remaining after the search represent pattern matches to within the desired degree of tolerance.

13. Apparatus as defined in claim 12, wherein:

each cell further includes means for assigning different costs to different types of matching errors and to different errors of the same type, 14. Apparatus as defined in claim 13, wherein:

the types of errors that may be detected include misspellings, missing characters and extra characters.

15. A generalized method for searching databases in either retrospective or dissemination mode, the method comprising the steps of:

inputting a first data stream into a pipeline of search cells, each having a plurality of registers, with corresponding registers of each cell being serially connected to form the pipeline, wherein the first data stream contains a sequence of database characters and parallel sequences of other data associated with the database, one of the parallel sequences being a sequence of character marks;

inputting a second data stream into the pipeline of search cells, although not necessarily after input of the first data stream, wherein the second data stream contains a sequence of pattern characters and parallel sequences of other data, including coded data to control operation of the cells, and wherein one of the first and second data streams is shifted into the pipeline prior to a search and the other of the data streams is streamed through the pipeline in performance of the search;

setting all of the character marks to a nonzero value, to mark all of the characters in the database character sequence and to indicate initially that every character is a candidate for the beginning of a search;

comparing each marked database character with a first pattern character;

unmarking all characters that do not match the first pattern character;

shifting any remaining marks toward the end of the sequence of database characters;

comparing each marked database character with subsequent pattern characters in turn; and after each comparison, unmarking any nonmatching database characters and shifting any remaining marks toward the end of the sequence of database characters;

whereby any string of characters in the database that matches the pattern will be marked at the character position next following the last character in the matching string.

16. A method as defined in claim 15, wherein:

the second data stream, containing the pattern characters and associated data, is shifted into the search cells prior to the search;

the first data stream, containing the database characters and associated data, is streamed through the search cells during the search; and the search is of the retrospective type, to locate at least one relatively small pattern in a large database.

17. A method as defined in claim 15, wherein:

the first data stream, containing the database characters and associated data, is shifted into the search cells prior to the search;

the second data stream, containing the pattern characters and associated data, is streamed through the search cells during the search;

the search is of the dissemination type, to locate a relatively large pattern or a number of patterns in a relatively small database.

18. A method as defined in claim 15, wherein the method performs a reverse sequence search for a string of pattern characters appearing in reverse order, the method further comprising the steps of:
first shifting any character marks toward the beginning of the sequence of database characters;
then comparing each marked database character with a first of the pattern characters stored in reverse order;
unmarking all characters that do not match the first reverse-order pattern character;
comparing each marked database character with subsequent pattern reverse-order characters in turn and, before each comparing step, shifting any remaining marks toward the beginning of the sequence of database characters; and
after each comparison, unmarking any nonmatching database characters;
whereby any string of characters in the database that matches the reverse-order pattern will be marked at the character position corresponding to the first character in the matching string, which is the last to be compared in the reverse-order pattern.

19. A method as defined in claim 15, wherein the comparing steps include comparing for equality between the compared characters.

20. A method as defined in claim 15, wherein the comparing steps include detecting a selected relationship of inequality between the compared characters.

21. A method as defined in claim 15, and further comprising the steps of:
searching the sequence of database characters for occurrences of at least one selected character that is to be ignored in a search;
tagging each occurrence of the selected character by setting the value of a corresponding item in one of the parallel data sequences associated with the database; and
ignoring the tagged characters in the search for database characters that match the pattern characters.

22. A method as defined in claim 15, and further comprising the steps of:
searching the sequence of database characters for occurrences of at least a selected character that is to the site of a "kill" boundary;
tagging each occurrence of the selected character by setting the value of a corresponding item in one of the parallel data sequences associated with the database; and
during performance of a search, extinguishing a mark when the steps of the search call for shifting the mark across a "kill" boundary.

23. A method as defined in claim 15, wherein:
each character mark has a positive numerical value;
the step of extinguishing a mark is effected by reducing the value of the numerical mark; and
the method further comprises the steps of setting the marks to a selected initial value indicative of a desired degree of error tolerance for the search, and reducing the numerical value of a mark when a nonmatching condition is detected, whereby the numerical values of any marks remaining at the end of the search are indicative of the degree of match for each string of characters located in the sequence of database characters.

24. A method as defined in claim 23, and further comprising the steps of:
selecting a cost for each type of error, wherein different costs may be selected for different types of errors.

25. High speed data searching apparatus, comprising:
a plurality of functionally identical search cells, wherein each search cell includes a plurality of registers;
means for connecting corresponding registers in each cell together to form a number of serially connected pipelines of registers through which data can be passed;
means for inputting into the apparatus a first data stream from a database to be searched; and
means for inputting into the apparatus a second data stream defining a pattern to be searched for in the database;
wherein each search cell includes means for comparing a database character with a pattern character and means for controlling further operation of the cell in response to the result of each such comparison;
and wherein some of the registers in each cell are designated to hold a database character and associated data, and others of the registers are designated to hold a pattern character and associated data;
and wherein either one of the data streams is first stored in the designated registers of the search cells, and then the other of the data streams is streamed through the search cells to perform the search;
and wherein the first data stream includes a sequence of database characters and parallel sequences of associated data, one of the parallel sequences being a sequence of character marks, and wherein a character mark of a particular state indicates that the corresponding database character is to be compared with a pattern character in any cell in which both characters are present.

26. Apparatus as defined in claim 25, wherein:
the means for comparing a database character with a pattern character provides a match signal for any selected condition of equality or inequality, including having one character equal to the other, or having the equivalent numerical value of one character greater than or less than that of the other.

27. Apparatus as defined in claim 25, wherein:
the second data stream, containing the pattern characters and associated data, is shifted into the search cells prior to the search;
the first data stream, containing the database characters and associated data, is streamed through the search cells during the search; and
the search is of the retrospective type, to locate relatively small patterns in a large database.

28. Apparatus as defined in claim 25, wherein:
the first data stream, containing the database characters and associated data, is shifted into the search cells prior to the search;
the second data stream, containing the pattern characters and associated data, is streamed through the search cells during the search; and
the search is of the dissemination type, to locate a relatively large number of patterns in a relatively small database.

29. High speed data searching apparatus, comprising:
a plurality of functionally identical search cells, wherein each search cell includes a plurality of registers;

means for connecting corresponding registers in each cell together to form a number of serially connected pipelines of registers through which data can be passed;

means for inputting into the apparatus a first data stream from a database to be searched; and means for inputting into the apparatus a second data stream defining a pattern to be searched for in the database;

wherein each search cell includes means for comparing a database character with a pattern character and means for controlling further operation of the cell in response to the result of each such comparison;

and wherein some of the registers in each cell are designated to hold a database character and associated data, and others of the registers are designated to hold a pattern character and associated data;

and wherein either one of the data streams is first stored in the designated registers of the search cells, and then the other of the data streams is streamed through the search cells to perform the search; and wherein the first data stream includes a sequence of database characters and parallel sequences of associated data, one of the parallel sequences being a sequence of character marks;

the second data stream includes a sequence of pattern characters and parallel sequences of coded data that determine the manner in which comparisons and other functions are performed in each element of the pattern; and a character mark of a particular state indicates that the corresponding database character is to be compared with a pattern character in any cell in which both characters are present.

30. Apparatus as defined in claim 29, wherein:
each cell further includes means for shifting any of the parallel sequences of data associated with the database characters in either direction with respect to the sequence of database characters, whereby a mark associated with a particular database character may be shifted to and associated with a neighboring database character.

31. Apparatus as defined in claim 30, wherein:
each cell further includes means for modifying data in any of the parallel sequences associated with the database characters, as determined by code contained within the parallel sequences of coded data associated with the pattern characters, and conditioned as desired on the results of any comparison operation performed in the cell, whereby a cell has the ability to mark or unmark a database character currently present in one of the cell's registers.

32. Apparatus as defined in claim 31, wherein:
the parallel sequences of data in the second data stream are conditioned to have the collective effect of initially marking all of the database characters, extinguishing the marks that do not match a first encountered pattern character, and shifting any remaining marks by one position toward the end of the sequence of database characters;

a second pattern character can be next compared with each database character that is still marked; and a character mark is propagated toward the end of the sequence of database characters if a matching comparison is made at each successive database character position, whereby a match of all of the pattern characters with a corresponding string of database characters results in a mark being left in a database position immediately following the last character in the matching string.

33. Apparatus as defined in claim 31, wherein:
at least some of the pattern characters in the second data stream are stored in reverse order, to effect a search of the database in reverse sequence;

the parallel sequences of data in the second data stream are conditioned to have the collective effect of initially marking all of the database characters, shifting the marks by one position toward the beginning of the sequence of database characters, and then extinguishing the marks that do not match a first encountered pattern character;

a second pattern character in the reverse sequence of pattern characters can be next compared with each database character that is still marked;

a character mark is propagated toward the beginning of the sequence of database characters if a matching comparison is made at each database character position, whereby a match of all of the pattern characters with a corresponding string of database characters results in a mark being left in a database position corresponding to the first character in the matching string.

34. Apparatus as defined in claim 32, wherein:
one of the parallel sequences of data associated with the sequence of database characters contains an "ignore" flag; and each cell includes means for ignoring any character in the sequence of database characters when the "ignore" flag accompanies the character, whereby searches can be performed in such a manner that selected characters in the database can be ignored.

35. Apparatus as defined in claim 32, wherein:
one of the parallel sequences of data associated with the sequence of database characters contains a "kill" flag, indicative of a "kill" boundary between a cell containing the flag, in a selected state, and a neighboring cell; and each cell includes means responsive to detection of the "kill" flag in the selected state, for extinguishing any character mark that would otherwise be propagated across the "kill" boundary in either direction.

36. Apparatus as defined in claim 32, wherein:
each character mark is a numeric value;

each cell includes means, responsive to the coded data in the parallel sequences associated with the sequence of pattern data, for initially setting the numeric marks to a value indicative of a degree to which errors will tolerated in a search; and each cell further includes means for reducing the numeric value of a mark in the event that no match is found in the cell, whereby nonzero marks still remaining after the search represent pattern matches to within the desired degree of tolerance.

37. Apparatus as defined in claim 36, wherein:
each cell further includes means for assigning different costs to different types of matching errors and to different errors of the same type.

38. Apparatus as defined in claim 37, wherein:
the types of errors that may be detected include misspellings, missing characters and extra characters.

39. A generalized method for searching databases, the method comprising the steps of:

inputting a first data stream into a pipeline of search cells, each having a plurality of registers, with corresponding registers of each cell being serially connected to form the pipeline, wherein the first data stream contains a sequence of database characters and parallel sequences of other data associated with the database, one of the parallel sequences being a sequence of character marks;

inputting a second data stream into the pipeline of search cells, although not necessarily after input of the first data stream, wherein the second data stream contains a sequence of pattern characters and parallel sequences of other data, including coded data to control operation of the cells, and wherein one of the first and second data streams is shifted into the pipeline prior to a search and the other of the data streams is streamed through the pipeline in performance of the search;

setting all of the character marks to a nonzero value, to mark all of the characters in the database character sequence and to indicate initially that every character is a candidate for the beginning of a search;

comparing each marked database character with a first pattern character;

unmarking all characters that do not match the first pattern character;

shifting any remaining marks toward the end of the sequence of database characters;

comparing each marked database character with subsequent pattern characters in turn; and after each comparison, unmarking any nonmatching database characters and shifting any remaining marks toward the end of the sequence of database characters;

whereby any string of characters in the database that matches the pattern will be marked at the character position next following the last character in the matching string.

40. A method as defined in claim 39, wherein:

the second data stream, containing the pattern characters and associated data, is shifted into the search cells prior to the search;

the first data stream, containing the database characters and associated data, is streamed through the search cells during the search; and the search is of the retrospective type, to locate at least one relatively small pattern in a large database.

41. A method as defined in claim 39, wherein:

the first data stream, containing the database characters and associated data, is shifted into the search cells prior to the search;

the second data stream, containing the pattern characters and associated data, is streamed through the search cells during the search;

the search is of the dissemination type, to locate a relatively large pattern or a number of patterns in a relatively small database.

42. A method as defined in claim 39, wherein the method performs a reverse sequence search for a string of pattern characters appearing in reverse order, the method further comprising the steps of:

first shifting any character marks toward the beginning of the sequence of database characters;

then comparing each marked database character with a first of the pattern characters stored in reverse order;

unmarking all characters that do not match the first reverse-order pattern character;

comparing each marked database character with subsequent pattern reverse-order characters in turn and, before each comparing step, shifting any remaining marks toward the beginning of the sequence of database characters; and after each comparison, unmarking any nonmatching database characters;

whereby any string of characters in the database that matches the reverse-order pattern will be marked at the character position corresponding to the first character in the matching string, which is the last to be compared in the reverse-order pattern.

43. A method as defined in claim 39, wherein the comparing steps include comparing for equality between the compared characters.

44. A method as defined in claim 39, wherein the comparing steps include detecting a selected relationship of inequality between the compared characters.

45. A method as defined in claim 39, and further comprising the steps of:

searching the sequence of database characters for occurrences of at least one selected character that is to be ignored in a search;

tagging each occurrence of the selected character by setting the value of a corresponding item in one of the parallel data sequences associated with the database; and ignoring the tagged characters in the search for database characters that match the pattern characters.

46. A method as defined in claim 39, and further comprising the steps of:

searching the sequence of database characters for occurrences of at least a selected character that is to the site of a "kill" boundary;

tagging each occurrence of the selected character by setting the value of a corresponding item in one of the parallel data sequences associated with the database; and during performance of a search, extinguishing a mark when the steps of the search call for shifting the mark across a "kill" boundary.

47. A method as defined in claim 39, wherein:

each character mark has a positive numerical value;

the step of extinguishing a mark is effected by reducing the value of the numerical mark; and the method further comprises the steps of setting the marks to a selected initial value indicative of a desired degree of error tolerance for the search, and reducing the numerical value of a mark when a nonmatching condition is detected, whereby the numerical values of any marks remaining at the end of the search are indicative of the degree of match for each string of characters located in the sequence of database characters.

48. A method as defined in claim 47, and further comprising the steps of:

selecting a cost for each type of error, wherein different costs may be selected for different types of errors.

* * * * *